United States Patent
Treadgold et al.

(10) Patent No.: US 8,036,877 B2
(45) Date of Patent: Oct. 11, 2011

(54) CONTEXT-BASED SUGGESTIONS MECHANISM AND ADAPTIVE PUSH MECHANISM FOR NATURAL LANGUAGE SYSTEMS

(75) Inventors: Nicholas K Treadgold, San Jose, CA (US); Babak Hodjat, Santa Clara, CA (US)

(73) Assignee: Sybase, Inc., Dublin, CA (US)

( * ) Notice: Subject to any disclaimer, the term of this patent is extended or adjusted under 35 U.S.C. 154(b) by 284 days.

(21) Appl. No.: 12/323,588

(22) Filed: Nov. 26, 2008

(65) Prior Publication Data

US 2009/0144248 A1 Jun. 4, 2009

Related U.S. Application Data

(63) Continuation of application No. 10/327,439, filed on Dec. 20, 2002, now abandoned.

(60) Provisional application No. 60/342,230, filed on Dec. 20, 2001, provisional application No. 60/342,237, filed on Dec. 20, 2001.

(51) Int. Cl.
    *G06F 17/27* (2006.01)
(52) U.S. Cl. .......................................................... 704/9
(58) Field of Classification Search .................... 704/9
    See application file for complete search history.

(56) References Cited

U.S. PATENT DOCUMENTS

| | | | |
|---|---|---|---|
| 4,270,182 A | 5/1981 | Asija | |
| 5,007,019 A | 4/1991 | Squillante et al. | |
| 5,197,005 A | 3/1993 | Shwartz et al. | |
| 5,255,386 A | 10/1993 | Prager | |
| 5,555,169 A | 9/1996 | Namba et al. | |
| 5,634,051 A | 5/1997 | Thomson | |
| 5,682,539 A | 10/1997 | Conrad et al. | |
| 5,721,903 A | 2/1998 | Anand et al. | |
| 5,734,897 A | 3/1998 | Banks | |
| 5,890,146 A | 3/1999 | Wavish et al. | |
| 5,909,678 A | 6/1999 | Bergman et al. | |
| 5,974,413 A | 10/1999 | Beauregard et al. | |
| 6,006,225 A | 12/1999 | Bowman et al. | |
| 6,014,665 A | 1/2000 | Culliss | |
| 6,029,165 A | 2/2000 | Gable | |
| 6,076,051 A | 6/2000 | Messerly et al. | |
| 6,144,989 A | 11/2000 | Hodjat et al. | |
| 6,260,059 B1 | 7/2001 | Ueno et al. | |
| 6,292,767 B1 | 9/2001 | Jackson et al. | |

(Continued)

OTHER PUBLICATIONS

Thomas Kuhme, "Adaptive Action Prompting—A Complementary Aid to Support Task-Oriented Interaction in Explorative User Interfaces", Siemens Corporate Research and Development Otto-Hahn-Ring 6, 8000 Munich 8, Germany, email: kuehme@zfe.siemens.de, 1993.

(Continued)

*Primary Examiner* — Talivaldis Ivars Smits
(74) *Attorney, Agent, or Firm* — Edell, Shapiro & Finnan, LLC

(57) ABSTRACT

Natural language interface to a back-end application, incorporating synonyms, suggestions, and proposals. Roughly described, synonyms are automatically added to user input to enhance the natural language interpretation, whereas suggestions and proposals are offered to the user in an interaction, usually after an interpretation of prior user input. Suggestions and synonyms can be learned from user input, whereas proposals are programmed by a third party. The selection of synonyms, suggestions, and proposals for use with particular user input can be user input context-based so that further user input can maintain context by explicitly indicating that the same context is intended, and rewards-based reinforcement can be used to better focus suggestions and proposals on the characteristics of the particular user.

19 Claims, 19 Drawing Sheets

U.S. PATENT DOCUMENTS

| | | |
|---|---|---|
| 6,304,864 B1 | 10/2001 | Liddy et al. |
| 6,366,917 B1 | 4/2002 | St John Herbert, III |
| 6,519,585 B1 | 2/2003 | Kohli |
| 6,523,172 B1 | 2/2003 | Martinez-Guerra et al. |
| 6,567,805 B1 | 5/2003 | Johnson et al. |
| 6,622,119 B1 | 9/2003 | Ramaswamy et al. |
| 6,665,640 B1 | 12/2003 | Bennett et al. |
| 6,675,159 B1 | 1/2004 | Lin et al. |
| 6,687,689 B1 | 2/2004 | Fung et al. |
| 6,781,607 B1 | 8/2004 | Benham |
| 6,871,174 B1 | 3/2005 | Dolan et al. |
| 6,895,406 B2 | 5/2005 | Fables et al. |
| 6,922,691 B2 | 7/2005 | Flank |
| 6,965,899 B1 | 11/2005 | Subramaniam et al. |
| 7,027,975 B1 | 4/2006 | Pazandak et al. |
| 7,047,253 B1 | 5/2006 | Murthy et al. |
| 7,092,928 B1 | 8/2006 | Elad et al. |
| 7,149,732 B2 | 12/2006 | Wen et al. |
| 7,167,825 B1 | 1/2007 | Potter |
| 2002/0032564 A1 | 3/2002 | Ehsani et al. |
| 2002/0052871 A1 | 5/2002 | Chang et al. |
| 2002/0059069 A1 | 5/2002 | Hsu et al. |
| 2002/0069192 A1 | 6/2002 | Aegerter |
| 2002/0072914 A1 | 6/2002 | Alshawi et al. |
| 2002/0156629 A1 | 10/2002 | Carberry et al. |
| 2003/0063113 A1 | 4/2003 | Andrae |
| 2003/0069880 A1 | 4/2003 | Harrison et al. |
| 2003/0172084 A1 | 9/2003 | Holle |
| 2004/0049375 A1 | 3/2004 | Brittan et al. |
| 2005/0246390 A1 | 11/2005 | House et al. |
| 2006/0168335 A1 | 7/2006 | Hodjat et al. |

OTHER PUBLICATIONS

Rankin, Paul J., "Context-Aware Mobile Phones: The difference between pull and push, Restoring the importance of place," Human Computer Interaction International (HCII'01) Aug. 4-10, 2001, New Orleans, Louisiana, USA.

Nuance Communications, Inc., "Developing Flexible Say Anything Grammars Student Guide," Copyright 2001, Nuance communications, 1005 Hamilton Avenue, Menlo Park, California 94025 USA.

CONTEXT-BASED SUGGESTIONS MECHANISM AND ADAPTIVE PUSH MECHANISM FOR NATURAL LANGUAGE SYSTEMS

CLAIM OF PRIORITY

This application claims the benefit of U.S. Provisional Application Nos. 60/342,230 and 60/342,237, both filed 20 Dec. 2001, and both of which are incorporated herein by reference.

REFERENCE TO COMPUTER PROGRAM LISTING AND TABLE APPENDICES

Computer program listing and Table appendices comprising duplicate copies of a compact disc, named "DEJI 1007-2-CPLA," accompany this application and are incorporated by reference. The appendices include the following files:

| | | |
|---|---|---|
| extractSynonyms.txt | 2 KBytes | created Nov. 13, 2002 |
| InteractionAgent.java.txt | 13 KBytes | created Nov. 13, 2002 |
| opal.txt | 279 KBytes | created Jul. 15, 2002 |
| Proposal.java.txt | 13 KBytes | created Nov. 13, 2002 |
| ProposalImportance.java.txt | 1 KBytes | created Nov. 13, 2002 |
| ProposalMatch.java.txt | 8 KBytes | created Nov. 13, 2002 |
| ProposalTable.java.txt | 10 KBytes | created Nov. 13, 2002 |
| Suggestion.java.txt | 6 KBytes | created Nov. 13, 2002 |
| SuggestionMatch.java.txt | 13 KBytes | created Nov. 13, 2002 |
| Suggestions.java.txt | 5 KBytes | created Nov. 13, 2002 |
| SuggestionTable.java.txt | 10 KBytes | created Nov. 13, 2002 |
| XMLActuationAgent.java.txt | 13 KBytes | created Nov. 13, 2002 |

COPYRIGHT DISCLAIMER

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

FIELD OF THE INVENTION

The invention relates to user-machine interfaces, and more particularly, to techniques for applying synonyms, suggestions and push messages to improve the effectiveness of natural language user interaction with a back end application.

BACKGROUND AND SUMMARY OF THE INVENTION

U.S. Pat. No. 6,144,989, incorporated by reference herein, describes an adaptive agent oriented software architecture (AAOSA), in which an agent network is developed for the purpose of interpreting user input as commands and inquiries for a back-end application, such as an audiovisual system or a financial reporting system. User input is provided to the natural language interpreter in a predefined format, such as a sequence of tokens, often in the form of text words and other indicators. The interpreter parses the input and attempts to discern from it the user's intent relative to the back-end application. The interpreter sometimes needs to interact with the user in order to make an accurate interpretation, and it can do so by outputting to the user an inquiry or request for clarification. In addition, the back-end application also needs to be able to provide output to the user, such as responses to the user's commands, or other output initiated by the application. AAOSA is one example of a natural language interpreter; another example is Nuance Communications' Nuance Version 8 ("Say Anything") product, described in Nuance Communications, "Developing Flexible Say Anything Grammars, Nuance Speech University Student Guide" (2001), incorporated herein by reference.

Natural language interpreters have become very good at interpreting user's intent in many situations. Most systems rely on some sort of word-spotting algorithm that has been pre-defined by a programmer for the particular back-end application. In some situations, however, the language used by the user might not have been anticipated by the programmer, sometimes resulting either in commands that are either not recognized or recognized incorrectly. If they are not recognized, then the user might experience no response from the system, and if they are recognized incorrectly, then the system might command the back-end application to perform a function different from the user's intent. U.S. Pat. No. 6,144,989, incorporated above, provides some techniques for learning from contradiction resolution and from user dissatisfaction with the results of an interpretation, but additional mechanisms are needed.

Roughly described, the invention addresses the above problems through the formalized use of synonyms and suggestions. Synonyms are learned by the system using an explicit learning mechanism, and suggestions are learned using a form of implicit learning. In addition, many of the mechanisms for implementing suggestions can also be used to implement an adaptive, context-based "push" functionality (sometimes referred to herein as proposals), in which the suggestions are programmed by someone other than the user. In addition, a novel statistics based reinforcement algorithm can be used to improve the accurate selection of suggestions and proposals.

BRIEF DESCRIPTION OF THE DRAWINGS

The invention will be described with respect to particular embodiments thereof, and reference will be made to the drawings, in which.

DETAILED DESCRIPTION

Figure 1:
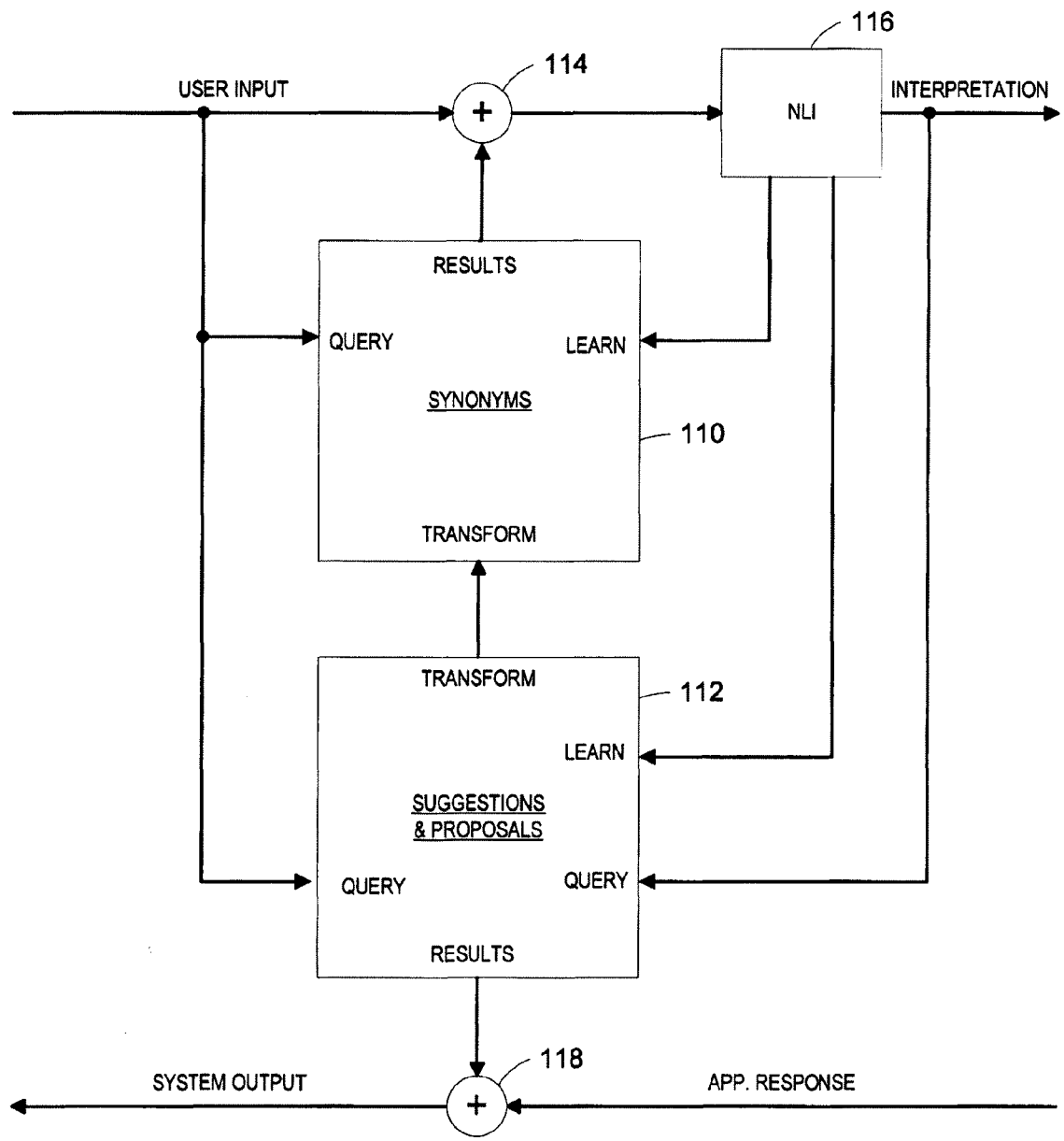
FIGS. 1 and 2 are overviews of systems incorporating the invention.

A suggestion is a piece of information that the system believes to have an association with another piece of information. For example "show me movies around here" may be associated with "Sunnyvale or Mountain View". A suggestion has value in that when it is presented to the user in an appropriate context, it allows the user to clarify a command. This improves the ability of the system to provide an interpretation. Suggestions can be vague, and may or may not be applicable in a given context. Suggestions should be presented to the user for confirmation of correct context.

In an embodiment, suggestions have an importance value attached to them to indicate the degree to which the system believes the two pieces of information are associated. For example, the association between the phrases "around here" and "Sunnyvale or Mountain View" may have a high importance value, while the association between the phrases "groovy movie" and "something with Bruce Willis in it" may have a lower importance value. In an embodiment, the importance value is learned by the system using reinforcement learning. The importance value affects the system's selection of suggestions to present to the user.

One property of suggestions is that in general they must be presented to the user for verification. This is because a suggestion may not be appropriate for a given context. For example, if the system has an association between the phrases "groovy movie" and "something with Bruce Willis in it", and the system automatically appends the second phrase to user input that includes the first phrase, without the user's acknowledgment, then the user would only ever see movies with Bruce Willis in them when requesting a groovy movie. This may often be a valid action. But it also may lead to incorrect interpretations and user confusion ("why do I only get Bruce Willis movies when I ask for groovy movies?")

A "synonym" is a piece of information that means the same thing as something else. As used herein, synonyms represent an exact correspondence, and can automatically replace its matching phrase to aid interpretation. In some embodiments that include agents executing interpretation policies, synonyms common to different users can automatically be added to the appropriate agent policy to increase interpretation efficiency. Synonyms can be considered to be a subset of suggestions, in that a synonym is a suggestion with a maximum confidence value. A synonym can be swapped 'in place' with its matching phrase without changing the meaning of the user command. For example, given that "around here" has the synonym "Sunnyvale or Mountain View", if the user asks "show me movies around here", the system can automatically replace "around here" with "Sunnyvale or Mountain View" when it attempts to interpret the command. This replacement can be done automatically, without the users knowledge. A synonym also can be used as a macro by allowing the user to define a simple phrase to stand for a complex one. For example, the user can create a synonym "chart IBM" equals "chart IBM P/E ratio for the last 3 years".

Proposals are similar to suggestions in that they are pieces of information that the system believes to have an association with another piece of information. They differ from suggestions in that they are programmed by a third party, such as the operator of the system, rather than being learned from interaction with the user. Proposals can be used, for example, in targeted marketing.

As with suggestions, proposals are context-based, and they are adaptive. A proposal is context-based in that the interpretation of the natural language input entered by a user is matched to a database of proposals. Only those proposals that match to a certain degree of confidence are offered to the user. Proposals are adaptive in that they can incorporate a reinforcement learning mechanism that responds to the acceptance or rejection of proposals by a user. This learning mechanism can be made system or user based. Context-based pushing of information is important both for users, who wish to avoid being flooded with irrelevant information, and information providers, who wish to target their audience. Applications for pushing relevant information to users are numerous, and include such domains as cellular phones and Internet sites. One less obvious but no less important application area for proposals is the education of users about the feature space of a natural language system. One problem associated with natural language systems is that since the user often has no visual clues as to what the system is capable of, the user fails to use many of the available system features, or attempts out of bounds functionality. Proposals can be created to recognize these situations and to provide information on the system scope. Thus the push mechanism described herein can be used to present relevant information to the user of a natural language system in response to a user interaction.

As mentioned, proposals are context based in that the interpretation, rather than the input string, is matched. Thus for proposals, the user's intent is compared to the proposal targets. Suggestions do not match on user's intent, but instead match on tokens in the user's natural language input. The reason for this difference is that generally, the reason a user follows up on previous input, is because of dissatisfaction with the system's response to the previous input. The user follows up in order to clarify or refine that response. This indicates that there were probably tokens in the input that the system did not recognize. So by generating the context value based on user input tokens, instead of on the system's interpretation, this information can hopefully be used. For example:

| User: | show me groovy movies |
|---|---|
| System: | [responds with all movies, because it doesn't know what "groovy" is, and hence does not claim it in the interpretation/actuation). |
| User: | something with bruce willis in it please |
| System: | [gives results & creates a new suggestion] |

Next Interaction:

| User: | show me groovy Tom Cruise movies |
|---|---|
| System: | [returns Tom Cruise movies, and suggests "something with bruce willis in it please" because the groovy token matches, even though the system still cannot interpret "groovy"]. |

Two drawbacks of suggestions are that it is not always easy to recognize when user input is intended as a follow-up, and it is not always easy to reformat suggestion text (which is in the same form in which it was provided by the user) to display text (which would be more user-friendly). Proposals have neither of these drawbacks, and have the added advantage of being able to calculate context based on the user's interpretation.

Creating Synonyms and Suggestions Through Learning

In the embodiments described herein, synonyms are created through explicit learning, and suggestions are created usually through implicit learning. For example, the following dialogue will result in explicit learning of a synonym:

User> When I say sports I mean ESPN
System> OK
User> Turn to sports
* The system turns to the ESPN channel.

Explicit learning also allows the user to create macros for commonly used expressions. For example, the following dialogue will result in explicit learning User> In the future chart IBM is the same as chart IBM P/E ratio for the last 3 years
System> OK
User> chart IBM
* The system charts IBM P/E ratio for the last 3 years.

Some of the advantages of explicit learning are that one-shot learning can occur, that unlearning of a synonym can be achieved, and macros can be defined and undefined. Some of the disadvantages of explicit learning are that the user may not bother to instruct the system, the system may not be able to interpret the user's command to learn a synonym, the system may learn a synonym incorrectly, and even though a user defines a synonym, it may not be a true synonym in the grammatical sense, and so in some contexts give confusing or incorrect interpretations. An example of the last point is if the user defines the synonym "around here" to be "Sunnyvale or Mountain View", but the user moves to New York, and asks for movies "around here".

One way to improve the chance that the user takes time to instruct the system is to provide the user with tokens that were not understood by the system and ask for them to be explained. This can be done in when the system totally fails to interpret a command, when the system partially interprets a command, when the system encounters an ambiguity, and when user expresses dissatisfaction. Some examples of these cases are given below.

Synonym learning on failure

User> Turn to sports
System> Sorry, I do not understand. Please explain some terms or rephrase the command (terms not understood: 'sports')
User> Sports is ESPN
* The system turns to ESPN and learns the synonym 'sports' is 'ESPN'.
Synonym learning on partial success User> Show me all the groovy comedies around here
System> There are 512 comedy movies playing in 2151 theaters. You can narrow down your search entering information on theater location, movie type (terms not understood: 'groovy around here')
User> Around here is Sunnyvale or Mountain View
* The system learns the synonym 'around here' is 'Sunnyvale or Mountain View' and returns a modified movie list.
Synonym learning on ambiguity User> Turn on the boobtube
System> Do you mean
the TV
the VCR
Ignore input
(terms not understood: 'boobtube')
User> boobtube is TV
* The system learns the synonym 'boobtube' is 'TV', and turns on the TV.

A difficulty with this method might be in the extraction of valuable words as opposed to garbage words. The chance of presenting garbage words could be reduced by firstly removing common and noise words that have been generated using the same corpus that is used to create the natural language interpreter. The system may also learn which words to present by noting user explanations. For example, three words may be unknown and presented to the user for explanation. If the user only explains one, the other two words could be added to a list of possible garbage words, and hence become less likely to be presented to the user again.

When the system fails to extract a synonym from an input, it can then proceed to make it a suggestion. Two cases in which the system will fail to extract a synonym are (1) when the user does not instruct the system, but merely rephrases the command; and (2) when a synonym cannot be extracted from the user explanation with the required degree of confidence. Examples of these two cases are given below.

Suggestion learning on synonym extraction failure

User> Turn to sports
System> Sorry, I do not understand. Please explain some terms or rephrase the command (terms not understood: 'sports')
User> Turn to ESPN
* The system turns to ESPN and learns the suggestion 'Turn to sports' is 'Turn to ESPN'.
User> Turn to sports
System> Sorry, I do not understand. Please explain some terms of rephrase the command (terms not understood: 'sports')
User> well .. dude what I mean .. turn to well sports is really ESPN I guess try that
* The system turns to ESPN and learns the suggestion 'Turn to sports' is 'well .. dude what I mean .. turn to well sports is really ESPN I guess try that'.

In the last example the suggestion learned is a poor one (at best, too verbose), and so it will result in a poor confidence value.

One method that can be used to ensure that the extracted synonyms are what the user intended, is for the system to interact with the user to confirm the correctness of the synonym. If the user does not validate the synonym, a suggestion can be created instead so that no information is lost.

Synonym verification

User> Turn to sports
System> Sorry, I do not understand. Please explain some terms of rephrase the command (terms not understood: 'sports')
User> Sports is ESPN
System> So, 'sports' is the same thing as 'ESPN'?
User> Yes
* The system turns to ESPN and learns the synonym 'sports' is 'ESPN'.
Synonym verification failure User> Show me all the groovy comedies around here
System> There are 512 comedy movies playing in 2151 theaters. You can narrow down your search entering information on theater location, movie type (terms not understood: 'groovy around here')
User> Around here is Sunnyvale or Mountain View
System> So, 'around here' is the same thing as 'Sunnyvale or Mountain View'
User> Not always, just sometimes
* The system creates the suggestion 'around here' is 'Sunnyvale or Mountain View' and returns a modified movie list.

Synonyms can be unlearned (or re-learned) when the user presents a new explanation. For example:

User> Turn to sports
*The system turns to ESPN, since it has learned this synonym
User> No, sports is FOX
System> So, 'sports' is now 'FOX'?
User> Yes
* The system turns to FOX and re-learns the synonym 'sports' is 'FOX'.

In addition to learning, synonyms can also be created by transformation from suggestions. Suggestions can either become synonyms directly, or information from a suggestion can be extracted to make a synonym. Both transformations are performed carefully to avoid producing incorrect and confusing future interpretations. One method to perform the transformation is to allow suggestions to become synonyms when they reach a certain confidence value. Another method involves the extraction of a synonym using the correspondence of terms from multiple similar suggestions. In any event, to ensure that a valid synonym is created, the system should preferably interact with the user to request confirmation that the new synonym is correct.

Implementation Overview

FIG. 1 is an overview of a system incorporating the invention. The division of functions among the various blocks shown in the figure is arbitrary, and other embodiments might divide up the functions differently or not at all. Also, whereas this system supports synonyms, suggestions and proposals, another embodiment might support only one or two of such functionalities.

Broadly, the system of FIG. 1 includes a synonyms unit 110, which maintains a database of synonyms, and a suggestions & proposals unit 112, which maintains databases of suggestions and proposals. The databases are preferably maintained on a per-user basis, but that is not necessary in other embodiments. As used herein, the term "database" refers only to a collection of information and associations between such information. The term does not imply any particular structure, or even that the database be unitary in structure. One "database" can include one or more "sub-databases", for example, all of which are themselves considered herein to be "databases". Thus whereas synonyms, suggestions and proposals are all kept in separate structures in the present embodiment, a different embodiment might merge two or all three into a single unitary structure. Other variations of structure will be apparent.

User input arrives into the system in any desired form, such as text typed by the user, or sound samples, or input already partially processed. In the present embodiment the user input arrives in the form of a text string. In general, it can be said that user input arrives as a sequence of one or more "tokens", which can include words, sub-words, punctuation, sounds and/or other speech components. The user input is provided as a query into the synonyms unit 110, which outputs any synonyms that it has for any of the tokens in the user input. These are added to the input token sequence in a node 114. The resulting sequence is provided to a natural language interpreter (NLI) 116 for interpretation. The NLI 116 attempts to discern the user's intent from the user input token sequence, and outputs its resulting interpretation. Often the interpretation is forwarded on toward a back-end application as commands or queries, but in some embodiments and in some situations (such as where the NLI 116 failed to interpret some or all of the input token sequence), transmission toward the back-end application may be withheld. (The terms "command" and "query" are used interchangeably herein.) In addition, both the user input and the interpretation are also often forwarded to the suggestions and proposals unit 112 to identify any suggestions and proposals that might be relevant. Suggestions and proposals are examples of what is sometimes referred to herein as "additional potential input." Note that whereas potential synonyms and suggestions are identified by analysis of the user input, proposals are identified by analysis of the NLI's interpretation of the user input. Any resulting suggestions and proposals identified by the unit 112 are added to any response from the back-end application in a node 118, and forwarded toward the user as system output.

In addition to these functions, the NLI 116 also includes functionality to recognize when the user input is defining a synonym, and to add it to the synonyms database in the synonyms unit 110. The NLI 116 also determines from user input that is a follow-up to prior user input, whether a new suggestion should be created, and/or whether suggestions or proposals pre-existing in the suggestions and proposals databases should be rewarded or punished. This information is forwarded to the suggestions and proposals unit 112 for updating of the databases.

Natural Language Interpreter

The natural language interpreter 116 attempts to discern meaning from the user input token sequence even in the face of partial, unexpected or ungrammatical utterances. It accomplishes this in part by attempting to spot concepts in an incoming token sequence, typically by reference to specific keywords or classes of keywords. Some of the keywords are the concepts themselves (like "Monday" in the phrase, "I'll be there on Monday"), and some of the keywords are indicators of where the concept is likely to appear (like "on" in the same phrase). The NLI 116 can be any of a variety of natural language interpreters, including, for example, Nuance Communications' Nuance Version 8 ("Say Anything") product or a platform containing an AAOSA agent network from Dejima, Inc. In Nuance Version 8, the NLI compares the incoming text string to a natural language understanding (NLU) grammar which has been written by a designer to look for specific keywords. For example, in a natural language interface for an airline reservation system, the NLU grammar might look for words such as "depart", "departing", or "leaving from", followed by a city name. In this case the keywords referenced by the natural language interpreter 116 would include the words "depart", "departing", "leaving", "from", as well as a complete list of city names. The city names are usually represented in a sub-grammar in the NLU. In an AAOSA agent network, agents contain policy conditions which either do or do not apply to the incoming text string, and if they do, they make a claim to at least a portion of the incoming text string. Such claims imply a tentative interpretation of part or all of the input string. For example, an agent network might be designed to include policy conditions to look for any of the words "depart", "departing" or "leaving", earlier in the text string than the word "from", which in turn is earlier in the text string than a city name. In this case as well, the keywords referenced by the natural language interpreter 116 would include the words "depart", "departing", "leaving" and "from", as well as a complete list of city names.

As used herein, "developing" or "attempting" a "natural language interpretation" means discerning or attempting to discern, from user input the user's intent relative to the back-end application. The user's intent may be represented in many different forms, but in the present embodiment the user's intent is represented as an XML string describing generalized commands that the system believes the user intends to apply to the back-end application. Note also that "attempting" a natural language interpretation does not necessarily imply that the attempt fails or fails partially. "Developing" a natural language interpretation, for example, is one of the possible consequences of "attempting" a natural language interpretation.

"Failure" of an attempted natural language interpretation depends on the implementation, but in the present embodiment, failure means that the NLI was unable to discern any intent at all from the user input. "Partial failure" in the present embodiment means that the NLI was able to make an interpretation of one portion of the user's input, but it was unable to make an interpretation of a second portion of the user's input.

AAOSA Implementation Overview

Figure 2:
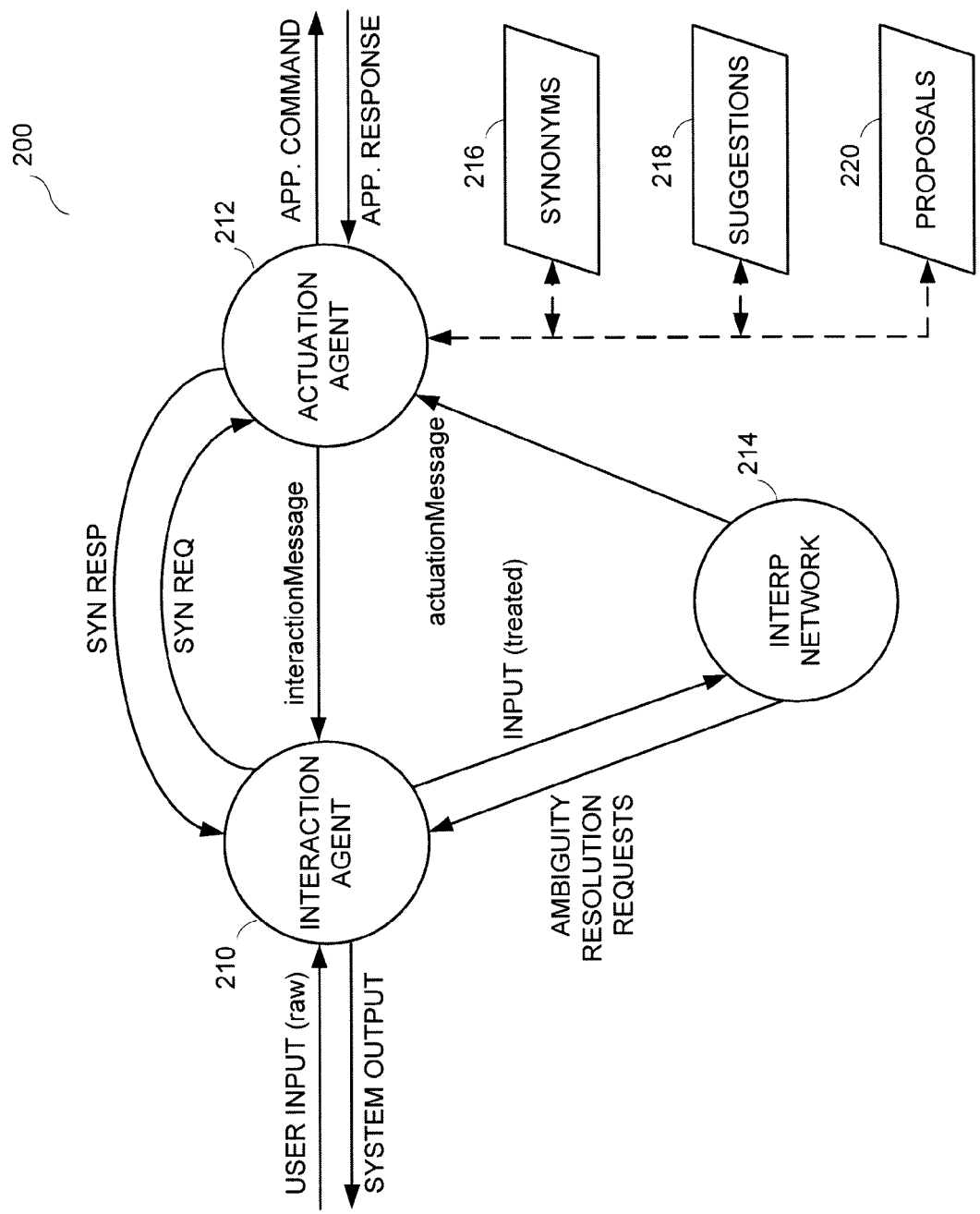

FIG. 2 is an overview diagram of a system 200 which uses an AAOSA-based agent platform to implement the invention.

The system 200 includes an interaction agent 210 which controls all communication with the user, an actuation agent 212 which controls all communication with the back-end application, and the natural language interpretation network 214 itself. The three synonyms, suggestions and proposals databases 216, 218 and 220, respectively, are maintained by the actuation agent 212, but one, two or all of them could in a different embodiment be maintained by the interaction agent 212, by an agent or agents in the interpretation network 214, and/or by other components of the system. In the system 200, the "raw" user input (prior to the addition of any synonyms) is received by the interaction agent 210. The interaction agent 210 forwards a copy of the user input string to the actuation agent 212 to request any synonyms. The actuation agent 212 responds with any synonyms found in the synonyms database 216, and the interaction agent 210 adds them to the raw user input and forwards the combination in the form of an interpretation request message to the interpretation network 214. The interpretation network 214 may require clarification of the user's input in certain circumstances, such as in the event of a recognized ambiguity, in which case the interpretation network 214 communicates the clarification requests back to the user via the interaction agent 210. The interpretation network 214 maintains context information so that new token sequences received from the user can be properly interpreted as a response to the agent network's clarification requests. The system recognizes user input as a continuation of prior input either through heuristics (such as by creating policies in the agent network to try to recognize continuations), or by the user explicitly flagging the new input as a continuation (such as by checking a "maintain context" checkbox). Once the interpretation network 214 completes an interpretation of one or more input token sequences, it transmits its interpretation in an "actuation" message to the actuation agent 212. The actuation agent 212 forwards the actuation to the back end application in the form required by the back end application, unless there were no claims made, in which case a "no interpretation" string is sent back to the interaction agent. The interpretation network 214 thus allows the user to interact normally, as if the user is interacting with another human being, and the system 200 interprets the user's intent and generates the specific signals and syntax required by the back end application to effect that intent. If the back end application has a response to the user's inquiry or command, or if it initiates its own interaction with the user, the actuation agent 212 communicates this information in an "interaction" message to the interaction agent 210, which forwards it on to the user in the form required by the user's form of communication. The actuation agent 212 also includes any suggestions and proposals in its interaction message, that match the actuation message with sufficient confidence.

Databases

Before describing the components of the embodiment of FIG. 2 in more detail, it will be useful to define the fields of the various entries in the three databases 216, 218 and 220. The synonyms database 216 contains a plurality of entries, with each entry having at least a "target" field and a "synonym" field. The "target" field contains a token sequence of one or more tokens that can be compared against user input tokens to identify a match. The "synonym" field contains a token sequence of one or more tokens that can be substituted for the token(s) in the input string that match the corresponding target token(s), without changing the user's intent. One target token sequence can appear in more than one entry in the database, for example if it has more than one alternative synonym token sequence. In another embodiment the database contains only unique targets, although synonyms can be repeated. The synonyms will be token strings that the agent network is known to be able to interpret, otherwise there is no point in creating the synonym table entry. This validation can be done in the actuation agent (or wherever the synonym table is stored), for example by comparing the synonym to a list of all known text tokens that can be claimed by the agent network. The synonyms database can be structured as a table, with each entry located on a separate row, preferably ordered from most recent to oldest, but what is important is the association between target token(s) on the one hand and their synonym(s) on the other hand. Another example structure, therefore, is a set of linked lists: the first entry in a linked list is a target token sequence, and the second and subsequent entries in the same linked list contains alternative synonym token sequences all associated with the same target token sequence. In an embodiment in which the database can hold more than one synonym for a single target, the placement of new synonyms at the front of the list for existing targets allows "unlearning" to occur if the embodiment is designed to return only the first synonym encountered.

The suggestions database 218 contains a plurality of entries, with each entry having at least a "target" field, a "suggestion" field, and an "importance" field. The target field is similar to the target field in the synonyms database 216. It can be compared against user input tokens to identify a match. The "suggestion" field is a token string that, if offered to and accepted by the user, can be automatically sent into the interpretation network 214 as if it had been input by the user manually. Typically it appears to the interpretation network 214 as follow-up input to prior user input. It is formatted similarly to the format used for user input (or easily convertible to that format), rather than the format used for actuation strings. As with synonyms, the suggestions database 218 can include more than one entry with the same "target" field contents. In this case the suggestions in the suggestions field represent alternative suggestions that the system might offer in response to the same matching user input. The "importance" field contains a value (between 0 and 1 in the present embodiment) that tries to represent the importance that the user places on the target/suggestion association in that database entry. The number is assigned a default value when the entry is first created in the database 218, and then modified with reinforcement learning as suggestions are offered to the user and either accepted or rejected. Importance values are given that name herein based on the functions they perform in an implementation of the invention; they could of course be given different names in a different embodiment. Again, in the present embodiment the suggestions database 218 is implemented as a table, with each entry in a separate row. In another embodiment it can be implemented in other ways. What is important here is the associations between targets and synonyms, and the importance values assigned to those associations.

The proposals database 220 contains a plurality of entries, with each entry including a "target" field (similar to the target fields in the synonyms and suggestions databases 216 and 218), a "display text" field, containing the text to be shown to the user in the event of a match, a "selection text" field, which is the token string that, if the proposal is offered to and accepted by the user, can be automatically sent into the interpretation network 214 as if it had been input by the user manually. As with suggestions, the selection text typically appears to the interpretation network 214 as follow-up input to prior user input. It is formatted similarly to the format used for user input (or easily convertible to that format), rather than the format used for actuation strings. Because it is forwarded back into the interpretation network 214 if accepted by the user, the selection text of proposals, as well as the suggestion text of suggestions, are both sometimes referred to herein as "additional potential input." Each proposal entry also includes an "importance" field, which like suggestions, contains a value (between 0 and 1 in the present embodiment) that tries to represent the importance that the user places on the target/proposal association in that database entry. The number is assigned a default value when the entry is first created in the database 220, and then modified with reinforcement learning as proposals are offered to the user and either accepted or rejected. Each proposal entry also includes the interpretation of the selection text itself, and the purpose of this field is explained elsewhere herein. As with synonyms and suggestions, the proposals database 220 can include more than one entry with the same "target" field contents. In this case the proposals represent alternative proposals that the system might offer in response to the same matching user input. Again, in the present embodiment the suggestions database 220 is implemented as a table, with each entry in a separate row. In another embodiment it can be implemented in other ways. What is important here is the associations between targets and proposals, and the importance values assigned to those associations.

Interaction Agent

Figure 3:
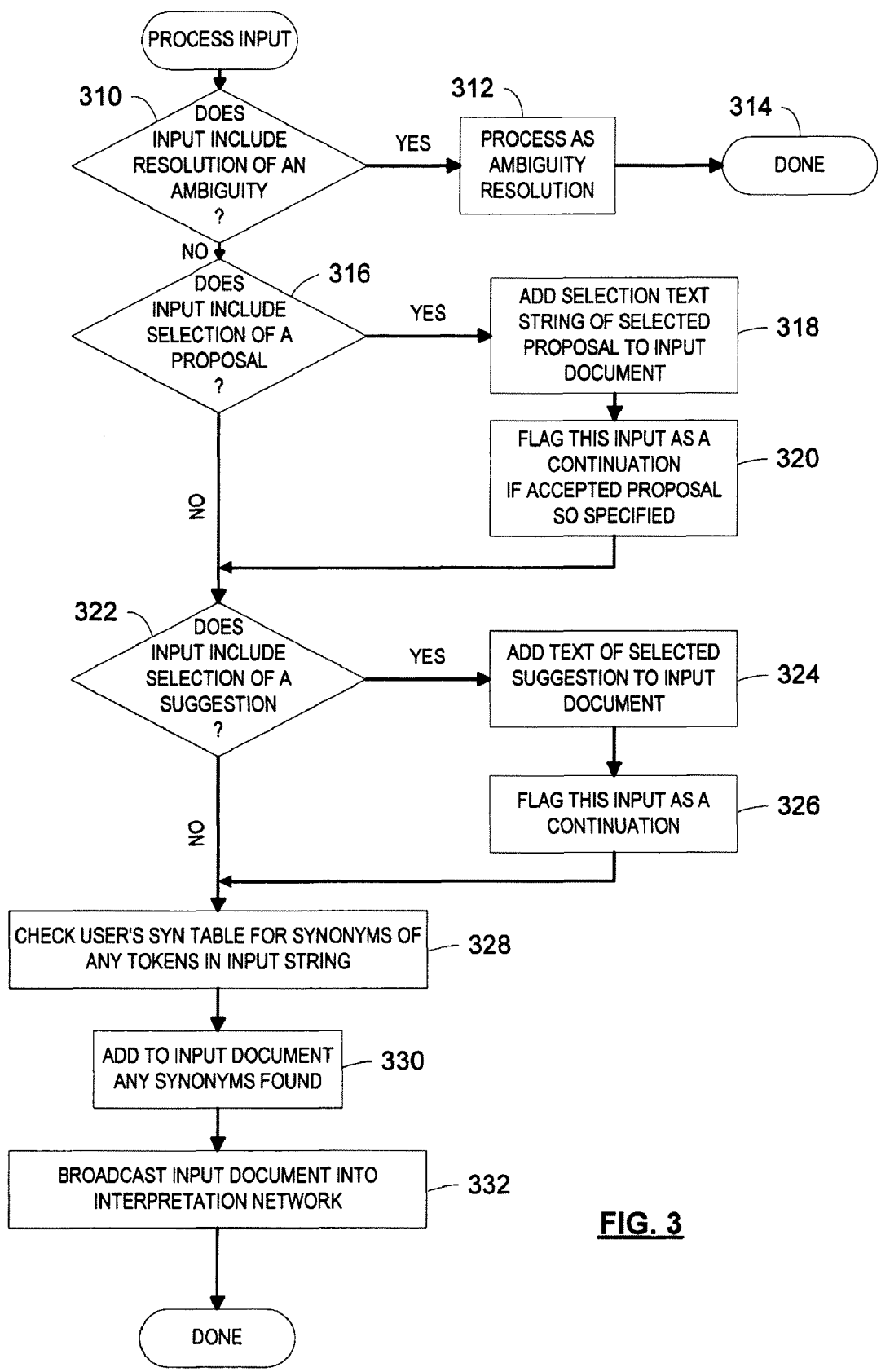
FIG. 3 is a flowchart of steps that take place in the interaction agent in FIG. 2.

FIG. 3 is a flow chart describing in more detail some of the steps that take place in the interaction agent 210 upon receipt of user input. Some of these steps are also set out in more detail in the "process( )" method of class InteractionAgent, which is incorporated herein from the java file named InteractionAgent.java in the accompanying Computer Program Listing and Table Appendices. The flowcharts included herein should be considered symbolic rather than literal, describing an implementation at a level which is considered most helpful to the reader. It will be appreciated that an embodiment often can perform the various steps of a flowchart in a sequence different than that shown, or in some cases in parallel with other steps. As shown in the flowchart, the interaction agent 210 first checks whether the user input includes a resolution of an ambiguity previously put to the user for resolution (step 310). If so, then the input is processed as an ambiguity resolution (step 312) and the routine exits (step 314).

If not, then the agent next determines whether the input includes selection of a proposal that was offered to the user as part of a previous interaction (step 316). In the present embodiment proposals are offered using descriptive text ("display text"), and partially in order to simplify this determination, the user accepts a proposal by selecting an appropriate choice offered by the system rather than by new natural language input. In a graphical user interface (GUI), for example, the system might offer a check-box, a radio button or a drop-down list from which the user selects a response. Each user choice involving acceptance of a proposal also has attached to it a "selection text" string, which can differ from the display text. In step 318, if the user input does include acceptance of a proposal, the interaction agent 210 adds the "selection text" of the accepted proposal to the input token sequence. In one embodiment, the "selection text" string includes information to be added to the actuation string literally, and the interpretation network 214 is designed to recognize this. In the present embodiment, however, the "selection text" is in the form of additional user input that was carefully chosen by the proposal creator such that when interpreted by the NLI 214, an actuation string will result that will cause the actuation agent 212 to command the back-end application in a manner appropriate to acceptance of the proposal.

For example, in a movie database application the following exchange might occur:

| | |
|---|---|
| User> | get me movies times for that Harrison Ford movie that is playing in Sunnyvale |
| System> | Here are the Harrison Ford movies playing in Sunnyvale: [a list of movies and times is displayed here] There is a special on all movies showing at Cinema X in Sunnyvale at the moment - if you buy one ticket you get one free. Would you like to see movies showing there? |

The last paragraph in the above example is the display text of a proposal. The aim of this proposal is to push information regarding a special on movies at Cinema X, and it is targeted at people who are looking for movies in Sunnyvale. The selection text for the proposal might be something such as "get movies showing at Cinema X", which might be interpreted by the interpretation agent 214 as:

```
<find>
    <movie>
        <movieTheatre>Cinema X</movieTheatre>
    </movie>
</find>
```

It is also possible for the system to maintain context, and this option can be set as an attribute of a proposal. Thus in step 320, if the accepted proposal includes the attribute for maintaining context, the user input (including the selection text) is flagged as a continuation of the prior input. If context is maintained in the above example, the information originally entered by the user is used in the interpretation of the user's response to the proposal. Thus if the system had offered the above proposal in response to the user's request in prior input for movies starring Harrison Ford and showing in Sunnyvale, then the interpretation resulting from context being maintained might be:

```
<find>
    <movie>
        <movieStar>Harrison Ford</movieStar>
        <movieLocation>Sunnyvale</movieLocation>
        <movieTheatre>Cinema X</movieTheatre>
    </movie>
<find>
```

In this case, the system has remembered that the user is looking for Harrison Ford movies in Sunnyvale in particular, so that when the proposal to get movies at Cinema X is selected, the information regarding Harrison Ford and Sunnyvale is maintained.

A disadvantage of maintaining context is that there may be cases where the information previously given by a user, when combined with a proposal, gives an interpretation that is too narrow, and hence does not give the results intended by the proposal creator. An example of this would be if, in the above example, Cinema X was not in Sunnyvale. In this case the actuation of the interpretation in the above example would fail because the movie database back-end application would not be able find any movies matching the user's incorrectly interpreted request. For this reason care must be taken when creating proposals to ensure that the interpretations returned are what the proposal creator expects, especially if context is maintained.

In step 322, if the user input did not include selection of a proposal, the interaction agent 210 then determines whether the user input includes selection of a suggestion previously offered by the system. As with proposals, a user accepts a suggestion by selection of a choice offered by the system. Suggestions could be implemented similarly to proposals, with display text? selection text and an attribute for maintaining context, but in the present embodiment they are not. Instead the suggestions offered to the user are the same text strings that are added to the user input and forwarded to the interpretation network 214 in response to acceptance of a selection. Thus in step 324, if the input does include acceptance of a suggestion, the interaction agent 210 adds the text of the accepted suggestion to the input string. In addition, in step 326, since the acceptance of a suggestion is by nature a continuation of the user's previous input, the interaction agent 210 also flags the input as a continuation.

In step 328, again whether or not the user input includes acceptance of any proposals or suggestions, the interaction agent queries the actuation agent 212 for any synonyms associated with the user input. Since this query occurs after the processing of any suggestions and proposals, the text sent to the actuation agent 212 for the query includes any additional user input that was added in steps 318 and/or 324. In step 330, any synonyms found are added to the input document. In one embodiment, the input document is merely a sequence of tokens, and the additional user input and synonyms are merely appended to the end. In another embodiment, the input document is organized into fields, and synonyms are added in a separate synonyms field, associated either with the entire input string or with only the individual tokens that produced each synonym. The input document might, for example, be an XML document. In a step 332, the resulting input document is broadcast into the interpretation network 214 for an interpretation.

Interpretation Network

Figures 1, 4:
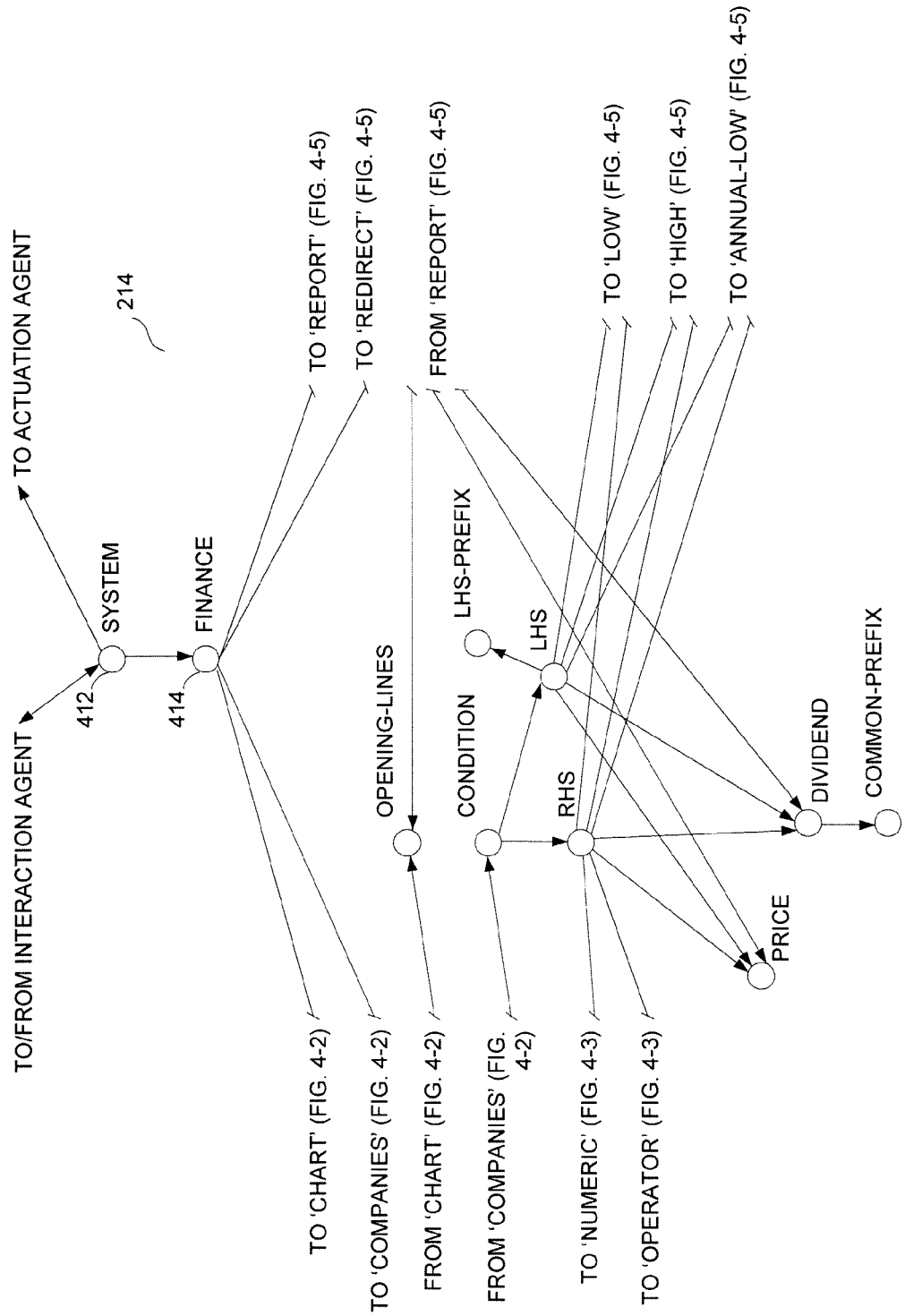
FIG. 4 is a diagram of an example interpretation network of FIG. 2.
Figures 2, 4:
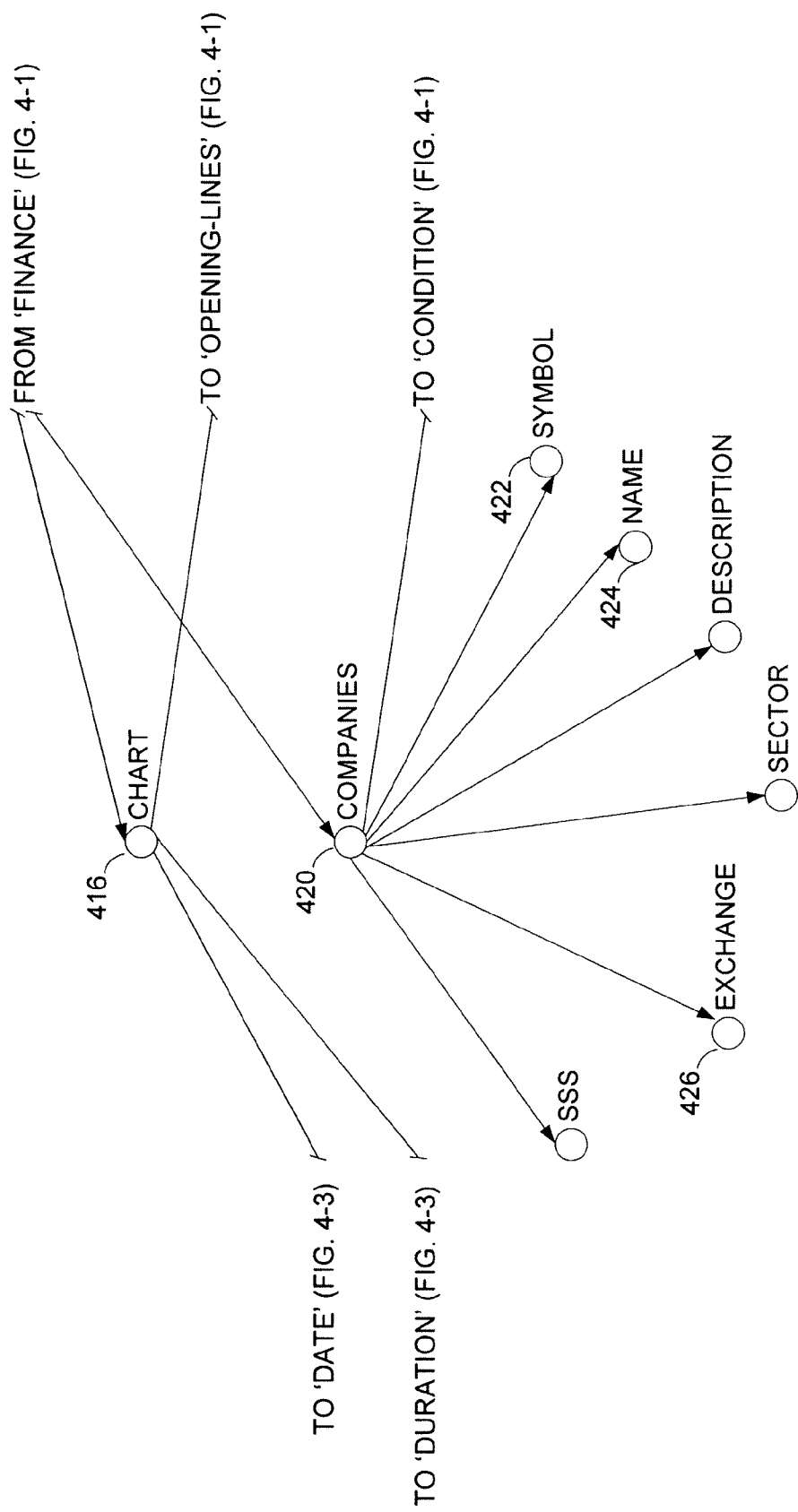
Figures 3, 4:
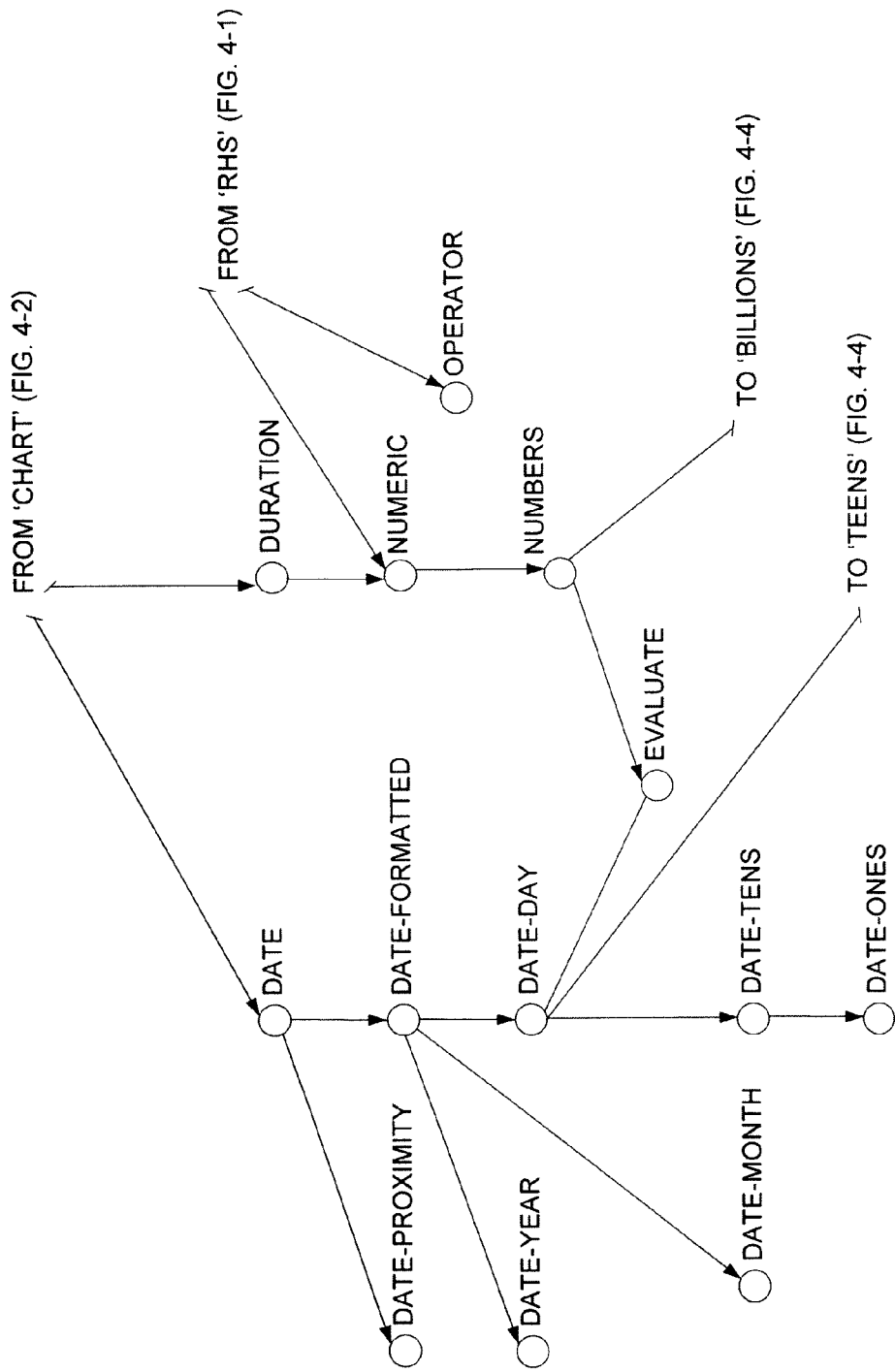
Figure 4:
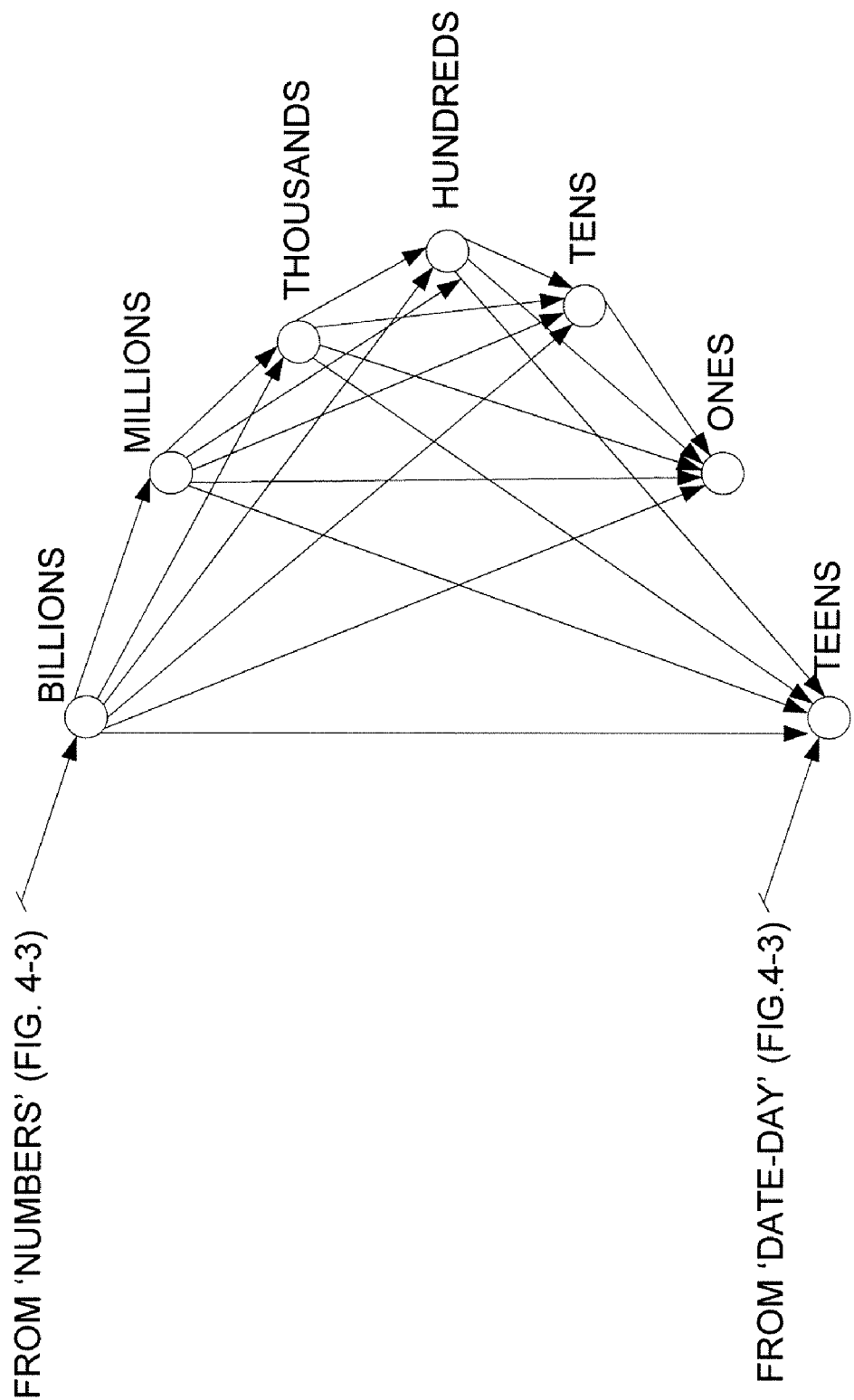

The interpretation agent 214 is a typical AAOSA-based agent network adapted for use with the relevant back-end application. FIG. 4 is a diagram of an example interpretation network 214, used for implementing a natural language interface to a back end application that is designed for financial reporting. In particular, the back end application in this example is an Internet-queryable database provided by EDGAR Online, Inc. More information about the database can be found at http://www.finsight.com, visited Feb. 5, 2002, and incorporated herein by reference. This product permits a web client to retrieve desired financial information automatically using URL-based queries. The interface to this back end application, therefore, includes the formulation of the appropriate URL for satisfying the user's inquiry.

Only a partial representation of the interpretation network 214 appears in FIG. 4. A more complete version of the network is described in the Opal file named opal.txt in the accompanying Computer Program Listing and Table Appendices. An Opal file is an XML document which defines certain properties of each of the agents in an agent network. The agents themselves are implemented as instances of java classes and subclasses, and the Opal file specifies, for each agent and among other things, the specific class or subclasses from which the agent is to be instantiated, which other agents each particular agent listens to for each particular kind of message, as well as (for most agents) a set of one or more "interpretation policies" which implement the interpretation task for which the particular agent is responsible. The Opal file is used by an Opal converter program at system startup time to instantiate the entire agent network such as network 314. The Opal file in opal.txt can be understood by a person of ordinary skill, especially with the assistance of the Dejima Policy Reference, Platform 3.0, a copy of which is attached hereto in Appendix A. In addition, it will be understood that the Opal file uses standard XML coding, in which (among other things):

| | |
|---|---|
| ![CDATA[...]] | indicates that "..." is to be interpreted as Character data; |
| &letter; | means "<" (left angle bracket) |
| > | means ">" (right angle bracket) |
| & | means "&" (ampersand) |
| ' | means "'" (apostrophe) |
| " | means """ (quotation mark) |

As described in the Dejima policy reference, an interpretation policy contains, among other things, a policy condition and a policy action. When an agent receives a message from another agent to attempt to interpret and input string, it compares the input string to each of the agent's policy conditions in sequence. If a condition does apply to the input string, or to part of the input string, then the policy makes a "claim" on the applicable portion of the input string, and returns the claim to the agent that requested the interpretation. A claim identifies (among other things) the agent and policy which is making the claim, the portion of the input string to which the claim applies (called the claim "focus"), the priority number of the agent or policy, and also a confidence level which indicates how well the input matches the policy condition. The priority and confidence levels, and the focus, all can be used subsequently by upchain agents for comparison with other claims made by other downchain agents, so as to permit the upchain agent to select a "best" one among competing claims.

Policy conditions are written as expressions made up from operators and operands. The various operators include unary operators such as <exists>, <exact>, <substring>, <accent>, <accent-substring>, REPEAT and RECURSIVE. They also include binary operators such as OR, AND, ORDERED, ADJACENT and COMBO. The operands on which an operator can act include tokens (words, strings, numbers, symbols, delimiters), text files (which can contain their own policy conditions), databases, and claims made by other policies. If a first policy condition (the "referencing policy condition") refers to a second policy (the "referenced policy") previously evaluated in the same agent, then any claim made by the referenced policy can be figured into the evaluation of the referencing policy condition in the manner specified by the operators. If a policy condition refers to another agent (the "referenced agent") downchain of the current agent (the "referring agent"), then the claim or claims returned by the referenced downchain agent are figured into the evaluation of the referencing policy condition in the manner specified by the operators. Note that a policy condition that references a downchain agent cannot be completely resolved until the input string is passed to that other agent for comparing to its own policy conditions. In one embodiment, the referencing agent passes the input string to each downchain agent only upon encountering the agent's name while evaluating a policy condition. In the present embodiment, however, the referencing agent passes the input string to all downchain agents mentioned in any policy condition in the referencing agent, before the referencing agent begins evaluating even its first policy condition.

In FIG. 4, the interaction agent 210 initiates an interpretation attempt into the interpretation network 214 by communicating the input document, in an object of class "InitiateInterpretationMessage", to the Top agent of the network 214. In the network of FIG. 4, the Top agent is System agent 412. The Top agent contains one or more interpretation policies whose policy conditions, in a typical network, do very little aside from referencing one or more other agents deeper in the network. System agent 412, for example, contains a single interpretation policy whose policy condition does nothing more than reference the Finance agent 414. Such a policy condition applies to the input token string if and only if the Finance agent can make a claim to at least part of the input token string. When System agent 412 encounters this policy condition, therefore, it forwards the input token string to the Finance agent 414 in an object of class "IntepretItMessage". The Finance agent 414 is thus considered to be "downchain" of the System agent 412, and the System agent 412 is considered to be "upchain" of the Finance agent 414.

When the Finance agent 414 receives the input token sequence, it first looks in its policies for policy conditions that make reference to further agents downchain of the Finance agent 414. If there are any, then the Finance agent 414 forwards the input token string to each of the further downchain agents in an "IntepretItMessage" and awaits replies. In the embodiment of FIG. 4, the Chart, Report and Companies agents 416, 418 and 420, respectively, are all referenced in the Finance Agent's policy conditions and are therefore downchain of the Finance Agent 414. Each agent downchain of the Finance agent 414 does the same upon receipt of an InterpretItMessage. When an agent has received all replies (or in certain embodiments, times out on all replies not yet received), the agent tests the input token sequence against the agent's policy conditions. The agent processes the input in order from the agent's first policy to its last policy. Each policy makes all the claims it can on the input. Subsequent policies in the agent can make reference to claims made by previously processed policies in the agent, as well as to claims made by downchain agents. After all policies have made their claims the agent uses a predetermined algorithm to select the "best" claim. If the best claim is one made from a non-grammatical condition (e.g. combo operator), then the sub-claims are also selected. The agent then returns the selected claim or claims to the agent's upchain agent in an object of class ClaimMessage. If the agent is not able to make any claims on the input, then the agent passes upchain an object of class NoClaimMessage.

Thus in the embodiment of FIG. 4, the Finance agent 414 eventually will receive any claims made by its downchain agents and will refer to such claims in the evaluation of its own policy conditions. The Finance agent 414 then will respond to the System agent 412 with either a ClaimMessage or a NoClaimMessage. If the System agent 412 receives a NoClaimMessage, then the System agent's single policy does not apply. A null actuation message will still be sent to the actuation agent 212, but no suggestions or proposals will be identified, and no command will be sent to the back-end application. If the System agent 412 receives a ClaimMessage, then the System agent's policy does apply.

The System agent 412 evaluates its own policy conditions in the same manner as other agents in the network, and each such policy again makes as many claims as it can on the input. But because the System agent 412 is the Top agent, it does not transmit any resulting claims (or NoClaims) to any further upchain agents. Instead, as the Top agent of a network, after selecting one or more "best" claim(s) in the manner described above, System agent 412 has the responsibility to delegate "actuation" to the agents and policies that made up the claim (s). This process, which is sometimes called "executing" the winning claim, takes place according to the "action" part of the winning policy or policies in the Top agent. The action part of a policy builds up an actuation string in a manner similar to that in which policy conditions build up the result of the condition, that is, by string operators and operands that can include words, numbers, symbols, actuation sub-strings already created by other policies within the same agent, and actuation sub-strings created by other downchain agents. Typically the downchain agents referred to in the action part of a policy are the same agents referred to in the condition part of the policy. Also typically, the actuation string built up by this process is an XML string.

In order to fill in the actuation sub-strings defined by downchain agents, the Top agent sends an object of class DelegationMessage to each downchain agent referenced in the action part of the winning policy(ies). In the embodiment of FIG. 4, the System agent 412 contains only one policy, the action part of which does nothing more than delegate to the Finance agent 414. The actuation sub-string returned by the Finance agent 414 therefore will be the actuation string output of the network. The DelegationMessage received by an agent includes a reference to the particular policy or policies of that agent which formed part of the winning claim. Upon receipt of such a message, therefore, the agent executes the action part of each of its policies that formed part of the winning claim, issuing DelegationMessages of its own to its own downchain neighbors as called for in the action part of the such policies, and building up an actuation sub-string for returning to the agent's upchain caller. Actuation sub-strings are passed to upchain agents in objects of class ActuationMessage, ultimately once again reaching the Top agent of the network (System agent 412). This agent in the present embodiment returns the actuation message in the form of an XML string to the Process method of Actuation agent 212. The actuation message contains the user's intent, as interpreted by the interpretation network 214, and can be converted by the actuation agent 212 into appropriate commands in the URL format required by the back-end application.

Thus it can be seen that interpretation of the user's intent takes place in an agent network in a distributed manner. Each of the agents in interpretation network 214 can be thought of as having a view of its own domain of responsibility, as defined by its interpretation policies. Typically the application domain is organized by the designer into a hierarchy of semantic sub-domains, and individual agents are defined for each node in the semantic hierarchy. In the embodiment of FIG. 4, for example, the Finance agent 414 is responsible for all semantics that relate to finance (i.e., all queries in the entire application domain in this example). The Chart agent 416 is responsible for detecting and acting upon parts of user queries that have to do with financial charting, whereas Report agent 418 is responsible for detecting and acting upon parts of user queries that have to do with financial reporting. Companies agent 420 is responsible for detecting and acting upon parts of user queries that have to do with company names. The Companies agent 420 has downchain thereof a Symbol agent 422, responsible for detecting and acting upon parts of user queries that involve company names provided in the form of a trading symbol; a Name agent 424, responsible for detecting and acting upon parts of user queries that involve company names provided as a company name; an Exchange agent 426, responsible for detecting and acting upon parts of user queries that involve companies that are trading exchanges, and so on.

It can also be seen that the Top agent of a network is responsible for receiving input and initiating queries into the network, and the agents representing the functionality of the system (the agents constructing their actuation sub-strings without reference to further agents) are the lowest order nodes (leaf agents) of the network. The network operates in two main phases: the interpretation phase and the delegation phase. In the interpretation phase, an initiator agent (such as the Top agent) receives the input token sequence and, by following its policy conditions, queries its downchain agents whether the queried agent considers the input token sequence, or part of it, to be in its domain of responsibility. Each queried agent recursively determines whether it has an interpretation policy of its own that applies to the input token sequence, if necessary further querying its own further downchain agents in order to evaluate its policy conditions. The further agents eventually respond to such further queries, thereby allowing the first-queried agents to respond to the initiator agent. The recursive invocation of this procedure ultimately determines a path, or a set of paths, through the network from the initiator agent to one or more leaf agents. The path is represented by the claim(s) ultimately made by the initiator agent. After the appropriate paths through the network are determined, in the delegation phase, delegation messages are then transmitted down each determined path, in accordance with the action parts of winning policies, with each agent along the way taking any local action thereon and filling in with further action taken by the agents further down in the path. The local action involves building up segments of the actuation string, with each agent providing the word(s) or token(s) that its policies now know, by virtue of being in the delegation path, represent a proper interpretation of at least part of the user's intent. The resulting actuation string built up by the selected agents in the network are returned to the initiator agent as the output of the network. This actuation string contains the fields and field designators required to issue a command or query to the back-end application, to effect the intent of the user as expressed in the input token string and interpreted by the interpretation network 214. Note that the transmission of a delegation message to a particular agent is considered herein to "delegate actuation" to the particular agent, even if the particular agent effects the actuation merely by forwarding the delegation message to one or more further agents.

Actuation Agent

Figures 4, 5:
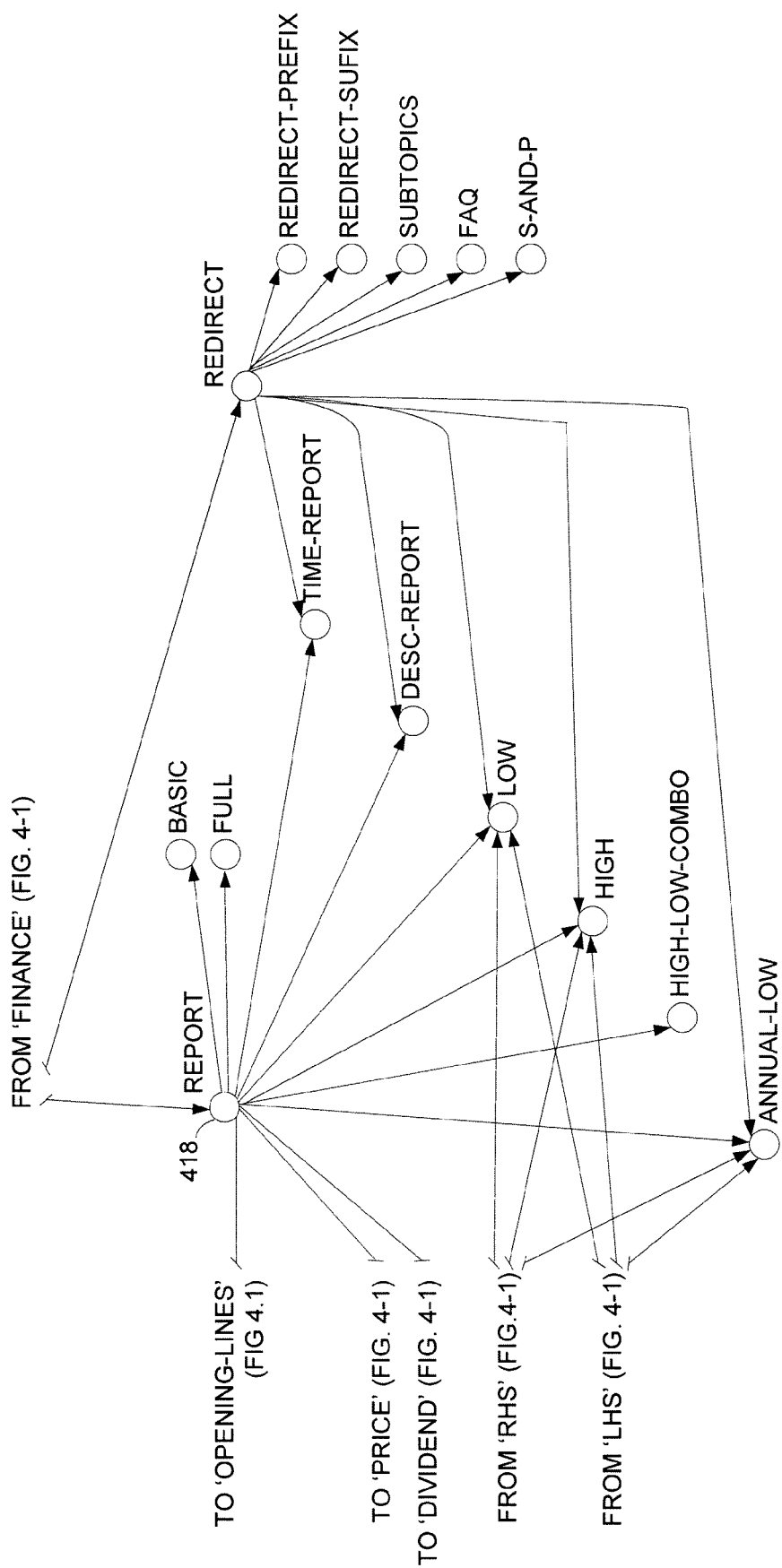
FIG. 5 is a flowchart of steps that take place in the actuation agent of FIG. 2.
Figure 5:
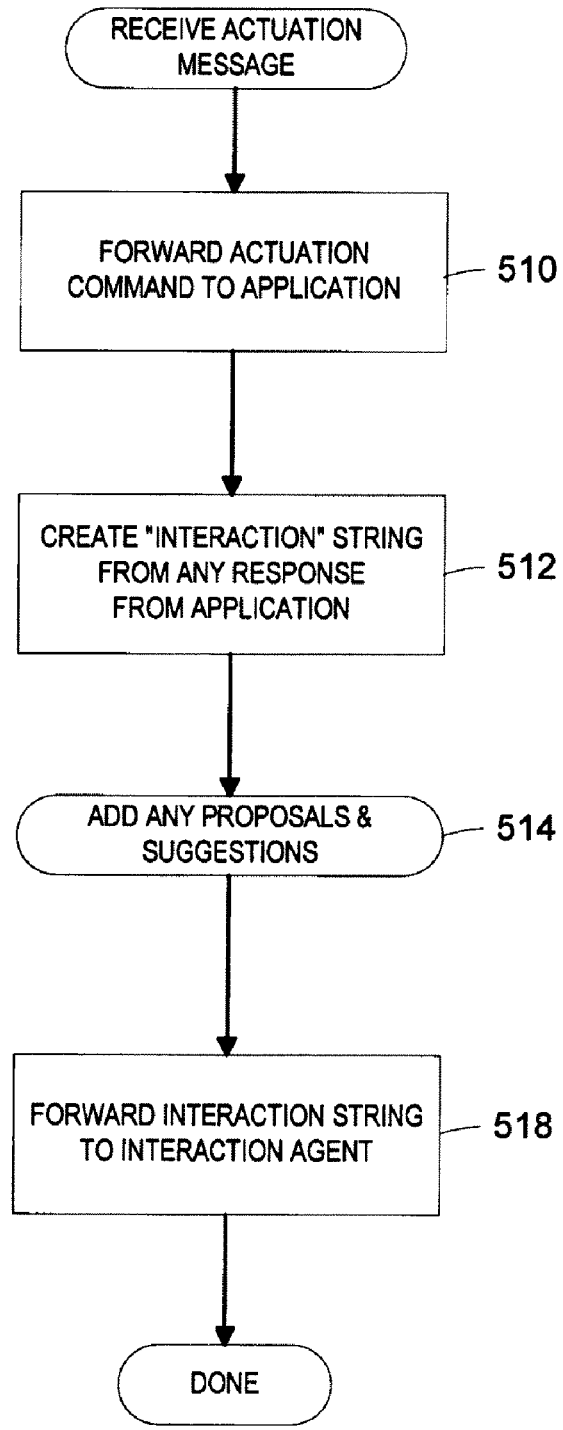

FIG. 5 is a flowchart of steps that take place in the actuation agent 212 in response to receipt of an actuation message from the interpretation network 214. Some of these steps are also set out in more detail beginning with the "handleActuation( )" method of class XMLActuationAgent, which is incorporated herein from the java file named XMLActuationAgent.java.txt in the accompanying Computer Program Listing and Table Appendices. In a step 510, the actuation agent 212 first converts the actuation string from its incoming XML format to whatever format and command sequence is required by the back-end application to effectuate the intent of the user. The commands are forwarded to the back-end application by whatever transport mechanism is in use. In step 512, the actuation agent 212 receives any response from the back-end application, and uses it to create an "interaction" string for transmission toward the user. This string is referred to herein as an interaction string rather than a response, because it can often request further input from the user. It will certainly request input from the user if it ultimately includes proposals or suggestions.

In step 514, the actuation agent 212 adds to the interaction string any proposals and suggestions that it has relative to the actuation string. In step 518, the actuation agent forwards the resulting interaction string to the interaction agent 210 for output toward the user.

Figure 6:
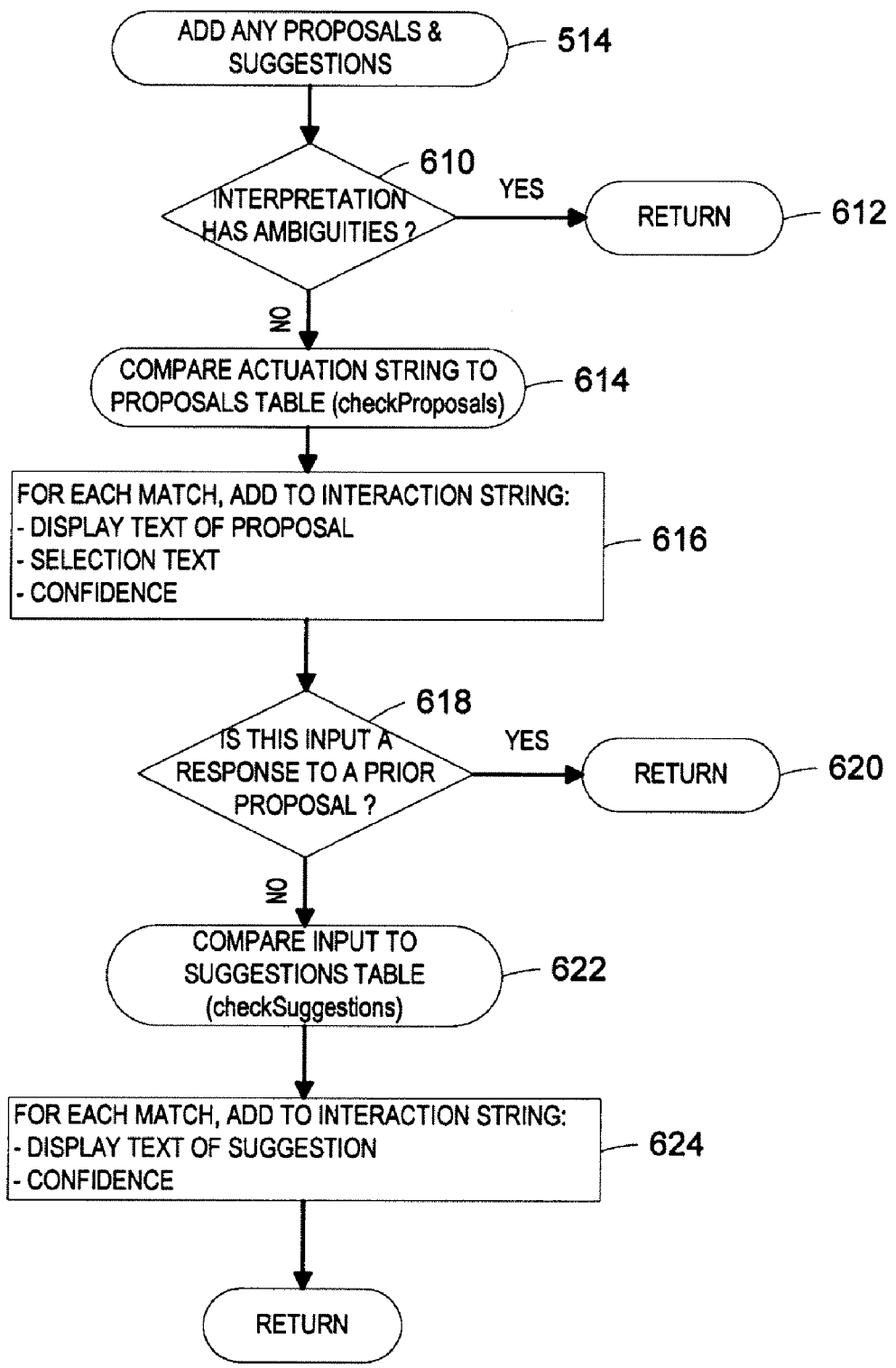
FIG. 6 is a flowchart of the step in FIG. 5 for adding any proposals and suggestions to the interaction string.

FIG. 6 is a flowchart of the step 514 for adding any proposals and suggestions to the interaction string. Some of these steps are also set out in more detail beginning with the "handleProposalSuggestion( )" method of class XMLActuation-Agent, which is incorporated herein from the java file named XMLActuationAgent.java.txt in the accompanying Computer Program Listing and Table Appendices. In step 610, it is first determined whether the interpretation includes ambiguities. If so, then the routine returns without trying to identify any proposals or suggestions (step 612). In step 614, if there are no ambiguities, the actuation agent 212 compares the actuation string to the target strings of proposals in the proposals database, in the manner described hereinafter, to identify any proposals that it has that are relevant to the actuation. In step 616, for each proposal match found, the actuation agent 212 adds to the interaction string the display text of the proposal, the selection text, and the confidence level with which it considers the proposal relevant. The agent can also add the attribute for maintaining context, if the embodiment supports it.

Because proposals are supposed to generate complete interpretations by themselves, the system does not try to make any new suggestions to the user if the current user input is in response to a prior proposal. In step 618, therefore, it is determined whether the current user input is a response to a prior proposal. If so, then the routine returns (step 620) without making any new suggestions. If the current user input is not a response to a prior proposal, then in step 622, the routine compares the user input token sequence to the target token sequences in the suggestions database, again in the manner described hereinafter, to identify any suggestions that it can consider relevant to the actuation. In step 624, for each suggestion match found, the actuation agent 212 adds to the interaction string the display text of the suggestion (which in the present embodiment is also the selection text string of the suggestion), and the confidence level with which it considers the suggestion relevant. The routine then returns to the caller.

Figure 7:
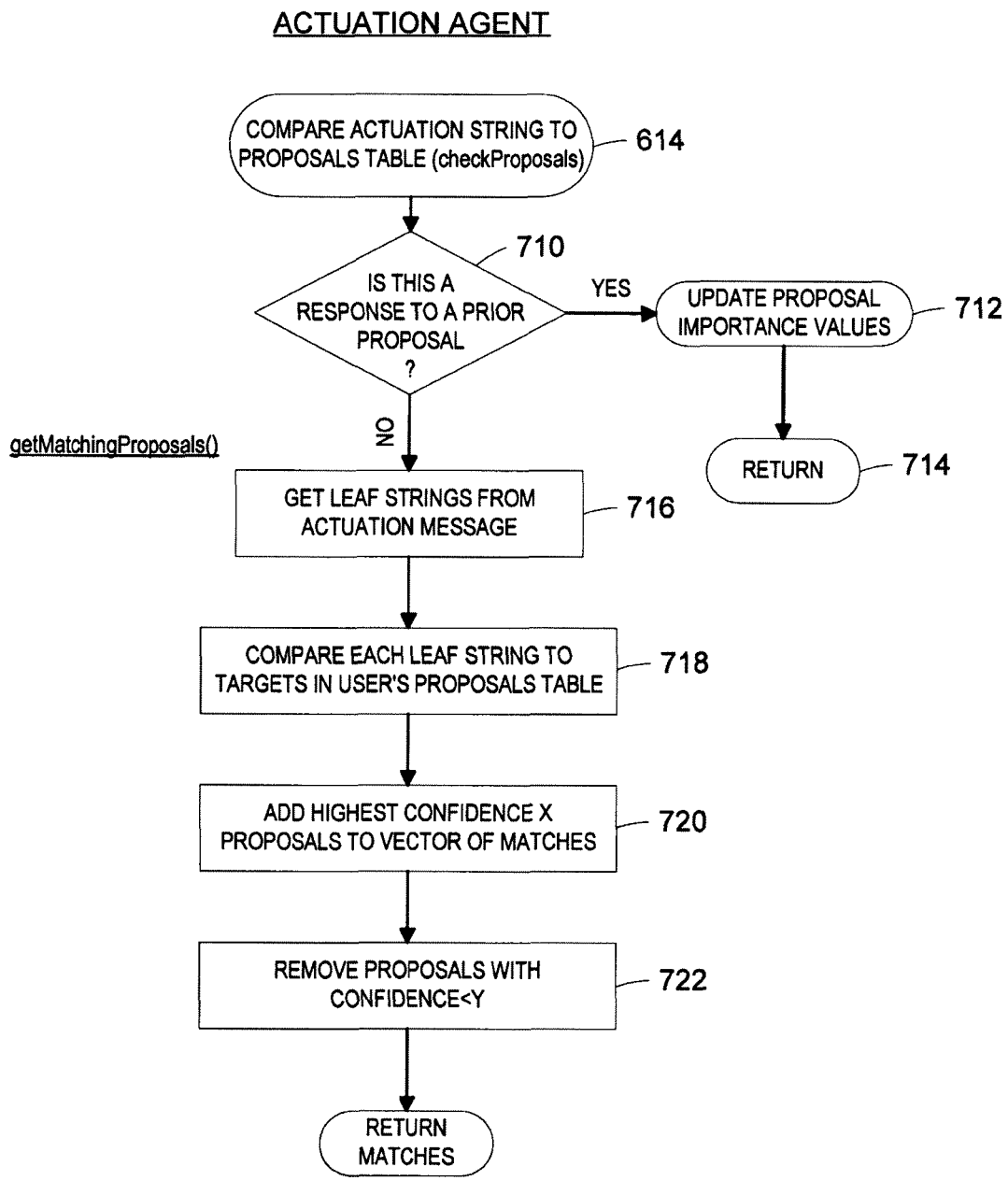
FIG. 7 is a flowchart of the step in FIG. 6 for comparing the actuation string to the proposals table.

FIG. 7 is a flowchart of the step 614 for comparing the actuation string to the proposals table. Some of these steps are also set out in more detail in the "checkProposals( )" and "getMatchingProposals( )" methods of class ProposalTable, which is incorporated herein from the java file named ProposalTable.java.txt in the accompanying Computer Program Listing and Table Appendices. In step 710, the routine first determines whether the current user input is a response to a prior proposal. If so, then the routine only updates in its proposals database the importance values of all the proposals that were offered to the user in the prior interaction (step 712). As described in more detail below, importance values are increased for proposals that were accepted by the user, and are decreased for proposals that were offered but rejected (not accepted) by the user. The decrease in importance values is commensurate with the confidence with which each proposal was considered relevant, so that proposals that were offered with higher confidence are punished more than proposals that were offered with lower confidence. The routine then returns without any additional proposals (step 714).

In step 716, the actuation message is expanded into complete "leaf" strings. Since the actuation strings in the present embodiment are represented in XML, expansion to complete leaf strings involves substitution of user input tokens for XML tags, deletion of XML disjunctive operators, and replication of segments having conjunctively connected portions to complete independent strings with the formerly conjunctively connected portions in separate strings. That is, For example, the following actuation XML:

```
<get>
    <or>
        <movieType> action </movieType>
        <movieType> thriller </movieType>
```

-continued

```
    </or>
    <movieTheatre> AMC6 </movieThreatre>
</get>
``` would be expanded into the following three leaf strings:

"get movieType action"
"get movieType thriller"
"get movieTheatre AMC6"

In step 718, each of the leaf strings is compared to each of the targets (also converted to leaf strings for the comparison) in the user's proposals table, and a confidence value is calculated for each proposal in the proposals database 220. The confidence value Cf, is the product of context value C, and the Importance value I of the proposal. The context value C is a measure of how well the target of the proposal matches the actuation string (as represented by the leaf strings), and the importance value is a measure of how much importance the user places on the association between the target and the proposal (i.e., how likely the user will be interested in this proposal if the actuation matched the target string of the proposal exactly). It is the latter value, I, that is adapted through reinforcement learning based on the user selection or non-selection of presented proposals. A benefit of having proposal selection based in part on a learned parameter is that those proposals that are presented to a user but not selected become less likely to be repeatedly displayed. On the other hand, those proposals that a user finds useful are more likely to be presented to the user again. Since both C and I are values between 0 and 1 in the present embodiment, confidence values Cf are also limited to this range.

The context value for a particular proposal relative to particular actuation is calculated using a correlation between the two. In particular, context is calculated using:

$$C = t/i * t/p = t^2/ip,$$

where C is the Context, t is the number of matching corresponding XML leaf strings found in both the user and proposal interpretations, i is the number of XML leaf strings in the user interpretation, and p is the number of XML leaf strings in the proposal interpretation. Note that Context will be a value between 0 and 1. As an example, consider the following example user interpretation XML:

```
<find>
    <movie>
        <movieStar>Harrison Ford</movieStar>
        <movieLocation>Sunnyvale</movieLocation>
    </movie>
</find>
``` and proposal target XML:

```
<find>
    <movie>
        <movieLocation>Sunnyvale</movieLocation>
    </movie>
</find>
```

The above interpretations give the following values: t=1, i=1, p=2, resulting in a Context of C=0.5. The XML leaf string that matches in this case is that associated with "Sunnyvale". It is possible to set up the matching process to ignore certain XML tags when comparing interpretations. For example, in an embodiment, the tags "<or>" and "<and>" are ignored. It is also possible to use a fuzzy text-matching algorithm for the leaf values themselves (which would be applied to "Sunnyvale" in the above example).

The advantage of calculating Context using XML interpretations rather than user input is that it allows context matching to be performed on the user and proposal intent, as opposed to the natural language phrasing of the user and proposal creator.

Proposals are selected for display to the user based on the confidence score. There is also a preset limit, in the present embodiment, on the total number of proposals to be presented to the user regardless of their confidence score. In step 720, therefore, only the proposals with the X highest confidence scores are added to a vector of proposal matches, where X is a predetermined number. In step 722, any proposals in the vector with a confidence score less than another predetermined value Y are removed. The routine then returns with the resulting vector of proposal matches.

Figure 8:
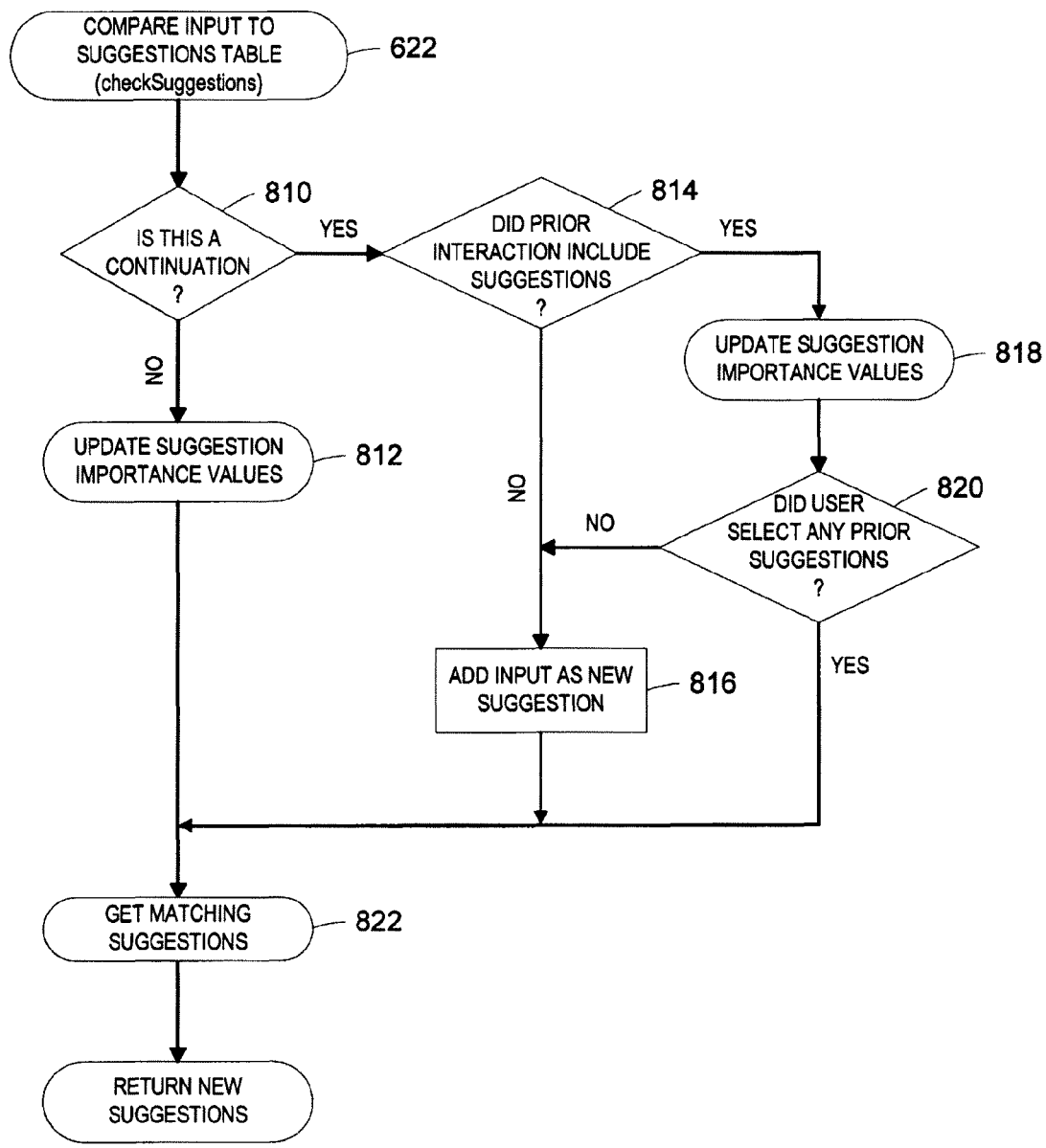
FIG. 8 is a flowchart of the step in FIG. 6 for comparing the actuation string to the suggestions table.

FIG. 8 is a flowchart of step 622 in FIG. 6, for comparing the actuation string to the suggestions table. Some of these steps are also set out in more detail in the "checkSuggestions( )" method of class SuggestionTable, which is incorporated herein from the java file named SuggestionTable.java.txt in the accompanying Computer Program Listing and Table Appendices. Initially, in step 810, the actuation agent 212 determines whether the present user input is a continuation of prior input. If not, then the procedure moves on to step 812, in which the importance values of suggestions, if any, that were offered to the user in the prior interaction, if any, are updated. If there were no suggestions offered in the prior interaction, then step 812 does not update any importance values. If there were, then the fact that the user decided not to continue the interaction means that the user has rejected all the suggestions that were offered. In the latter case, step 812 will punish all the suggestions offered as described hereinafter.

Whenever user input is a continuation of prior user input, the system can learn that the user sometimes follows the prior user input with the new user input. The system learns this as a new suggestion. Thus if step 810 determines that the present input is a continuation, then in step 814 it is determined whether the prior interaction included suggestions offered by the system. If not, then the system learns the new suggestion (step 816). In particular, the actuation agent 212 creates a new entry in the suggestions database 218 in which the target field contains the user's prior input phrase, the suggestion field contains the user's new input (response to the interaction), and an initial default value is written into the Importance field. An advantageous initial default value in this arrangement is around 0.8 because that would provide a bias towards more recently added suggestions. However, the system does not learn the new suggestion if the interpretation network 214 was completely unable to make an interpretation. Otherwise the system would be learning a useless suggestion, because the additional user input that would be submitted to the interpretation network if the user were to accept this suggestion would be just as uninterpretable then as it was the first time.

If step 814 determines that the prior interaction did include suggestions, then in step 818 the importance values of the suggestions offered to the user are updated as hereinafter described. In step 820 it is determined whether the user input includes selection of any of the suggestions that were offered in the prior interaction. Only if not is the new input used to learn a new suggestion in step 816. If the user input did include acceptance of a suggestion, then the system has already increased the importance value of the accepted suggestion in step 818.

Figure 9:
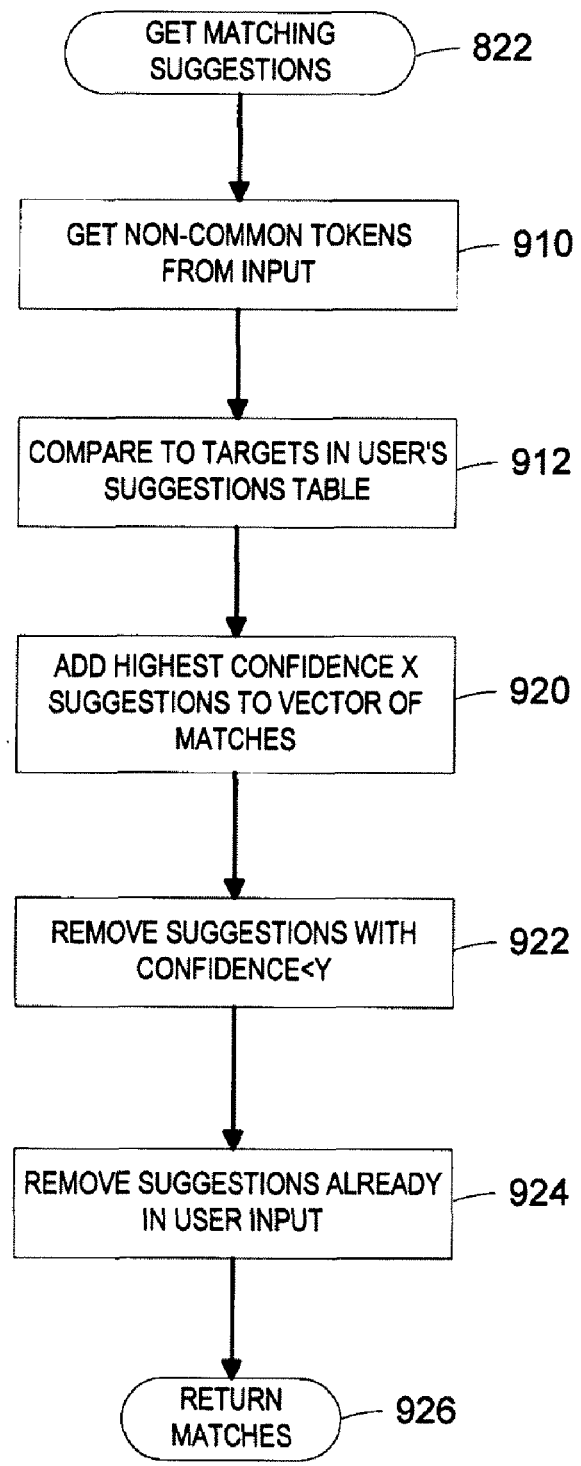
FIG. 9 is a flowchart of the step in FIG. 8 for determining whether any new suggestions can be offered to the user.

In step 822, regardless of whether any new suggestions were added or importance values were updated, the actuation agent 212 next determines whether any new suggestions can be offered to the user in a new interaction. FIG. 9 is a flowchart of step 822. Some of these steps are also set out in more detail in the "getMatchingSuggestions( )" methods of each of the classes SuggestionTable and Suggestions, both of which are incorporated herein from the java files named SuggestionTable.java.txt and Suggestions.java.txt, respectively, in the accompanying Computer Program Listing and Table Appendices. In step 910, a string is created that contains only the non-common tokens. This is because common and noise tokens are not counted in the context matching correlation. In step 912, the resulting modified input string is compared to each of the targets in the user's suggestions database 218, and a confidence value is calculated for each suggestion in the database. The calculation of confidence values for suggestions is the same as that for proposals, described above. In particular, the confidence value Cf, is the product of context value C, measuring how well the target of a suggestion matches the modified input string, and the Importance value I of the suggestion, adaptively measuring how likely the user is to accept the suggestion if the modified input matched the target string of the suggestion entry exactly. Again, the values C, I and Cf are each limited to the range of 0 to 1 in the present embodiment.

As with proposals, suggestions are selected for display to the user based on the confidence score and a preset limit on the total number of suggestions to be offered in an interaction. In step 920, therefore, only the suggestions with the X highest confidence scores are added to a vector of suggestion matches, where X is a predetermined number. In step 922, any suggestions in the vector with a confidence score less than another predetermined value Y are removed. X and Y for suggestions can be the same or different than the corresponding values for proposals.

In step 924, one final check is performed before a suggestion is returned as a match, and that is to ensure that the information content in the suggestion is not already contained in the user input. This is done by comparing the suggestion and user input on a token by token basis (with noise and common tokens removed). The comparison is performed using, for example, fuzzy matching (such as sub-string matching). If all the tokens in the suggestion are found in the user input, then the suggestion is not returned. This check is performed to stop the presentation of useless suggestions. For example if the user asked "show me action movies in Sunnyvale", the suggestion "in Sunnyvale" would not be returned regardless of the calculated Confidence value. This same check can also be performed in a particular embodiment for proposals, although preferably for proposals, the interpretation of the selection text is compared with the user input interpretation, to make sure the leaf strings of the selection text are not a subset of the leaf strings of the user input interpretation.

In step 926, the routine then returns with the resulting vector of suggestion matches.

Context-Based Reinforcement Learning

The reinforcement learning algorithm for Importance is the same for suggestions and proposals. No learning algorithm is needed for synonyms because the explicit learning of synonyms renders their importance effectively constant at 1.0. The learning algorithm calculates the average reward received over time received by a proposal or suggestion, starting with the initial assigned Importance value. For proposals, this initial value is set by the proposal creator and indicates the initial priority of the proposal. For suggestions, the initial value is set by system default upon creation of the suggestion. Only those proposals and suggestions presented to the user have their Importance values updated.

Importance values are updated in accordance with the following formula:

$$I_{k+1} = I_k + \frac{1}{1+k}[r_{k+1} - I_k],$$

where $r_{k+1}$ is the reward at step k+1 and $I_k$ is the Importance at step k. The reward received for the user acceptance of a proposal or suggestion is 1. The reward received by a proposal or suggestion that was presented to the user, but not selected, is based on the context value of the proposal or suggestion as follows:

$$r_{k+1} = [1-C^n]I_k$$

where C is the proposal Context, and n is a constant real number greater than or equal to 0. The default value for this constant is 1.0.

The scaling of reward for unselected proposals is used because it allows the reward to be modified based on Context. For example, if a proposal has a small Context value and was not selected, the reward is such that there is only a minor reduction in the Importance value (for the case where the proposal has zero Context, the reward received is the current Importance value, resulting in no change in the Importance). On the other hand, if a proposal has a large Context value, and was not selected, the reward received approaches 0. The system therefore punishes proposals and suggestions that it made but were rejected, to a greater degree if the system thought the match was good than if it thought the match was poor.

The above learning algorithm also allows for a type of unlearning, or forgetting, to occur. For example, in the case where there are two suggestions for the same user phrase (such as 'turn to sports' suggesting either 'turn to ESPN' or 'turn to FOX'). Since both phrases will have the same Context, the one selected more often will have its Importance increased, while the other will have its Importance reduced, eventually falling so low as to not even show up in the suggestion list.

The parameter n allows for the effect of Context on the reward to be scaled. Larger values of n result in little change in the Importance value if a proposal is not selected. As the value for n approaches 0, the reward for not being selected also approaches 0, regardless of the Context. As mentioned above, n is a constant real number greater than or equal to 0, and has a default value of 1.0.

Figure 10:
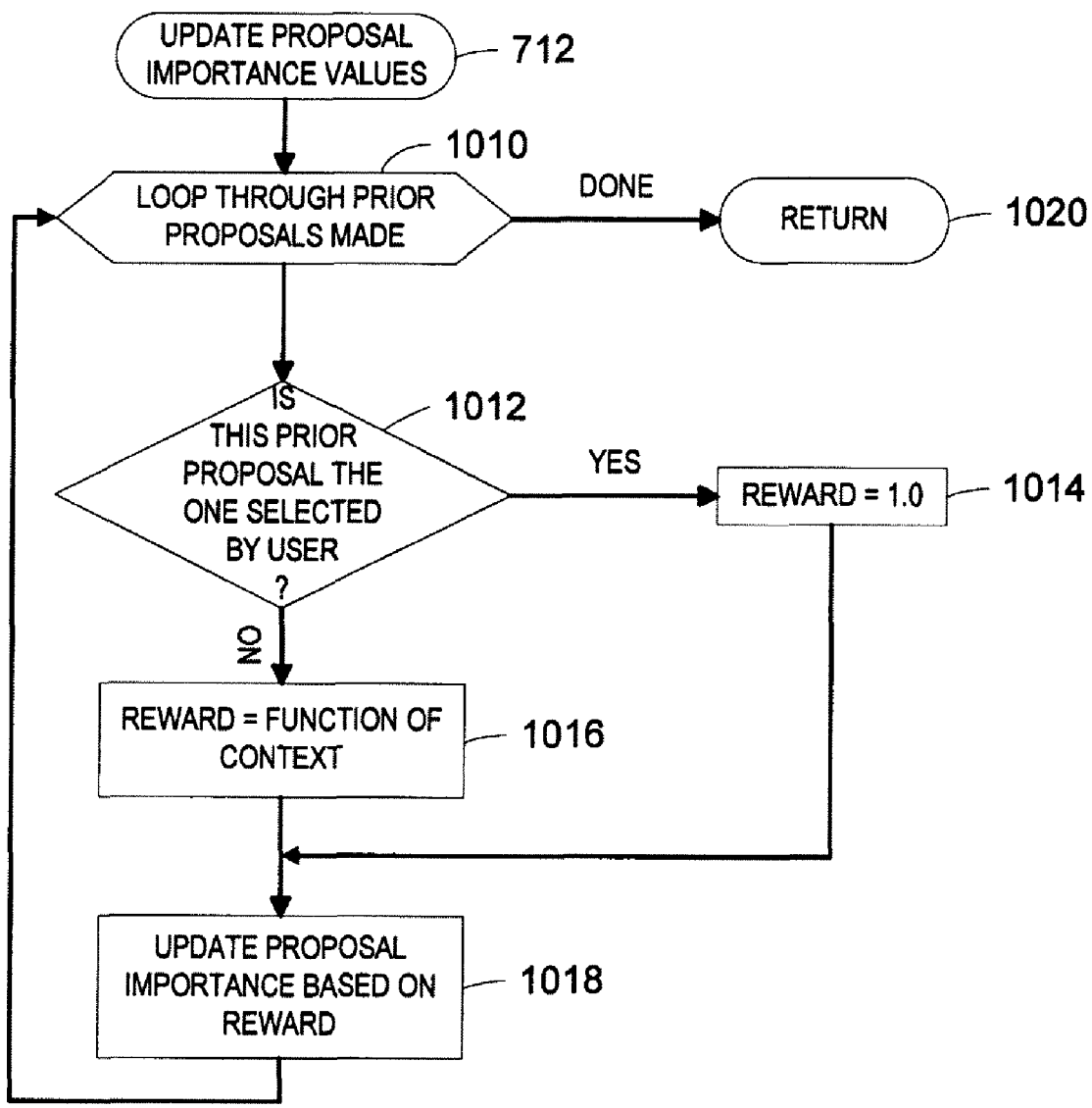
FIG. 10 is a flowchart of the step in FIG. 7 for updating proposal importance values.

FIG. 10 is a flowchart of the step 712 in FIG. 7, for updating proposal importance values. Some of these steps are also set out in more detail in the "updateImportance( )" method of class ProposalTable, which is incorporated herein from the java file named ProposalTable.java.txt in the accompanying Computer Program Listing and Table Appendices. In step 1010, the system loops through all the proposals that it made, if any, in the prior interaction, if any. For each proposal, step 1012 determines whether the proposal was accepted by the user. If so, then the reward value $r_{k+1}=1.0$ is assigned (step 1014). If not, then in step 1016 the reward value is assigned as a function of context, using the formula set forth above. In either case, in step 1018 the importance value of the proposal is updated based on the assigned $r_{k+1}$, and the loop continues with the next proposal made (step 1010). When the importance values of all proposals made in the prior interaction have been updated, or there were none made, then the routine returns (step 1020).

Figure 11:
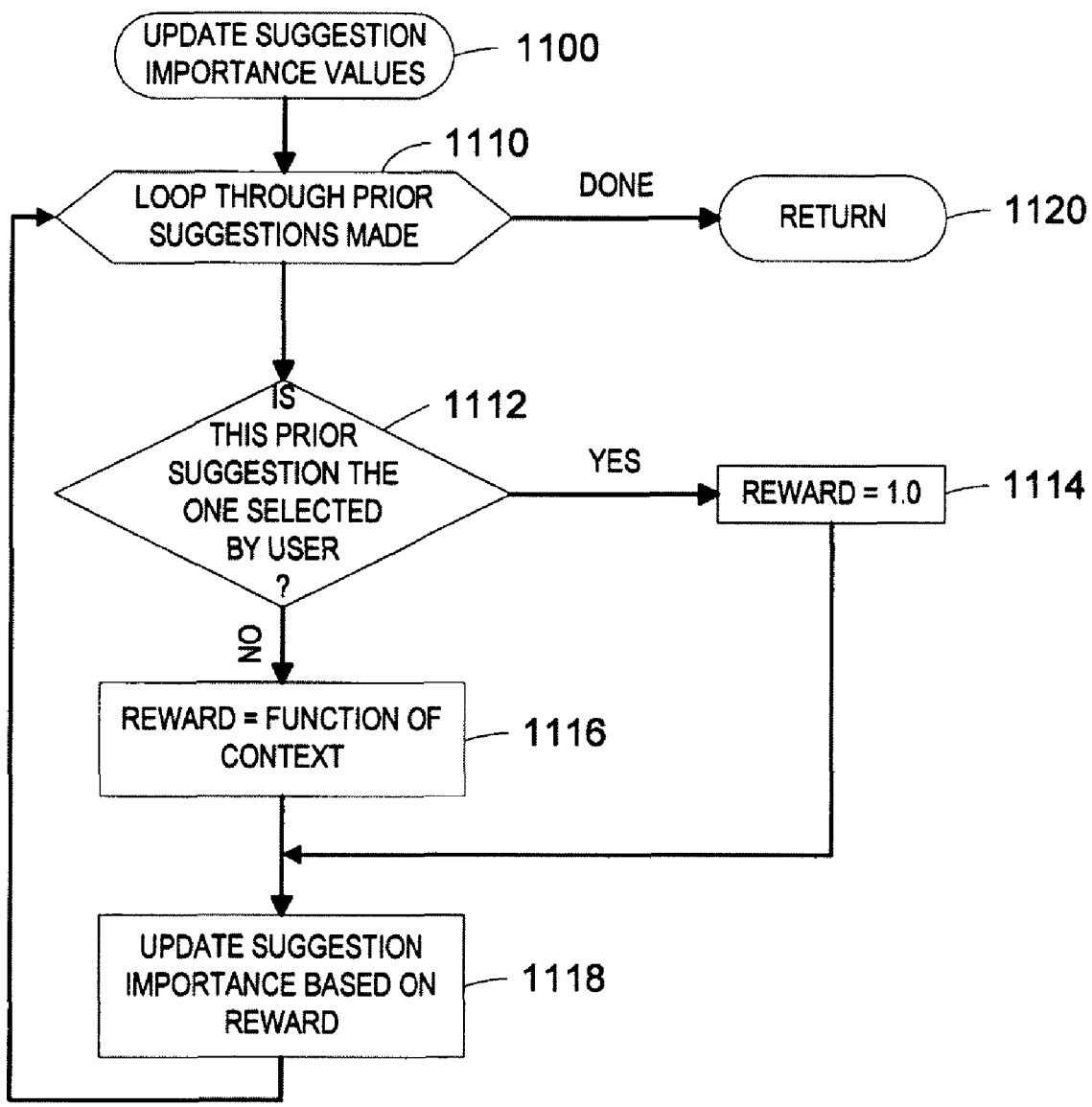
FIG. 11 is a flowchart of the steps in FIG. 8 for updating suggestion importance values.

FIG. 11 is a flowchart of each of steps 812 and 818 in FIG. 8, for updating suggestion importance values. Some of these steps are also set out in more detail in the "updateImportance( )" method of class Suggestions, which is incorporated herein from the java file named Suggestions.java.txt in the accompanying Computer Program Listing and Table Appendices. In step 1110, the system loops through all the suggestions that it made, if any, in the prior interaction, if any. For each suggestion, step 1112 determines whether the suggestion was accepted by the user. If so, then the reward value $r_{k+1}=1.0$ is assigned (step 1114). If not, then in step 1116 the reward value is assigned as a function of context, using the formula set forth above. In either case, in step 1118 the importance value of the suggestion is updated based on the assigned $r_{k+1}$, and the loop continues with the next suggestion made (step 1110). When the importance values of all suggestions made in the prior interaction have been updated, or there were none made, then the routine returns (step 1120).

Implementation of Synonyms

As mentioned, while synonyms can in some embodiments be learned through implicit learning, preferably they are learned explicitly. The process followed for synonym learning is that an agent, or group of agents, either in the interaction agent 210, the actuation agent 212 or the interpretation network 214, receives all input from the user and attempts to parse the input to extract a synonym. Preferably synonym recognition agents are included as part of the interpretation agent network itself, so that recognition of a synonym command occurs along with and in competition with other agent claims. If a synonym recognition agent makes a winning claim, then the synonym is added to the synonyms database 216. If a synonym already exists in the database for the same target phrase, then the new synonym is added at the front of the synonyms list. This ordering of the list allows unlearning to occur, while still retaining old synonyms.

A simple synonym extraction algorithm is given in the file named extractSynonyms.txt in the accompanying Computer Program Listing and Table Appendices. It is able to parse and extract the following synonyms (note that compound definitions are also handled).

```
'When I say sports I mean ESPN'
potential terms not understood: 'sports'
synonyms generated: 'sports' = 'ESPN'
'sports is ESPN and flick equals movie'
Potential terms not understood: 'sports flick'
synonyms generated: 'sports' = 'ESPN', 'flick' = 'movie'
'Remember that around here is Sunnyvale or Mountain View'
Potential terms not understood: 'around here'
synonyms generated: 'around here' = 'Sunnyvale or Mountain View'
```

In an AAOSA-based system, instead of using explicitly programmed software to extract synonyms, synonyms are more preferably extracted using the fundamental capabilities of the agent network itself. In this embodiment, an agent or group of agents is defined, for example as a standard part of an interpretation network such as 214, which contains interpretation policies that make claims on portions of user input that evidence a user intent to create a synonym. If the claim is successful, then the action part of the policy causes the synonym to be written into the synonyms database 216. An example set of policies that can implement synonym extraction in this manner is as follows, using the Opal language:

```
(START:
    "
    ('when I say'| 'and ' | 'learn that' | 'remember that')
        {attributes:'private'}
    "),
(EQUALS:
    "
    ('is the same' ['thing'] 'as' | 'means'| 'equals' |'i mean' | '=')
        {attributes:'private'}
    "),
(SYNONYM1:
    "
    [START] ?
        {attributes:'private'}
        {action:
            {execute:? }}
    "),
(TARGET1:
    "
    SYNONYAM1 < EQUALS ?
        {action:
            {execute:'Synonym = ',SYNONYM1,' Target = ',? }}
    "),
(CATCH:
    "
    TARGET1+
    ")
```

The above set of policies make claims on input that uses terms like 'when I say', 'and', 'learn that', 'remember that', 'is the same as', 'is the same thing as', 'means', 'equals', 'i mean', and '=', and if the claim wins, executes the action part of policy TARGET1. The action part of TARGET1 creates an actuation string of the form: 'Synonym=[synonym string] Target=[Target string]'. The actuation agent 212 then includes the ability to recognize an actuation string of this form, and to write the new synonym into the synonyms database 216 in response.

In an AAOSA-based implementation, synonyms are preferably applied on a per agent basis in the following manner to enhance the interpretation of user input. Before each policy makes its claims it checks the input to see if there are any synonyms for any input (target) tokens. In one embodiment each agent checks or queries the synonyms database 216 for this information, but in a more preferred embodiment, this check is performed once for all agents, by the interaction agent 210, as set forth above in step 328 (FIG. 3). When the input arrives at an individual agent in the interpretation network 214, it includes the targets and synonyms in a synonyms field of the user input document. The individual agent then checks each synonym in the input document, and if the target string matches any of the string tokens in the agent's policies, the target tokens are added to the policy with a disjunctive (OR) operator. The policies then make claims as normal.

For example, assume a user input "turn to sports", with a synonym of "ESPN" for the target token "sports". Assume further that an individual agent in the interpretation network 214 includes the following policy:

```
(P1:
    "
        "ESPN"
            {action:
                {execute:* }}
    ")
```

At run time, the policy checks all its string tokens (only "ESPN" in this case), and expands them with an OR operator and the target token of the matching synonym. Continuing the example, the policy executed at run time becomes:

```
(P1:
    "
        "ESPN" | "sports"
                    {action:
                    {execute:* }}
    ")
```

The policy then executes as normal. In this way the policy P1 will make a claim on "sports" from the user input "turn to sports", and it will be handled in the same manner as if the user input had been "turn to ESPN".

In an alternative embodiment, agents try their policies first against the native user input string. Then, if synonyms are present, the synonym is substituted in place of its target in the input string, and each policy is rechecked to see if it can now make a claim. Multiple synonyms for the same string are tried sequentially. Multiple synonyms for different strings are tried in the order they are encountered in the policy.

INDUSTRIAL APPLICABILITY

Thus it can be seen that synonyms, suggestions and/or proposals implemented in conjunction with a natural language interpretation interface to a back-end application, can help the system seem more intelligent and be able to interact in a more natural manner with the user. It can also be seen that a learning method for synonyms, suggestions and proposals can be advantageous because learning can be on a per user basis, it can be implemented as a modular system that can be inserted and removed at any time, it reduces the likelihood of producing unwanted results, and allows the unlearning of synonyms. Any one, two or all three of the concepts can be implemented in a particular embodiment, although implementation of two or all three in a single embodiment is most preferred.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. As one example, additional factors that may be taken into account when calculating context values include token adjacency and ordering. As another example, a particular embodiment could allow suggestions and/or proposals to be enabled or disabled on a system-wide or on a per-user basis. Suggestions and/or proposals can be enabled and disabled in response to a natural language command entered by the user and interpreted by the NLI 116. As other examples, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

APPENDIX A

Dejima Policy Reference

Platform 3.0

1 Introduction

Policies are written in a language called OPAL. This reference intends to describe the OPAL language. The current version of the platform can run in backward compatibility mode. In this mode some of the features described in this document would not be available. The comment "(not available in backward compatibility mode)" is written in front of each of these features. Set the system property USE_AMBIGUITY_XML to also to run the platform in the backward compatibility mode. Example: java–DUSE_AMBIGUITY_XML=false IDE.

2 Policy

An AAOSA agent uses a set of policies to make claims on the input and to make actions based on those claims.

2.1 Overview of Claim

A claim is the part of the input that an agent policy recognizes as part of its domain. A claim may be built by putting together claims made by other policies or other agents. For example a HOME_ENTERTAINMENT policy may make claims based on claims made by a TV policy and a VCR policy. We would refer to TV and VCR claims as sub claims in the context of the HOME_ENTERTAINMENT claim.

2.2 Propagation of Claims

An AAOSA agent will use its policies to process the input when it receives an initiate interpretation, interpretation or reinterpretation message. Agents process the input in order from first policy declared in the agent to the last policy. Each policy makes all the claims it can on the input. Following policies can access these claims. After all policies have made their claims the agent selects the best claim. If the best claim is made from a non-grammatical condition (e.g. combo), then the sub-claims are also selected. The selected claims are handed up to up chain agents (i.e. using claim message).

2.3 Actuation of Claims

An Actuation is a standardized output. The actuation phase begins when the top AAOSA agent selects its best claim. The top agent will actuate the best claim using the action part of the policy that made that claim. The policy's action dictates whether the actuation of the claim should be delegated to other policies or agents. If the actuation is delegated to another agent a delegation message is sent to that agent. When an AAOSA agent receives a delegation message for actuating a claim, it will use the policy responsible for making that claim to actuate it. Each policy will either actuate the claim entirely or delegate parts of the actuation to other policies or agents responsible for making its sub claims.

2.4 Overview of Policy Components

A policy can have several components:

Name: Makes it possible to refer to the policy in OPAL language.

Title: Make it possible to refer to the policy in the interactions and means.

XML tags: Makes it possible to wrap the action in ML tags

Priority: Priority the claim made by this policy.

Continuation: Sets the dependency of the claim to the claims made on previous input Condition: Makes claims by processing the input A condition could be:

Terminal: Atomic operands of OPAL language.

References: Operands referring to claims made by other conditions.

Unary: A condition with only one operand.

Binary: A condition with two or more operand.

Action: Creates an action from a claim

3 Claim

A claim quantifies how well an input matches a policy condition. The information associated with a claim includes:

3.1 Owner

The name of the policy making the claim and the agent to which that policy belongs.

3.2 Focus

The parts of the input matched by the policy condition. Focus is represented using the character indexes of the input. (Characters in the input are indexed from 0). For example, focus [5 . . . 8] represents the word 'book' in the input 'Sell book'. The characters of the input that correspond to the token separators (for example, white space) are never considered to be part of the focus. Therefore, a policy condition that matched 'Sell' and 'book' would have focus [0 . . . 3,5 . . . 8]. However, when there is no chance of confusion, for convenience this focus would be written as [0 . . . 8].

3.3 Priority

The precedence of the claim. (For details on assigning priorities to claims, see the Policy Components section.) Priorities are local to an agent. When an agent sends a claim to an up chain agent, the priority is reset to 0. The exception is priorities that are assigned for adding dialoging focus. These priorities are passed up-chain with the claim.

A vector is kept of all different priorities that were associated to sub-claims building up a claim. The focus size of the sub-claims with the same priority will be added up and would be kept in the vector.

Example 1

The Priority Vector of Claim on 'aaa bb' Made by policy P3

| | P1: 'aaa' {priority:+1} | |
|---|---|---|
| | P2: 'bb' {priority: 0} | |
| | P3: P1 & P2 | |
| | User-Input: 'aaa bb' | |
| Priority | 1 | 0 |
| Focus size | 3 | 2 |

The priority criterion of two claims will be compared in the following manner:

1. The claim with highest priority will be chosen as the better claim.
2. If both claims have the same highest priority then the coverage percentage of that priority is compared. The coverage percentage is the focus size of that priority divided by the total focus size of that claim. The claim that has the higher coverage percentage will be chosen as the better claim
3. If both claims have the same coverage on their highest priority then that vector will be compared again from step 1 disregarding the highest priority.

3.4 Ambiguity

A claim is said to be ambiguous if it contains two or more sub-claims with overlapping focuses. The ambiguity of the claim is equal to the number of ambiguous sub-claims that are found in the claim, including the claim itself.

3.5 Connection Weight

The total sum of connection weights assigned to operators making the claim. Each operator and operand has a predefined grammatical weight. The operators and operands in descending order of grammatical weight are:

1. Combo (,) and Recursive (+). Weight=8. (loose connection)
2. Inexact matches. Weight=10000.
3. And (&). Weight=100.
4. Ordered (<). Weight=1.
5. Adjacent (and all other operators and operands). Weight=0.

3.6 Loose Connections Count

The number of Combo (,) or Recursive (+) operators used to make a claim.

3.7 Unknown

Used to identify the number of items missing in the user input (deprecated). See Section 3-3-4 on <unknown if missing> condition.

3.8 Adjacency Score

Indicates the relative closeness of the claimed parts of the input. Adjacency score is calculated by adding up the number of tokens between claimed parts. If a claim has marked 'Siamak' and 'Hodjat' on the input "Siamak is a Hodjat", its adjacency score is 2. A claim marking 'Sia' and 'Hodjat' on input "Siamak is a Hodjat", will also have adjacency score of 2, because 'Sia' is part of the 'Siamak' token, but the same claim will have an adjacency threshold of 5 on the input "Siamak's family name is Hodjat" (Assuming the default USTokenizer is used). The following table shows the how adjacency score is calculated for different inputs claimed by the policy: 'aaaaa' & 'bbbbb'.

Example 2

Computing Adjacency Score

| Input | Adjacency score |
|---|---|
| aaaaa bbbbb | 0 |
| aaaaa bbbbb | 0 |
| aaaaas bbbbb | 0 |
| Aaaaa cc bbbbb | 1 |
| Aaaaa cc dd bbbbb | 2 |
| Aaaaa's bbbbb | 2 |

Note that adjacency is handled slightly differently in the case of the combo operator. See the section on the combo operator for details.

3.9 Variable

Variables mark parts of the input that is not claimed by other conditions in a policy. Variables are adjustable and the part they mark may vary as the claim is manipulated (see variable condition).

4 Claim List

All claims made by policy conditions are added to an ordered list. The default criteria used to order the claims is as follows, listed in the order in which they are considered when comparing two claims. Each criterion is checked only if none of the criteria above it would apply. If two claims are equivalent with respect to all of the criteria, the claim that was made by the policy listed later in the Agent will win.

4.1 Coverage

A claim whose focus includes another claim's focus wins. If the focuses are equivalent, neither is considered to cover the other. For example, a claim made on 'Being John Malkovich' with focus [0 . . . 4][6 . . . 9][11 . . . 19] will win over a claim with focus [6 . . . 9][11 . . . 19]. However, if two claims both had focus [0 . . . 4], the claims would be equivalent in terms of the coverage criterion.

4.2 Priority

A claim with higher priority wins. If the priorities are the same, the claim with the higher priority score will win. (See the Policy Components section on Priority for details on how priority and priority score are assigned.)

4.3 Ambiguity

A claim with more ambiguity wins. This criterion is checked only if the current claim can be merged with the claim it's compared to. (See Claim Manipulation in Appendix 3 for further information.) If two claims have equivalent ambiguity, the ambiguity due only to the current claim is compared. If this differs, the claim with the smaller local ambiguity will win (regardless of whether the two claims can be merged).

4.4 Connection Weight

A claim made by more grammatical operators and exactly matched operands wins (that is with smaller connection weight). If the connection weights of two claims are equal then the claim with fewer loose connections wins.

4.5 Adjacent

A claim with smaller adjacency score wins.

4.6 Focus Size

A claim with a larger focus wins. For example, a claim made on 'Sell Book and Buy Toy' with focus [0 . . . 3][5 . . . 8], will win over a claim with focus [9 . . . 11][13 . . . 15]).

4.7 Match Restrictiveness

A claim using a more restrictive token matcher wins. The most restrictive token matcher is the exact token matcher, which has a restrictiveness of 100. The substring token matcher has a restrictiveness of 60.

4.8 Variable

When comparing two claims the claims with no variables is better than a claim with variables. If both claims have variables then the one with more variables but smaller ones is preferred to the one with less but wider variables (see variable condition).

4.9 Unknown (Deprecated)

A claim with unknown element(s) will win over a claim with no unknown elements. If both claims have unknown elements the one with less unknown elements wins.

4.10 Default Criterion:

A claim, which its focus is closer to the beginning of the input wins.

5 Policy Components

5.1 Name

Used to refer to the policy in the OPAL language. A policy name is a series of capital letters ('A' to 'Z'), digits ('0' to '9') or under score ('_') that begins with a capital letter. Policies names should be unique (in the scope of the agent they are declared in).

5.2 Title

Used to refer to the policy in interactions and menus. Spaces/symbols can be used in the title and it does not need to be in capital letters. The title is a literal and is automatically enclosed in quotes.

5.3 XML Tags (not Available in Backward Compatibility Mode)

Figure 12:
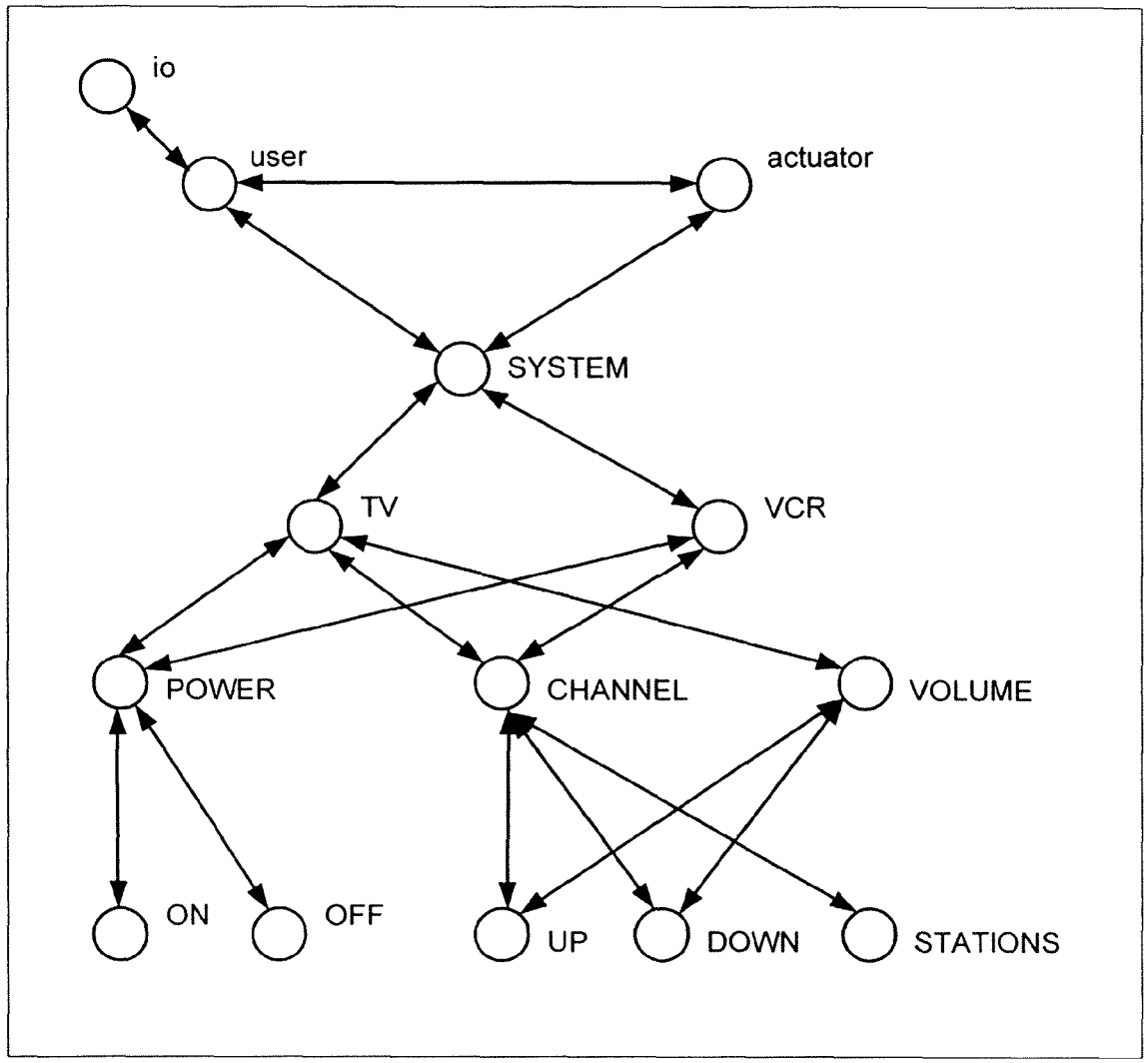
FIGS. 12-17 are diagrams of example agent networks and sub-networks.

The interpretation network will support the generation of output that contains XML tags. This section will discuss the types of tags that will be used and how they are generated. It will use the AV Network as an example. See FIG. 12.

An XML tag is made up of three components
1. name: The name of the tag
2. parameter: The name of a tag parameter. Each tag may have 0 or more parameters.
3. value: The value of a tag parameter. Each parameter must have exactly one value.

A basic XML tag has the form:

<<name> [<parameter>="<value>"]> </<name>>

For example, a tag having two parameters would have the form:

<name parameter1="value1" parameter2="value2"> </name>

The interpretation network supports two parameters, type and ID. These are discussed in more detail later. For now, just note that the general form of an XML tag generated by the network is:

<name type="value1" ID="value2"> </name>

The XML tags that are supported by the interpretation network can be divided into four groups (two of which consist of a single tag):
1. The interpretation tag
2. The ambiguity tag
3. The logical tag
4. Domain specific tags The first three groups are common to all applications. The domain specific tags vary from application to application.

The tags are generated in two ways. The interpretation tag and the ambiguity tag are generated automatically by the interpretation network. The logical tags and domain specific tags are generated by setting the xml-tag and xml-type fields in the policy of a network agent.

As mentioned above, the system supports two parameters: type and ID. The type parameter is optional. For logical and domain specific tags, it can be specified by setting the xml-type field of a policy. The ID parameter is generated automatically by the system. Its value is equal to the ID of the claim that is being actuated by the policy.

| Tag Name | Type (optional) | Data Values |
|---|---|---|
| XML Tags Generated Automatically by the System | | |
| interpretation | none | none |
| xor | relation | none |

-continued

| Tag Name | Type (optional) | |
|---|---|---|
| XML Logical Tags Common to All Applications | | |
| and | relation | none |
| or | relation | none |
| lessThan | relation | none |
| greaterThan | relation | none |
| ifThen | relation | none |
| AV Network Application Specific XML Tags | | |
| | | Values |
| TV | function | none |
| VCR | function | none |
| Power | parameter | none |
| Channel | parameter | none |
| Volume | parameter | none |
| On | attribute | none |
| Off | attribute | none |
| Up | attribute | none |
| Down | attribute | none |
| Station | attribute | PBS, CBS, NBC, etc. |

Example 3

Simple Command

```
Input:  'Turn TV on'.
XML: <interpretation>
        <TV type="function" ID="1_">
          <power type="parameter" ID="2_">
            <on type="attribute" ID="3_">
            </on>
          </power>
        </TV>
     </interpretation>
```

Example 4

Simple Command: Attribute with Values

```
Input:  'Turn TV to PBS'.
XML: <interpretation>
        <TV type="function" ID="1_">
          <channel type="parameter" ID="2_">
            <station type="attribute" ID="3_">
              PBS
            </station>
          </channel>
        </TV>
     </interpretation>
```

Example 5

Compound Attributes

```
Input:  'Turn on TV to PBS'
XML: <interpretation>
        <TV type="function" ID="1_">
          <and type="relation" ID="2_">
```

-continued

```
            <power type="parameter" ID="3_">
              <on type="attribute" ID="4_">
              </on>
            </power>
            <channel type="parameter" ID="5_">
              <station type="attribute" ID="6_">
                PBS
              </station>
            </channel>
          </and>
        </TV>
     </interpretation>
```

Example 6

Compound Commands

```
Input:  'Turn VCR off and TV volume down.'
XML: <interpretation>
        <and type="relation" ID="1_">
          <VCR type="function" ID="2_">
            <power type="parameter" ID="3_">
              <off type="attribute" ID="4_">
              </off>
            </power>
          </VCR>
          <TV type="function" ID="5_">
            <volume type="parameter" ID="6_">
              <down type="attribute" ID="7_">
              </down>
            </volume>
          </TV>
        </and>
     </interpretation>
```

Example 7

Ambiguity

```
Input:  'Turn off.'
XML: <interpretation>
        <xor type="relation">
          <TV type="function" ID="1_">
            <power type="parameter" ID="2_">
              <on type="attribute" ID="3_">
              </on>
            </power>
          </TV>
          <VCR type="function" ID="4_">
            <power type="parameter" ID="5_">
              <on type="attribute" ID="6_">
              </on>
            </power>
          </VCR>
        </xor>
     </interpretation>
```

5.3.1 Generating XML Tags

Syntax: {XML tag: tag-name}

XML tag goes after the policy condition.

Example 8

Generating XML Tags

```
Policy::
(THEATERNAME:
    "
        'AMC'|'century21
            {xml-tag:'theaterName'}
            {action:
                {execute:*}}
    "),
Input:   'amc'
Output:  <theaterName ID="1__"> amc </theaterName>
```

5.3.2 Generating XML Type Tags

Syntax: {XML tag: tag-name}

XML type tag goes after the XML tag. XML type is valid only if XML tag is provided for the policy.

Example 9

Generating XML Type Tags

```
Policy::
(THEATERNAME:
    "
        'AMC'|'century21
            {xml-tag: 'theaterName'}
            {xml-type: 'attrib'}
            {action:
                {execute:*}}
    "),
Input:   'amc'
Output:  <theaterName type="attrib" ID="1__"> amc </theaterName>
```

5.3.3 Ambiguity Tags

Ambiguity tags are generated automatically.

Example 10

Generating XML Type Tags

```
Policy::
(MOVIENAME:
    "
        'john malkovich'
            {xml-tag: 'movieName'}
            {xml-type: 'attrib'}
            {action:
                {execute:*}}
    "),
(MOVIESTAR:
    "
        'being john malkovich'
            {xml-tag: 'movieStar'}
            {xml-type: 'attrib'}
            {action:
                {execute:*}}
    "),
```

-continued

```
(MOVIE:
    "
        MOVIENAME, MOVIESTAR
            {xml-tag: 'movie'}
            {action:
                {execute:*}}
    "),
Input:   'john malkovich'
Output:
<movie ID="1__"><ambiguity>
<movieName ID="2__">john malkovich</movieName>
<movieStar ID="3__">john malkovich</movieStar>
</ambiguity></movie>
```

5.3.4 Backward Compatibility

Using the backward compatibility mode will stop the automatic generation of the ambiguity XML tags and would prevent the XML tag and XML type from showing in the tee mode of policy editor.

5.4 Priority

The priority assigned to a policy. A policy's priority is assigned to all claims made by that policy.

Of the criteria used to order the claim list, priority is the only one that can be set explicitly in the policy. Priority is the second criterion used when comparing two claims; coverage is compared first. If two claims are equal in terms of coverage, then the one with a higher priority will win. Therefore, priority provides the policy writer with a good amount of control over which policy should produce the winning claims.

The default priority is 0. Priority can explicitly be set to any integer between −1000 and +1000, inclusive. A positive integer will give the claims made by the policy higher priority; a negative integer will give them lower priority.

A list is kept of all different priorities that were associated to sub-claims building up a claim. The focus of the sub-claims with the same priority will be added up and would be kept in the list.

Example 11

The Priority List of Claims

```
P1: 'aaa' p=1
P2: 'bb' p=2
P3: 'cccc' p=2
P4: (A B) & C
User-Input: "cccc aaa bb".
```

| Priority | 2 | 1 |
|---|---|---|
| Focus size | 5 . . . 7 | [0 . . . 3][9 . . . 12] |

The priority criterion of two claims will be compared in the following manner:

1. The claim with highest priority will be chosen as the better claim
2. If both claims have the same highest priority then the coverage percentage of that priority is compared. The coverage percentage is the focus size of that priority divided by the total focus size of that claim. The claim that has the higher coverage percentage will be chosen as the better claim.
3. If both claims have the same coverage on their highest priority then that vector will be compared again from step 1 disregarding the highest priority.

Priority is used only for ordering the claim list of the agent containing the policy. When an agent passes a claim up chain, the priority of the claim is removed.

5.5 Continuation (not Available in Backward Compatibility Mode)

The continuation field provides support for recognizing continuation in the interpretation network.

For example consider the following dialog:
01 User "Movies starring Tom Hanks"
  System: Lists all movies staring Tom Hanks
02 User: "And Meg Ryan"
  System: Lists all movies starring Tom Hanks and Meg Ryan The interpretation network should recognize that the input 02 depends on the input 01.

The "continuation field" is used to indicate if the interpretation of an input depends on the interpretation made on the previous input. The continuation field has the following syntax (which goes right after the policy condition):
{continuation: join}

Example 12

Current Input is a Continuation

```
P1:
/BOI 'and'
/*
/BOI is a terminal condition that claims the beginning of the input
*/
    {continuation: join}
    {action: {execute: 'Recognized dependency' }}
```

Whenever a policy is a join continuation then any claims made by that policy will be tagged as continued. Lets say the claim made by a policy with a {continuation: join} field would be part of the winning claim. If this is true then the input is going to be reinterpreted based on the claims made on the previous input. So in the above example the "And Meg Ryan" input will be claimed with dependency to the previous input ("Movies staring Tom Hanks") and therefore "And Meg Ryan" will be reinterpreted again but this time the claims made on the previous input ("Movies starring Tom Hanks") would be used.

5.6 Condition

Used to make claims from the input. Each condition will return a claim list of all claims it produces. There are four types of conditions: terminal, reference, unary and binary.

5.6.1 Terminal Condition

There are four types of terminal conditions:

Token Terminal Predefined patterns retrieved from a string, a file or a database.

Number Terminal: Refers to claims made by other policies within the same agent.

Symbol Terminal: Refers to claims made by other agents.

Type Terminal: Refers to a part of the input not clam 5.6.1.1 Token

Tokens are identified based on the following parameters:
1. Alphabet Defines letters as the normal token type. Example: Characters 'a' to 'z' define the English alphabet.
2. Number Defines digits as the numeric token type.
3. Symbol: Defines special characters (i.e. not alpha or number) as the token type.
4. Delimiters: Defines what may separate tokens (e.g. white space, tabs, new line . . . ).
5. Tokenizer class: The class used to identify tokens based on the above parameters.

The above parameters are defined in properties/ParserParameters.xml. Whatever is not included as an alphabet, numeral or symbol is considered a delimiter by the tokenizer.

Example 13

Defining Alphabet in ParserParameters.xml

```
<Policy:Alphabet>
<Policy:CharacterRange lowerLimit="a" upperLimit="z"  />
<Policy:CharacterRange lowerLimit="A" upperLimit="Z"  />
<Policy:CharacterRange lowerLimit="　" upperLimit="￮"  />
</Policy:Alphabet>
```

Example 14

Defining Numerals in ParserParameters.xml

```
<Policy:Numeric>
<Policy:CharacterRange lowerLimit="0" upperLimit="9"  />
</Policy:Numeric>
```

Example 15

Defining Symbols in ParserParameters.xml

```
<Policy:Symbols>
<Policy:CharacterRange lowerLimit="!" upperLimit="/" />
<Policy:CharacterRange lowerLimit=":" upperLimit="@" />
<Policy:CharacterRange lowerLimit="[" upperLimit="`" />
<Policy:CharacterRange lowerLimit="{" upperLimit="~" />
</Policy:Symbols>
```

Note that based on example 11, the symbol $ will be recognized as a symbol because it is in the range between "!" and "/". But the symbol £ will not be recognized because it is not in any of the defined ranges. For it to be recognized as a symbol a new range would have to be added to the symbol definition ("£" is the Unicode for £).

Example 16

Recognizing the £ Sign

```
<Policy:Symbols>
...
<Policy:CharacterRange lowerLimit="£" upperLimit="£"/>
</Policy:Symbols>
```

Other than the above-mentioned parameters, customized tokenizer classes may introduce application or language dependent types. The custom tokenizer class should replace USTextTokenizer in ParserParameters.xml.

A token is any stream of characters of the same type (e.g. alphabet, number, symbol) separated by delimiters or other tokens. Symbols are exception to this rule because symbols are broken up character by character.

Example 17

Tokenizing

| Input | Tokens |
|---|---|
| 'John Smith' | 'john', 'smith' |
| 'mp3' | 'mp' (alphabet), '3' (number) |
| 'we are: "world's greatest" company' | 'we' (alphabet), 'are' (alphabet), ':' (symbol), '"' (symbol), 'world' (alphabet), ''' (symbol), 's' (alphabet), greatest (alphabet), '"' (symbol), 'company' (alphabet) |

To see details on number tokens, see the section on number terminals.

5.6.1.2 Token Terminals

There are three types of token terminals:
Signs
Files (/F)
Databases (/DB)

5.6.1.2.1 Strings

The condition applies if part of the input matches the string. The string is broken into tokens. The tokens are implicitly joined using the adjacent operator. Each token is matched using the default <exact, substring> match. See Section 5.3.3 on how each token is matched using <exact> and <substring>; see Section 5.4.4 on how the ADJACENT operator works.

Example 18

String Condition

---
Condition: 'john malkovich'
User-Input: 'a john malkovich movie'
The condition will apply and will mark 'john malkovich' as claimed
User-Input: 'a john who is a malkovich movie'
The condition will not apply because 'john' and 'malkovich' are not adjacent in the input.
User-Input: 'a john malk movie'
The condition will not apply because 'malk' does not match 'malkovich'.
User-Input: 'a john malkovic movie'
The condition will not apply because 'malkovic' is a substring match of 'malkovich'.
---

The ', ", and / are special characters that should be referred to using %SINGLE_QUOTE%, %DOUBLE_QUOTE% and %BACK_SLASH% sequences.

Example 19

Using Special Characters in String Condition

---
Condition: '%DOUBLE_QUOTE%malkovich%DOUBLE_QUOTE% '
User-Input: 'a "malkovich" movie'
The condition will apply.
---

5.6.1.2.2 Files (/F)

The condition applies if part of input matches one of the lines in a text file. By default each entry in the text file can make a claim even if all its tokens are not found in the input.

Example 20

The /F Condition

---
MN.txt:
sixth sense
being john malkovich
the wall
--------------------------------------------------
Condition:    /F 'MN.txt'
User-Input: malkovich and sixth sense
The condition will apply and two claims will be made.
The claims (in order) would mark the following:
'malkovich'
'sixth sense'
---

A claim will be made on only those input tokens that are in order.

Example 21

The /F Condition

---
MN.txt:
being john malkovich
--------------------------------------------------
Condition:    /F 'MN.txt'
User-Input: john malkovich
---

The condition will apply and will make the claim: 'john malkovich'

Example 22

The /F Condition

---
MN.txt:
being john malkovich
--------------------------------------------------
Condition:    /F 'MN.txt'
User-Input: malkovich john
The condition will apply and will make the claim: 'malkovich' (The claim on 'john' lost to the claim on 'malkovich').
---

The default behavior will change if token matchers (see Section 5.3.3, e.g. <exact>, <substring> . . . ) are applied to the /F condition. If token matchers are used then all tokens in the file entry must appear in the input adjacent and in order.

Example 23

The /F Condition

---

MN.txt:
sixth sense
---
Condition:   <exact> /F 'MN.txt'
User-Input: sense

---

The condition will not apply as 'sixth' does not appear in the input.

Example 24

The /F Condition

---

MN.txt:
sixth sense
---
Condition:   <exact> /F 'MN.txt'
User-Input: sense sixth

---

The condition will not apply as 'sixth sense' does not appear in the input in the same order as the file.

Example 25

The /F Condition

---

MN.txt:
sixth sense
---
Condition:   <exact> 'MN.txt'
User-Input: sixth a sense

---

The condition will not apply as 'sixth sense' is not adjacent in the input.

5.6.1.2.3 Common Files

A common file may be provided for an agent network to modify the behavior of file conditions (/F). To prevent unwanted claims made by file conditions create a common file. The common file should contain a list of common words (e.g. the, as, is).

Example 26

The Problem (why we Need Common File)

---

Common file not provided:
---
MN.txt:
sixth sense
being john malkovich
the wall
---
Condition:   /F 'MN.txt'
User-Input: the movies in sunnyvale
The condition will apply and one claim will be made on token 'the'.

---

Example 27

How Common File Will Help

---

Common file provided:
---
common.txt:
the
being
---
Condition:   /F 'MN.txt'
User-Input: the movies in sunnyvale
The condition will not apply.

---

The file condition will ignore the common words only if they are not adjacent to a non-common word.

Example 28

Common Files

---

Common file provided:
---
Condition:   /F 'MN.txt'
User-Input: the wall
The condition will apply.

---

5.6.12.4 Databases (/DB)

The condition applies if part of input matches one of the columns in a database. A database spec file (in text format) should be provided for the /DB condition. This spec file should contain the following information:

1. JDBC driver
2. JDBC server location
3. Database name (or ODBC data source name)
4. Table name
5. Column name
6. Login
7. Password Example 29

Defining Spec File for JDBC Connection to Pointbase Using /DB

---

MS.spec:
com.pointbase.jdbc.jdbcUniversalDriver
jdbc:pointbase://192.168.0.26:1000/
movies
star
star_name
public
public
---
Condition: /DB 'MS.spec'

Example 30

Defining Spec File for JDBC Connection to Microsoft Access Using /DB

```
MS.spec:
sun.jdbc.odbc.JdbcOdbcDriver
jdbc:odbc:
movies
star
star_name
--------------------------------------------------
Condition: /DB 'MS.spec'
```

Known Issue:
The token matchers (e.g. <exact>, <substring>, . . . ) is not applicable to the /DB.

5.6.1.3 Number Terminal (/NUMBER)

The condition applies if a number token is found in the input (numbers are identified by the tokenizer).

You may also define a range for the /NUMBER condition.

Numbers are tokenized using the following rule:
<DIGIT>+[(COMMA|PERIOD)<DIGIT>+]+

Example 31

Valid Numbers 34
34.5
3,456
3,456.56

Known Issues:
The following are also considered to be valid numbers:
3.4.5
23,3434,43
3.4,5

There is no way to explicitly declare the format of a number (i.e. integer, positive integer, negative integer, real, scientific notation . . . ).

Ranges acceptable in /Number is limited to long integer values ($\pm 2^{32}$).

+ and − signs are not claimed by operator /NUMBER 5.6.1.4 Symbol Terminal (/SYMBOL)

The condition claims a single symbol in the input (numbers are identified by the tokenizer, refer to Section 5.4.1.1).

Example 32

Symbol Terminal

```
Condition: /SYMBOL
User-Input: '@'
The condition will apply and the symbol @ will be claimed.
```

Example 33

Symbol Terminal

```
Condition: /SYMBOL
User-Input: '#@%'
The condition will apply and the symbol # will be claimed.
```

5.6.1.5 Delimiter Terminal (/DELIMITER)

(Not Available in Backward Compatibility Mode)

The condition claims a delimiter in the input (delimiters are identified by the tokenizer, refer to Section 5.4.1.1).

Example 34

Delimiter Terminal

```
Condition: 'blue' /DELIMITER 'book'
User-Input: 'blue   book'
The condition will apply.
Claim: ['blue'][' '][`book'].
```

Delimiters are most useful when used in conjunction with variables.

Note that Blanks are added to the beginning and the end of all text inputs automatically and therefore the beginning and the end of input is always a delimiter.

Example 35

Delimiter Terminal at the Beginning of the Input

```
Condition: /DELIMITER 'book'
User-Input: 'book'
The condition will apply.
Claim: [' ']['book'].
```

5.6.1.6 Beginning of Input Terminal (/BOI)

(Not Available in Backward Compatibility Mode)

The condition claims the first character of the input that is always a blank space (blanks are added to the beginning and the end of all text inputs automatically).

Example 36

BOI Terminal

```
Condition: /BOI 'a'
User-Input: 'a'
The condition will apply.
Claim: [' ']['a'].
User-Input: 'b a'
The condition will not apply.
User-Input: 'a b';
The condition will apply.
Claim: [' ']['a'].
```

Important Notes:
The purpose of using /BOI should be to detect continuation (normally if the input depends on the previous input). Policies that detect continuation should not be referred in the policies that make relation between other policies.

It is recommended to always use <exists> operator along with the /BOI operator as normally the beginning delimiter themselves are not important.

This condition should only appear at the beginning of the policy condition (may follow the <exists> condition)

5.6.1.7 End of Input Terminal (/EOI)

(Not Available in Backward Compatibility Mode)

The condition claims the last character of the input that is always a blank space (blanks are added to the beginning and the end of all text inputs automatically).

Example 37

EOI Terminal

> Condition: /EOI 'a'
> User-Input: 'a'
> The condition will apply.
> Claim: ['a'][' '].
> User-Input: 'a b'
> The condition will not apply.
> User-Input: 'b a'
> The condition will apply.
> Claim: ['a'][' '].

Important Notes:
 The purpose of using /EOI should be to detect continuation (normally if the input depends on the next input). Policies that detect continuation should not be referred in the policies that make relation between other policies.
 It is recommended to always use <exists> operator along with the /EOI operators as normally the ending delimits themselves are not important.
 This condition should only appear as the last operator in policy condition.

5.6.1.8 Token Type Terminal (/TOKEN)

The condition applies if a user defined token type is found in the input. New token types could be defined in the tokenizer.

5.6.1.9 Check Condition (<Check (Agent, Property, Key; Value)>):

Makes a claim only if an agent's property is equal to a specific value. This condition is especially useful for the AAOSA agents to know about the state of the application or device. For example the TV agent in a TV/AV interface could use the <check> condition to know if the TV is on. If the TV is on and the user says 'power on' then the TV agent could generate the proper response. There are two types of properties that may be accessed through messaging:
 a. Data property (basic objects)
 b. Data store property (collection objects: hash tables, vectors, . . . )

Each agent must allow access to its data property by declaring it as a valid data property. The methods that should be sub-classed for this purpose are summarized in the following table:

All AAOSA agents have a STATE property that could be checked (STATE is a basic property).

The parameters of a check message, <check (agent, property, key, value)>, are:

Agent: The agent address that its property is to be checked. This parameter is optional. If omitted then an agent will "check" its own property.

Property: The name of the property to be checked.

Key: The key to the data store property (as a string). This parameter is optional. If omitted then an agent will "check" a basic property.

Value: The vale that the property will be compared to (as a string).

Example 38

Check Condition

> P1:
> Condition: 'open' {action: {execute: 'door openned',set(DOOR,'STATE','';'OPEN')}}),
> P2:
> Condition: <check(DOOR,'STATE',''; 'OPEN')> 'open' {action: {execute: 'door is already open!'}}
> User-Input: 'open'
> If the state of the door is open then policy P2 will apply and when actuated it would reply with: 'door is already open!'

See section 6.2.6 and 6.2.7 for more information on set and get.

5.6.2 Reference Conditions 5.6.2.1 Policy Reference

The condition applies if another policy has claims. A policy name is a series of capital letters ('A' to 'Z'), digits ('0' to '9') or under score ('_') that begins with a capital letter. A policy can only refer to policies that are declared before it.

5.6.2.2 Agent Reference

The condition applies if the referenced agent has claims. The referenced agent must be a listener to the agent that owns the policy.

An agent is referred to using its address. An agent address has the following format:

agent-instance-name.agent-class @ domain

An agent could be referred to only if it's agent-instant-name would be a series of capital letters ('A' to 'Z'), digits ('0' to '9') or under score ('_') that begins with a capital letter.

|  | Access permission | methods | Set message |
|---|---|---|---|
| Data Property | public Boolean IsValidDataProperty( String propertyName) | public void setData( String propertyName, Object value) Object getData( String propertyName) | <check (agent, property; value)> |
| Data Store Property | public Boolean IsValidDataStoreProperty( String propertyName) | public void setDataStoreElement( String propertyName, String propertyKey, Object propertyValue) public Object getDataStoreElement( String propertyName, String propertyKey) | <check (agent, property, key; value)> |

Example 39

Agent Reference

---

DOWN.com.MySubClassedAAOSA@x

All agents in the same domain may be referred to using only the agent-instance-name. By default all agents are made in domain x.

---

5.6.2.3 Variables (?)

Variables behave and generate claims according to the following rules:

If the variable condition is bound by tokens on both sides of the condition, then all the tokens found between the boundary tokens are considered to be part of the variable and are added to the policy's claim. This type of variable condition is also known as an un-adjustable variable condition.

Example 40

Variable Condition Bound from Both Sides

---

P1: 'in' ? 'folder'

Input: in my java folder

The variable condition in the claims made by P1 is bound from left by the 'in' token and from right by the 'folder' token. Therefore, "my java" is identified as the variable part of the input and is added to the claim's focus.

---

If the variable condition is bound only on either the left or right side of the condition, then the leftmost/rightmost token of the variable part of the input is added to the policy's claim. The variable part of the input is also referred as a left/right "adjustable" variable.

Example 41

Variable Condition Bound from One Side

---

P1: 'in' ?

Input: in java folder

In this case the variable is bound on the left by the 'in' token and the variable part is identified as "right adjustable". Per our rule, the "java folder" string is marked as the variable part of the input and "java" is added to the claim focus.

---

If a claim with a right (or left) adjustable variable is merged with another claim that does not have a variable part, then the variable part of the claim is adjusted by excluding all the tokens that are found from the beginning of the next claim focus.

Example 42

Merging Variable Claims with Claims with No Variable Part

---

P1: 'a' ?
P2: 'b'
P3: P1 < P2
Input: a x y z b r
In this case, P1's subclaim variable part consists of the string "x y z" and its focus consists of "a" and "x" (second rule applies). When merged, P3's focus consists of 'a', 'x' and 'b'.

---

Claim list processing is performed as described in the policy reference. The variable length will be checked only after the appropriate checks for coverage, priority, ambiguity, connection weight, adjacency, focus size and restrictiveness are done.

If the variable condition does not mark any of the input, no claims are made.

Example 43

No Claims are Made when the Input Contains No Variable Parts

---

P1: 'in' ? 'folder'
Input: in folder
Or
P1: 'in' ?
Input: folders that are in
In both of these examples the variable condition does not mark any of the input and no claims are generated.

---

When comparing two claims, any claims with no variables are selected over claims with variables

Example 44

Claims with No Variables Win Over Claims with Variables

---

P1: 'a' ?
P2: 'a' 'b'
Input: a b
In this case, P2 will win over P1.

--- if two clams contain variables, then the claim with the greater number of variables wins.

Example 45

Claims with Greater Number of Variables Win

```
P1: 'a' ? 'b' ? 'c'
P2: 'a' ? 'c'
Input: a x b y c
In this example, P1 will be selected over P2.
```

If two claims have the same number of variables, then the claim with the smaller variable length wins.

Example 46

Claims with Smaller Variable Length Wins

```
P1: 'a' ? 'b'
P2: 'c' ? 'd'
Input: a x b c j k d
In this example, P1 is selected as it has the smallest variable length.
```

Variable conditions may have a name assigned to them. A named variable condition consists of the variable operator followed by a semicolon followed by the variable name. For example, [?:First] is a valid variable name. References to variable names are only valid within the actions of the policy where the variables are declared

Example 47

Named Variables

```
P1: 'a' ?:A
    {action: {execute: ?:A}}
P2: P1 'b' ?:A
    {action: {execute: ?:A}}
Input: a x b y
In this example, P2 will be selected as the best claim and the
result of the actuation consists of 'y'.
```

The use of cascading variables is illegal and its behavior is undefined and not supported.

Example 48

Cascading Variables

P1: 'in' ???

The use of unbound variable conditions is illegal and its behavior is undefined and not supposed.

Example 49

Unbound Variables

P1: ?

5.6.3 Unary Conditions:

Unary condition is an operation on one operand. There are six basic unary conditions:

Optional
E is
Token matching
Unknown
Rive
Tag 5.6.3.1 Optional Condition ([Operand]):

This condition will always make a claim. The claim made depends on the operand:

If the operand has a claim, then the optional condition will make the same claims as the operand.

If the operand has no claims the optional condition will claim null, an empty claim with a focus of zero.

Example 50

Optional Condition

```
Condition: ['actor'] 'john malkovich'
User-Input: actor john malkovich
The condition will apply and will make the following claims:
'actor john malkovich'
'john malkovich'
User-Input: john malkovich
The condition will apply and will make one claim:
'john malkovich'
```

Policies should not be written in a way that they could make a null claim. For example, the following policies are not supported (although the SDK would not prevent them from being written):

Example 51

Policy Conditions that should be Avoided

```
P1: ['a']
P2: ['a'] | ['b']
P3: ['a' & 'b']
```

Each of the above policies makes a null claim regardless of the input. An example of the bizarre behavior that would result is:

Example 52

Avoiding Null Claims

```
P1:  ['a']
P2:  P1 & 'b'
User-Input: b
P2 will make a claim on 'b' with no reference to the null claim made by
P1 and with connection weight 0 (the & operator will be ignored when
calculating the connection weight).
```

5.6.3.2 Exists Condition (<Exists> Operand):

Checks to see if the operand has claims. If this is true, then the <exists> condition will make a null claim (an empty claim). If this is false, then the <exists> condition will not make a claim.

Example 53

Exists Condition

---

P1:
Condition: 'starring' <exists> 'siamak'
User-Input: starring siamak
The condition will apply, and will claim 'starring'.
P1 condition will make the claim only if the word 'starring' appears in the input adjacent to claim(s) made by the token terminal 'siamak'.
User-Input: starring
The condition will not apply.

---

If binary conditions such as adjacent, and (&), ordered (<) and combo (,) appear in the same policy as the <exists> condition, then they behave as if <exists> condition is making claims on the input. For example:

Example 54

Exists Condition

---

P1:
Condition: 'aaa' <exists> 'aaa'
User-Input: aaa aaa
The condition will apply and marks the first 'aaa' ([0..2]) as its claim.
User-Input: aaa
The condition will not apply, as there is no 'aaa' appears in the input before another 'aaa'.

---

Note that the scope of <exists> condition is only the policy in which it appears.

Example 55

Exists Condition

---

P1:
Condition: 'aaa' <exists> 'aaa'
P2:
Condition: P1 'aaa'
User-Input: aaa aaa
The P2 condition will apply and will mark the first and second 'aaa' ([0..2][4..6]) as its claim.

---

Policies should not be written in a way that they could claim null. That is the following policies are not supported (although the SDK would not prevent them from being written):

Example 56

Policies that should be Avoided

---

P1: <exists> 'a'
P2: ['a'] & <exists> 'b'
P3: < exists> ('a' & 'b')

---

Each of the above policies makes a null claim regardless of the input. An example of the bizarre behavior that would result is:

Example 57

Policy Conditions that should be Avoided

---

P1: <exists> 'a'
P2: P1 & 'b'
User-Input: b
P2 will make a claim on 'b' with no reference to the null claim made by P1 and with connection weight 0 (the & operator will be ignored when calculating the connection weight).

---

When using <exists>, an agent is checking against a part of the input that it is not going to claim. Therefore the agent must be aware of parts of the input that are possibly another agent's responsibility. This is against the agent oriented programming style where an agent should only care about its own domain and should not worry about other domains. Therefore <exists> should always be avoided if possible. There is usually a better way to write the policies or configure the agent network to avoid the usage of <exists>.

5.6.3.3 Token Matching Condition

This unary operator defines the type of token matching applied to token terminals and file terminals. There are 6 types of token matching:

---

<exact>
<substring>
<accent>
<accent-substring>
<accent-edit-difference>

---

For details on using these condition with combination to file terminal (/F) please refer to the section on file terminals.

5.6.3.3.1. <Exact>

An input token matches a terminal token only if they are the same length and all their characters are exactly the same.

Example 58

<Exact> Condition

---
P1:
Condition: <exact> 'malkovich'
User-Input: 'malkovic'
Claim: malkovic
The condition will not apply.

---

5.6.3.3.2 <Substring>

Two tokens match only if there is an exact match or:
a) Both tokens are larger than 3 characters (this number can be changed in ParserParameters.xml).
b) The beginning characters must have an 80% match, string with the first characters. This percentage can be changed in ParserParameters.xml If the size of input token getting matched is less than the size of pattern, the input token will be claimed otherwise only the matched part of the input token will get claimed.

Example 59

Substring Matching

---
P1:
Condition: <substring> 'malkovich'
User-Input: 'malkovic'
The condition will apply (note that the length of user input is less than the pattern's)
Claim: malkovic
P1:
Condition: <substring> 'malkovich'
User-Input: 'malkovichab'
The condition will apply (note that the length of user input is greater than the pattern's).
Claim: malkovich
P1:
Condition: <substring> 'malkovich'
User-Input: 'malkovi'
The condition will not apply because it does not satisfy the 80% match.
Claim: N/A
P1:
Condition: <substring> 'malkovich'
User-Input: 'alkovich'
The condition will not apply because the starting characters do not match.
Claim: N/A

---

5.6.3.3.3 <Accent>
Tokens are matched using a rule-based collator.

5.6.3.3.4 <Accent-Substring>
Similar to a substring matcher but <accent-substring> matches the characters using a collator.

5.6.3.3.5 <Accent-Edit-Difference>
Matches two tokens using a rule based collator. The match allows missing or extra characters (less than a certain threshold currently defined in ParserParameters.xml). Tokens are matched only if they are larger than a certain length (currently defined in ParserParameter.xml).

5.6.3.3.6 Using Multiple Matchers

More than one token matching might be used to match terminal tokens. The matching will then be applied to the tokens one by one. If the first matching does not make a claim, the next matching in the list will be used.

Example 60

Using Multiple Matches

---
P1
Condition: <exact, substring> 'malkovich'
User-Input: 'being john malkovic'
The condition will apply, and will mark the following:
'malkovic' (substring match)

---

The default matching used are: <exact, substring>.

Example 61

Default Matches (<Exact, Substring>)

---
P1
Condition: 'malkovich'
User-Input: 'john malkovic'
The condition will apply, and will mark the following:
'malkovic' (substring match)

---

Token matching types could be also applied to file terminals (changing their default matchings)

Example 62

Matching Types Applied to File Terminals

---
MN.txt:
sixth sense
being john malkovich
the wall
--------------------------------------------------
Condition: <exact, substring> /F 'MN.txt'
User-Input: malkovich and sixth sense
The condition will apply and only one claim will be made:
'sixth sense'

---

Each token matching type has a value, which shows how restrictive it is. The restrictiveness values is a constant, predefined heuristically:
Exact (100)
Substring (60)
Accent (50)
Accent-Substring (85)
Accent-Edit-Difference (50)

5.6.3.3.7 Fast Matchers (<Exact>, <Substring>)
The matchers are categorized into fast and flexible matchers. The fast matchers are: <exact> and <substring>.

5.6.3.3.8 Flexible Matchers(<Exact>, <Substring>, <Accent>, <Accent-Substring>, <Accent-Edit-Difference>)
The flexible matchers include all fast matchers and the <accent<, <accent-substring> and <accent-edit-difference> matchers. These matchers are not included into the development platform by default unless the parserParameter.xml would be changed to include them by replacing the following line:

<Policy:TokenMatchers value="fast"/>

With:

<Policy:TokenMatchers value="flexible"/>

Note: It is not recommended to use the flexible matchers as they have a very poor performance.

5.6.3.4 Unknown Condition (<Unknown if Missing> Operand)—Deprecated:

Checks if the operand has claims. If this is true it will make the claim(s). If this is false, it will change the state of the claim to unknown (i.e. the operand is unknown). If a claim with unknown is actuated the system can prompt the user for clarification. How this prompting works and the attributes of the policies involved are discussed in section 4 (Actions).

Example 63

Unknown Condition

---

P1:
Condition: 'starring' <unknown if missing> MOVIESTAR
User-Input: starring siamak
The condition will apply. P1 will claim 'starring', and change the state of the claim to unknown.

---

Example 64

Unknown Condition

---

P1:
Condition: 'starring' <unknown if missing> MOVIESTAR
P2:
Condition: 'starring' <unknown if missing> <exists> MOVIESTAR
User-Input: starring bruce willis
P1 and P2 will both apply without changing the state of the claim.
P1 will claim the whole input but P2 will only claim 'starring'.

---

The <unknown if missing> operator is deprecated and it is recommended to use other approaches for dialoging (refer to section 6 for more information).

5.6.3.5 Recursive Condition (Operand+):

The recursive condition makes new claims by merging subsets of the claims made by the operand. Specifically, each claim made by the recursive condition is the result of merging claims that form a maximal disjoint subset of the set of claims made by the operand. Two claims are said to be disjoint if their focuses do not overlap (that is, the intersection of their focuses is null). A set of claims is disjoint if every claim in the set is disjoint to every other claim in the set. A set is maximal if it is not a subset of any other set.

Example 65

+ Condition

---

MN.txt:
sixth sense
being john malkovich
-----------------------------------------------
Policy without recursive condition:
P1:
Condition: (/F 'MN.txt')
User-Input: 'being john malkovich and 'sixth sense'
The condition will apply and will make two claims.
The claims (in order) will mark the following:
   1. 'being john malkovich'
   2. 'sixth sense'
Policy with recursive condition:
P1:
Condition: (/F 'MN.txt')+
User-Input: 'being john malkovich and 'sixth sense'
The operand makes the two claims above. The disjoint subsets of the operand claims are {1} (the set containing Claim 1), {2} (the set containing Claim 2), and {1, 2} (the set containing Claims 1 and 2). The sets {1} and {2} are not maximal because they are subsets of {1, 2}. Therefore, the recursive condition will make a claim by merging Claims 1 and 2. The claim will mark the following:
   1. 'being john malkovich' , 'sixth sense'

---

Example 66

+ Condition

---

MN.txt:
fifth sense
sixth sense
being john malkovich
-----------------------------------------------
P1: (/F 'MN.txt')+
User-Input = 'being john malkovich and sixth sense'
The condition will apply and will make two claims. The claims (in order) will mark the following:
   1. 'being john malkovich' , 'sixth sense'
   2. 'being john malkovich' , 'sense'
Note that a claim is not made by combining the operands's claims on 'sixth sense' and 'sense' because the two claims are not disjoint. Another way to look at this is that merging these two claims would make an ambiguity. The recursive condition is not allowed to make new claims that have ambiguities.

---

A policy condition should not reference a recursive condition.

Example 67

Policies Containing Recursive Conditions should not in General be Referenced by Other Policies. The Recursive Condition does not Generate all Possible Inner-Products

```
AB: 'a b'
 C: 'c'
CD: 'c d'
P1: (AB | C)+
RECURSIVE: (P1 | CD)+
   0 2 4 6
input: a b c d
claims made by P1 recursive operand:
   1. AB: a b [0.2]
   2. C: c  [4]
   3. CD: c d [4.6]]
maximal disjoint subsets for AB and C:
   {1,2}
claims made by P1:
   1. (AB, C): a b c [0.2.4] - best claim made by P1
   Note that P1 does not propagate claims made by AB and C
   individually because the claims are each individually subsets
   of the maximal disjoint subset (1,2).
claims made by RECURSIVE:
   1. (AB, C): a b c [0.2.4]
   2.   CD: c d  [2.4] - best claim made by RECURSIVE
```

Example 68

An Example of Referencing Recursive Conditions in a Policy that Might go Unnoticed

```
P1: 'a' 'b'+
Here the recursive condition is actually being referenced by the
adjacent condition.
```

Be careful of the common mistake illustrated in the following example, in which A agent is downchain of Top agent:

Example 69

Common Mistake in + Operand Usage

```
A agent's policies:
P1: 'a'
TOP agent's policies:
P1: A+
User-input = 'a a a'
The condition in TOP agent will apply and will only claim the first 'a'
in the input (default criterion)
```

It might be expected that the TOP agent in the above example should claim the whole input ([0 . . . 0][2 . . . 2][4 . . . 4]). The reason it does not is that Agent A passes only its best claim up to the TOP agent. In other words, the recursive condition (like all other conditions) does not affect how a down chain agent makes claims on the input. If multiple claims on character 'a' are required, then Agent A should have a recursive condition of its own:

Example 70

Correct Usage of + Operands

```
A agent's policies:
P1: 'a'
P2: P1+
TOP agent's policies:
P1: A+
User-input = 'a a a'
The condition in TOP agent will apply and will claim all 'a's in the
input.
```

In the latter example it is not necessary to have the recursive condition in the TOP agent. However, a good practice is to use a "catch all" policy, which applies the recursive condition to all of an agent's policies and down chain agents.

When two claims are merged using the recursive condition (and similarly the combo condition) then the resulting claim will have a loose connection. Claims with loose connections will fail to merge to other claims using the grammatical operators (such as &, < and adjacent).

Example 71

Incorrect Usage of + Operands

```
P1: 'a'+
P2: P1 & 'c'
Input: a a c
P2 will not apply.
```

Performance Note: The performance of the recursive condition depends on the input and the claims made by the operand. The recursive condition has a built in time-out to limit the amount of time that will be spent in the condition. This time-out is currently set to twenty seconds. When the maximum allowed time has elapsed, the condition returns the set of claims generated up to that point. Each claim will indicate that it was made by a timed-out condition. This set will not necessarily include the best possible result. The algorithm starts by making claims that involve the best operand claim. The assumption is that these will most likely create the best overall claims.

Example 72

Timing Out in Recursive Condition

```
P1: 'a'
P2: P1+
User-input = 'a a a ... a'
The recursive condition can handle about 180 'a's in 20 seconds. If the
number of 'a's goes above this, the condition will time out and return
the results generated so far. The message 'had enough in recursive
condition' will be logged in the err.txt file, and the resulting claim
will be tagged as timed out.
```

Recommended usage of the recursive operator is only in the catch policy (described later in the reference).

5.6.3.6 Repeat Condition (^)

The repeat condition is used to repeat the application of the AND (&), ORDERED (<) or adjacent operators. The following table illustrates the behavior of each repeat operator:

| Repeat opearator | What it means |
|---|---|
| A&^B | A&B&B&B&B... |
| A<^B | A<B<B<B<B... |
| A^B | A B B B B B ... |

Example 73

^ Operand

```
P1: 'book' | 'toy' | 'shirt'
P2: P1 'and' P1
User-Input: 'book and toy and shirt'
Condition P2 will apply and will make two claims:
   1. 'book and toy'
   2. 'toy and shirt'.
Now consider replacing P2's condition:
P2: P1 ^ ('and' P1)
Condition P2 will apply and will make three claims:
   1. 'book and toy and shirt'
   2. 'book and toy'
   3. 'toy and shirt'
```

Example 74

&^ Operand

```
P1: 'a' &^ 'b'
User-Input: 'b b a b b x b'
Condition P1 will apply and will make the claim 'b b a b b b'.
```

Example 75

<^ Operand

```
P1: 'a' <^ 'b'
User-Input: 'b b a b b x b'
Condition P1 will apply and will make the claim 'a b b b'.
```

Example 76

^ Operand

```
P1: 'a' ^ 'b'
User-Input: 'b b a b b x b'
Condition P1 will apply and will make the claim 'a b b'.
```

Note that repeat condition cannot be applied to OR and COMBO conditions conceptually.

5.6.4 Tag Condition (<tag: > Operand):

Tags claim(s) made by an operand. The tags may be accessed later by the check tag condition. Tag is used to classify claims. Classifying claims allows a policy to know if the claim belongs to it or not.

Example 77

Tag Condition

```
MN.txt:
being john malkovich
-----------------------------------------------------
P1:
Condition:    <tag: 'movie-name'> (/F 'MN.txt')+
User-Input:   'john malkovich'
The condition will  apply making one claim.
The claims (in order) would mark the following:
'being john malkovich'  (tag = 'movie-name')
```

Using tags and check tags means that an agent has to be aware of policies of another agent (which could be a policy of an agent which is not an immediate down chain). This is against the agent oriented programming style where an agent should not care about the policies of another agent and should not be aware of any agent other than its immediate down chains. Therefore tags and check tags should be avoided if possible. There is usually a better way to write the policies or configure the agent network to avoid the usage of tags.

5.6.4.1 Check Tag Condition (<Check Tag: > Operand):

Filters out all claims made by an operand that does not have a specific tag.

Example 78

Check Tag Condition

```
MN.txt:
being john malkovich
MS.txt:
john malkovich
MOVIE agent policies:
P1:
Condition: <tag: 'movie-name'> (/F 'MN.txt')+
P2:
Condition: <tag: 'movie-star'> (/F 'MS.txt')+
CINEMA agent policies:
P3:
Condition: <check tag: 'movie-star'> MOVIE
P4:
Condition: <check tag: 'movie-name'> MOVIE
User-Input: 'john malkovich'
The condition will apply, and CINEMA will make two claims.
The claims would mark the following:
'john malkovich' belongs to P4
'john malkovich' belongs to P3
```

Now that the claim is tagged the CINEMA agent knows which policy in MOVIE agent made the claims.

Using tags and check tags means that an agent has to be aware of policies of another agent (which could be a policy of an agent which is not an immediate down chain). This is against the agent oriented programming style where an agent should not care about the policies of another agent and should not be aware of any agent other than its immediate down chains. Therefore tags and check tags should be avoided if possible. There is usually a better way to write the policies or configure the agent network to avoid the usage of tags.

5.6.5 Binary Conditions

Binary condition merges claims made by two operands at the left and the right of a binary operator.

5.6.5.1 OR Condition (Operand1|Operand2):

Will apply only if at least one of the left or right operands has claims.

Example 79

| Condition

```
P1:
Condition:    'willis' | 'malkovich'
User-Input:   'willis'
The condition will apply, and will claim willis as the
input.
User-Input:   'willis or malkovich'
The condition will apply, and will make two claims.
The claims (in order) would mark the following:
'malkovich'
'willis'
```

5.6.5.2 AND Condition (Operand1 & Operand2):

Will apply only if both left and right operands have claims.

Example 80

AND Condition

```
P1:
Condition:    'john' & 'malkovich'
User-Input:   'malkovich whose first name is john'
The condition will apply, and will mark the following:
'malkovich'  'john'.
User-Input:   'john'
The condition will not apply.
```

The AND condition will apply only to those claims that have no loose connections.

Example 81

AND Condition on Claims with Loose Connections

```
P1:
Condition:    'send' , 'receive'
P2:
Condition:    P1 & 'email'
User-Input:   send and receive email'
Condition P2 will apply, and will claim the following:
'receive email'
'send email'.
```

5.6.5.3 ORDERED Condition (Operand1<Operand2):

Will apply only if both left and right operands have claims and the part of the input claimed by the left operand should come before the part of input claimed by right operand.

Example 82

ORDERED Condition

```
P1:
Condition:    'john' < 'malkovich'
User-Input:   'john whose family name malkovich'
The condition will apply, and will claim 'john' and
'malkovich'.
User-Input:   'malkovich whose first name is john'
The condition will not apply.
```

The ORDERED condition will apply only to those claims that have no loose connections.

5.6.5.4 ADJACENT Condition (Operand1 Operand2):

Will apply only if both left and right operands have claims, and the left operand claim appears just before (adjacent to) the right operands claim.
The claims made by left and right operands are merged, the resulting claim will be accepted only if the adjacency score of the merged claim is 0.

Example 83

ADJACENT Condition

```
P1:
Condition:    'john' 'malkovich'
User-Input:   'john malkovich'
The condition will apply, and will claim the whole
input.
User-Input:   'john smith malkovich'
The condition will not apply. As the adjacency score of
the merged claim is 1.
```

The ADJACENT condition will apply only to those claims that have no loose connections.

COMBO Condition (Operand1, Operand2):

Will try to join the left and right operands to make all combinations of ambiguous or non-ambiguous claims.

Example 84

COMBO Condition

```
P1:
Condition:    <exact> 'johhn malkovich' | <exact> 'bruce
willis'
P2:
Condition: <exact> 'being johhn malkovich' | <exact> 'sixth
sense'
P3:
Condition:    P1, P2
User-Input: 'bruce willis and john malkovich'
P3 will make three claims.
The claims (in order) are:
'john malkovich'   (ambiguous, belongs to P1 or P2) , 'bruce
willis'    (belongs to P1)
```

-continued

'john malkovich' (non-ambiguous, belongs to P1), 'bruce willis' (belongs to P1)
'john malkovich' (non-ambiguous, belongs to P2), 'bruce willis' (belongs to P1)
'john malkovich' (ambiguous, belongs to P1 or P2)
'john malkovich' (non-ambiguous, belongs to P1)
'john malkovich' (non-ambiguous, belongs to P2)
'bruce willis' (belongs to P1)

Note:
This is the only condition that can make ambiguous claims.

Claims may not be merged together using a combo condition if the merge would cause ambiguity and one claim has a higher priority or a better connection.

Example 85

When Priority Prevents Ambiguity

P1: 'a'
P2: 'a' {priority: 1}
P3: P1,P2
Input: a
The result will not be ambiguous as the priority of claim made by policy P2 is higher thab the priority of policy P1.

A better connection is defined to be based on the weight of the worst operator or operand used in a claim. The operators in order of weight are: adjacent, <, &. All operands in a claim have the same weight as the adjacent operator except for operands coming from the inexact matches of a database agent or a variable condition which have a weight worse than & and better than the combo (that weight is shown in the claim view as an INEXACT or ~).

Example 86

When Connection Prevents Ambiguity

P1: 'a' 'b' 'c'
P2: 'a' 'b'&'c'
P3: P1,P2
Input: a b c
P3 will not make an ambiguous claim as P1's claim has a better connection (adjacent vs. &)

Note that the number of operators will not make any difference here:

Example 87

When Connection does not Prevent Ambiguity

P1: 'a'&'b'&'c'
P2: 'a'&'b' 'c'
P3: P1,P2
Input: a b c
P3 will be ambiguous as P1's claim has the same worst operator as the P2's claim (both are &)

When two claims are merged using the combo condition (and similarly the recursive, +, condition) then the resulting claim will have a loose connection. Claims with loose connections will fail to merge to other claims using the grammatical operators (such as &, <and adjacent).

Example 88

Incorrect Usage of Combo Condition

P1: 'a','b'
P2: P1 & 'c'
Input: a b c
P2 will not apply.

The adjacency score of a claim made by a combo condition is not calculated directly from the focus of the claim (see adjacency score in Claim section). Instead it is calculated to be the sum of the adjacency scores of the sub-claims. For example, if P1 claims 'cat' and 'mouse' on the input 'cat dog mouse' and P2 claims 'dog', the adjacency score of (P1, P2) will be 1, whereas the adjacency score of (P1 & P2) will be 0. If P1 claims 'cat' on the input 'cat and dog' and P2 claims 'dog', the adjacency score of (P1,P2) will be 0, whereas the adjacency score of (P1 & P2) will be 1.

Recommended usage of combo operator is only in the catch policy (described later in the reference).

6 Actions

Actions transfers a claim to a standard format (e.g. an object containing XML)

6.1 Action Types:

6.1.1 Action:

The action that can be carried out unambiguously. The fields are: Delegate To; Execute; Explain; and Ask.

Delegate to: This field is used to delegate the actuation of a claim to other agents or policies responsible for making the claim. If you use this field the other fields would be ignored.

Execute: The part that is ready to be executed by the application. This would be in a language of the application you're building the interface for (e.g. XML).

Explain: Human readable explanation of what was interpreted by the system (deprecated).

Ask: A question to be asked from the user to narrow down the result. The agent that asks the question gets priority (focus). The agent asking the question should be the same agent that could claim the answer (refer to section 6 for more information).

Example 89

Actions

TV: ['TV'] 'on'
{title: 'TV'}
{action: {execute: 'TV ON!'}{explain: 'You asked to turn the TV on.'}
VCR: ['VCR'] 'on'
{title: 'VCR'}
{action: {execute: 'VCR ON!'}{explain: 'You asked to turn the VCR on.'}
HOME_ENTERTAINMENT: TV,VCR
{title: 'HOME_ENTERTAINMENT'}
{action: delegate to TV, VCR}

```
{ambiguity action: delegate to TV, VCR}
User Input: TV on and VCR off
Actuation:
You asked to turn the TV on. You asked to turn the VCR on.
TV ON! VCR ON!
```

6.1.2 Ambiguity:

The action that will be carried out when there is an ambiguity in the claim. This action item is only used to delegate actuation to the overlapping sub claims that have caused the ambiguity. The sub claims, which caused the ambiguity, would be actuated normally and their actuations would be put together to make the ambiguity choices.

Delegate to: This field is used to delegate the actuation of a claim to other agents or policies responsible for making the claim. If you use this field the other fields would be ignored.

Execute: The part that is ready to be elected by the application. This would be in a language of the application you're building the interface for (e.g. XML).

Explain: Human readable explanation of what was interpreted by the system (deprecated).

Choice: A question to be asked from the user to resolve the ambiguity. The choices should refer to the agents or policies that caused the ambiguity.

For example lets say the TV and VCR policies would have an overlapping claim that has been put together by HOME_ENTERTAINMENT policy:

Example 90

Ambiguity

```
TV: ['TV'] 'on'
{title: 'TV'}
{action: {execute: '<TV value=on />'}{explain: 'You asked to turn the TV on.'}
VCR: ['VCR'] 'on'
{title: 'VCR'}
{action: {execute: <VCR value=on />}{explain: 'You asked to turn the VCR on.'}
HOME_ENTERTAINMENT: TV,VCR
{title: 'HOME_ENTERTAINMENT'}
{action: delegate to TV, VCR}
{ambiguity action: delegate to TV, VCR}
Which one do you mean?
You asked to turn the TV on. You asked to turn the VCR on.
  1. TV
  2. VCR
```

When the system receives the input: 'on'. The HOME_ENTERTAINMENT claim will then be ambiguous (as the claims made by TV and VCR would overlap). So the actuation made by the HOME_ENTERTAINMENT would be based on actuations made by TV and VCR policies. The actuation would be a multi choice menu. The menu prompt would be the made by putting together the explain actions of the TV and VCR actuations, and the menu items would be the titles of TV and VCR policies.

The explain field is now being deprecated. Instead the execute field will replace the explain field (when it is not provided):

Example 91

Ambiguity Using Execute Field

```
TV: ['TV'] 'on'
{title: 'TV'}
{action: {execute: 'TV ON!'}}
VCR: ['VCR'] 'on'
{title: 'VCR'}
{action: {execute: 'VCR ON!'}}
HOME_ENTERTAINMENT: TV,VCR
{title: 'HOME_ENTERTAINMENT'}
{action: delegate to TV, VCR}
{ambiguity action: delegate to TV, VCR}
User-Input: On
System:
Which one do you mean?
<TV value = on /><VCR value = on />
  1. TV
  2. VCR
```

The idea is that a scripting language would then take the interaction and make the proper prompt.

Figure 13:
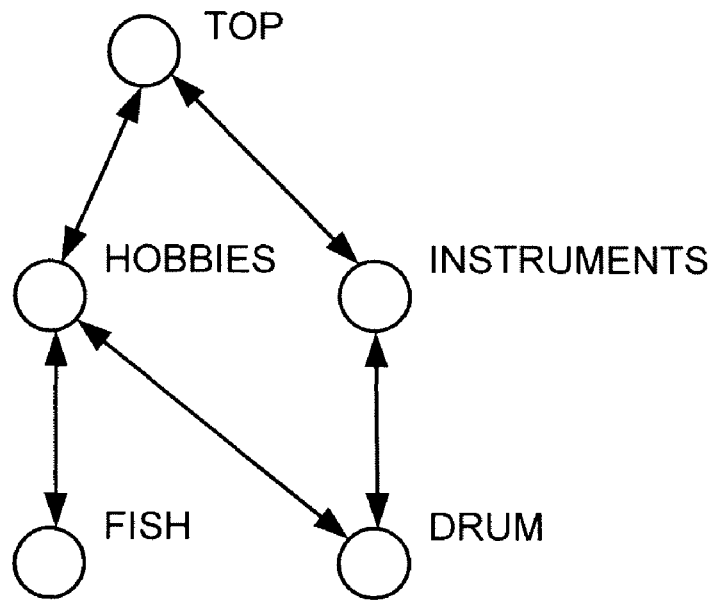

There are situations where there could be more than one questions asked for an ambiguity. For example the input bass in the network of FIG. 13 could generate ambiguity between FISH and DRUM or INSTRUMENTS and HOBBIES. The input 'bass' causes ambiguity in the HOBBIES agent (as bass could be a fish or a drum) and in the top agent (as bass can be a hobby or an instrument). Currently the system will find the source of the ambiguity and will only generate a question asking about that (in this case the source of ambiguity is if bass is a fish or a drum).

Example 92

More than One Ambiguity

```
(TOP:
    "
    (HOBBIES, INSTRUMENTS)+
    ")
(HOBBIES:
    "
    (FISH, DRUM)+
    ")
(INSTRUMENTS:
    "
    (DRUM)+
    ")
(DRUM:
    "
    ('bass')+
    ")
(FISH:
    "
    ('bass')+
    ")
User: bass
System:
Which one do you mean?
1: FISH
2: DRUM
3: Ignore input
Selection (choose one):
```

Figure 14:
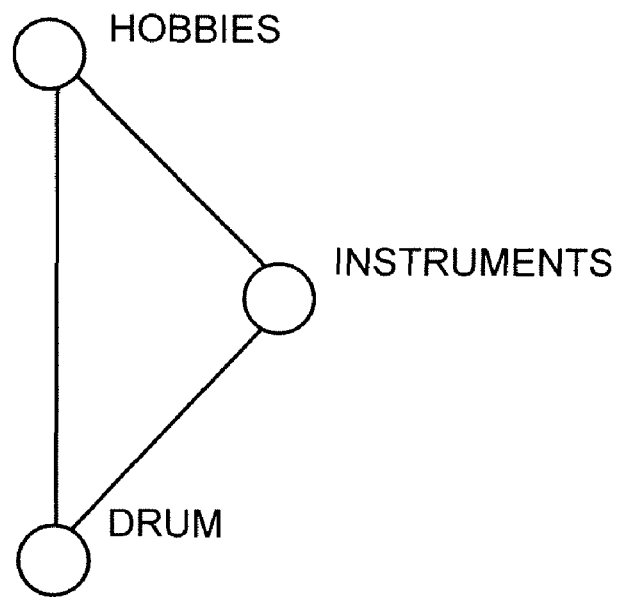

Known Issue:

There are network patterns that might lead to a too ambiguous situation. The following example demonstrates this situation. (See FIG. 14).

Example 93

Too Ambiguous Error

```
(HOBBIES:
    "
    (INSTRUMENTS, DRUM)+
    ")
(INSTRUMENTS:
    "
    (DRUM)+
    ")
(DRUM:
    "
    ('bass')+
    ")
User: bass
System:
Input too ambiguous. Please rephrase!
```

6.1.3 Unknown Action (Deprecated):

The action that will be carried out if the claim has unknown (there are missing information in the input). The same four fields are available.

- Delegate to: This field is used to delegate the actuation of a claim to other agents or policies responsible for making the claim. If you use this field the other fields would be ignored.
- Execute: The part that is ready to be executed by the application. This would be in a language of the application you're building the interface for (e.g. XML).
- Explain: Human readable explanation of what was interpreted by the system (deprecated).
- Ask: A question to be asked from the user to narrow down the result. The agent that asks the question gets priority (focus). The agent asking the question should be the same agent that could claim the answer.

6.2 Action Building Blocks

Each field in the action forms (e.g. execute, explain, ask and choice) is created using variety of building blocks. When actuated each building block generates an output. These outputs would be put together to make the final action. Building blocks could be:

6.2.1 Strings

Outputs any information entered in quotes.

Example 94

String Action Block

```
P1:
'bruce willis'
    {title: 'movie star'}
        {action:
            {explain: 'You asked for a movie star'} }
            User-Input: bruce willis
    P1 will make a claim. If the claim would be delegated to policy P1 then
the action would be: 'You asked for a movie star'.
```

6.2.2 Star (*)

Outputs which part of the input was claimed by a policy.

Example 95

Star Action Block

```
P1:
    'bruce willis'
    {title: 'movie star'}
        {action:
            {execute: *} }
User-Input: bruce willis
P1 will make a claim. If the claim would be delegated to policy P1 then
the action would be: 'bruce willis'.
```

6.2.3 Variable (?)

Shows which part of the input was marked as a variable in a claim. The variable action corresponds to the variable condition in the policy with the same name.

Example 96

Variable Action Block

```
P1:
    'starring' ?:MOVIESTAR /DELIMITER
        {title: 'movie star'}
        {action: delegate to P1}
        {action:
            {execute: 'who is the movie star ',
    ?:MOVIESTAR , ' you are looking for?'} }
User-Input: starring siamak
P1 will make a claim. If the claim would be delegated to policy P1 then
the action would be:
Who is the movie star siamak you are looking for?
```

It is recommended to always use names with variables. However this is how multiple unnamed variables are handled:

Example 97

Not Recommended Usage

```
P1:
    'send email from' ? 'to' ?
        {action: delegate to P1}
        {action:
            {execute: ? } }
User-Input: send email from Siamak to Kristi
P1 will make a claim. If the claim would be delegated to policy P1 then
the action would be: Siamak    Kristi
```

Note that variable trims the leading and trailing delimiters, but other delimiters are considered to be part of the variable. Multiple variables are trimmed after they are combined.

Example 98

Variable Trimmings

```
P1:
    'being' ? '.'
        {action: delegate to P1}
        {action:
            {execute: 'var:',?,'.' } }
User-Input: being    john    malkovich.
P1 will make a claim. If the claim would be delegated to policy P1 then
the action would be: var:john    malkovich.
```

6.2.4 Policy Reference

Used as a reference to an action part of another policy.

Example 99

Policy Reference Action Block

```
P1:
    'bruce willis'
        {title: 'movie star'}
        {action:
            {execute: '<movie-star=' , * , '</>'}
```

-continued

```
P2:
    'starring' P1
        {title: 'movie name'}
        {action:
            {execute: P1} }
User-Input: starring bruce willis
P1 will make a claim. If the claim would be delegated to policy P2 then
the action would be delegated to P1
    (the final result would be <movie-star=bruce willis</>)
```

6.2.5 Agent Reference

Used when the action part of another agent should be used to build this element

Example 100

Agent Reference Action Block

```
(In VOLUME agent)
P1:
DOWN
    {title: 'movie name'}
    {action:
        {execute: '<volume=',DOWN,'/>'} }
(In DOWN agent, downchain of the Volume agent)
P1:
'down'
    {title: 'movie name'}
    {action:
        {execute: 'down'} }
User-Input: down
Policy P1 in VOLUME agent will make a claim. If the claim would be
delegated to this policy then the action would be delegated to DOWN
agent (the final result would be <volume=down</>)
```

6.2.6 Set Message (Set (Agent, Property, Key; Value))

The condition, set (agent, property, key; value), will cause the agent to sends a message to set a property in another agent. There are two types of properties that may be accessed through messaging:

c. Data property (basic objects)
    d. Data store property (collection objects: hash tables, vectors, . . . )

Each agent must allow access to its data property by declaring it as a valid data property. The methods that should be sub-classed for this purpose are summarized in the following table:

|  | Access permission | Set method | Set message |
|---|---|---|---|
| Data Property | public Boolean IsValidDataProperty( String propertyName) | public void setData( String propertyName, Object value, ChainIdentifier chainID) | <set (agent, property; value)> |
| Data Store Property | public Boolean IsValidDataStoreProperty( String propertyName) | public void setDataStoreElement( String propertyName, String propertyKey, Object propertyValue, ChainIdentifier chainID) | <set (agent, property, key; value)> |

All AAOSA agents have a STATE property that could be set (STATE is a basic property).

The parameters of a set message, set (agent, property, key, value), are:

Agent: The agent address that its property is to be set. This parameter is optional. If omitted then an agent will "get" its own property.

Property: The name of the property to be set.

Key: The key to the data store property (as a string). This parameter is optional. If omitted then an agent will "get" a basic property.

Value: The value that the property should be set to (as a string).

Example 101

Set Action Block action: set(CLOCK, 'TIME'; '12:30')

6.2.7 Get Message (<Get (Agent, Property, Key)>)

Sends a get message to an agent, and shows the value replied by that agent. There are two types of properties that may be accessed through messaging:
  e. Data property (basic objects)
  f Data store property (collection objects: hash tables, vectors, . . . )

Each agent must allow access to its data property by declaring it as a valid data property. The methods that should be sub-classed for this purpose are summarized in the following table:

|  | Access permission | Set method | Set message |
|---|---|---|---|
| Data Property | public Boolean IsValidDataProperty( String propertyName) | public Object getData( String propertyName, ChainIdentifier chainID) | <get (agent, property)> |
| Data Store Property | public Boolean IsValidDataStoreProperty (String propertyName) | public Object getDataStoreElement( String propertyName, String propertyKey, ChainIdentifier chainID) | <get (agent, property, key)> |

All AAOSA agents have a STATE property (STATE is a basic property).

The parameters of a get message, set (agent, property, key, value), are:

Agent: The agent address that it's property is to be set. This parameter is optional. If omitted then an agent will "get" its own property.

Property: The name of the property to be set.

Key: The key to the data store property (as a string). This parameter is optional. If omitted then an agent will "get" a basic property.

Example 102

Get Action Block action: get(CLOCK, 'TIME')

6.3 Default Delegation

Whenever the action part of a policy is left empty a default delegation would be used. By default actions are delegated to policies responsible for making the sub claims. That is the policy:

```
POLICY2: AGENT1,AGENT2, POLICY1
Will be interpreted as:
    POLICY2: AGENT1,AGENT2, POLICY1
        {action: delegate to AGENT1, AGENT2, POLICY1}
        {ambiguity action: delegate to AGENT1, AGENT2, POLICY1}
        {unknown action: delegate to AGENT1, AGENT2, POLICY1}
```

The default delegation could be overridden by filling the action part. For example the following policy:

```
POLICY2: AGENT1,AGENT2, POLICY1
        {action: {execute: *}}
Will be interpreted as:
    POLICY2: AGENT1,AGENT2, POLICY1
        {action: {execute: *}}
        {ambiguity action: delegate to AGENT1, AGENT2, POLICY1}
        {unknown action: delegate to AGENT1, AGENT2, POLICY1}
```

6.4 Actuation

Each policy can make an actuation by applying the action part to the claim it made. Actuation may be built by putting together other actuations (just like claims). Each actuation will have four arms: execute, explain, ask, and choice. Each arm will contain a list of strings or pointers to other actuations.

There is a difference when an actuation is converted to a string if the building blocks of the actuation are listed in one field or different fields. When building blocks are listed together there would be no space between each block that is converted to a string.

Example 103

Actuation Example

```
P1:
    'aaa bbb ccc'
    {action:
        {execute: 'aaa', 'bbb', 'ccc'}
User-Input: aaa bbb ccc
P1 will make a claim. If the claim would be delegated to policy P1 then
the action would be: aaabbbccc.
```

When building blocks are listed in different fields there would be a space inserted between each block that is converted to a string.

Example 104

Actuation

```
P1:
    'aaa bbb ccc'
    {action:
        {execute: 'aaa', 'bbb', 'ccc'}
```

-continued

```
User-Input: aaa bbb ccc
    P1 will make a claim. If the claim would be delegated to policy P1
    then the action would be: aaa bbb ccc.
Implementation note: The space is actually the default join style. The idea
is to have different join styles that could be set in the policy. For example
AND joins, OR joins, XOR joins, . . .
```

7 Putting it all Together

The agents are normally composed of 3 types of policies:

7.1 Tokens:

The condition of these policies has no reference to any other agent. The policies are made using binary and unary operators on token conditions, file terminals or database terminals.

7.2 Grammars

The condition of these policies makes grammatical relationship between the policies in this agent and its down chain agents. These grammatical relationships are made by using &, |, <, optional and adjacent operators. All that can be part of one command should be combined using the &, < or adjacent operators.

7.3 Catch Policy

The catch policy of an agent is used to make the claims that no policies were written to deal with. That includes different combination of commands and ambiguities that may occur. The catchall policy includes a combo of references to all other policies and down chain agents of that agent followed by a + operator. A | (or) condition should be used instead of a combo between any two policies or down chain agents which should never make ambiguities. For example, assume agents A, B and C are all downchain of Top agent.

```
TOP agent policies:
    P1: ...
    P2: ...
    ...
    CATCH_ALL: (P1, P2, ..., A, B, C)+
```

The following is an example of how a user interface could be built for a store where books and toy in different colors could be bought.

Figure 15:
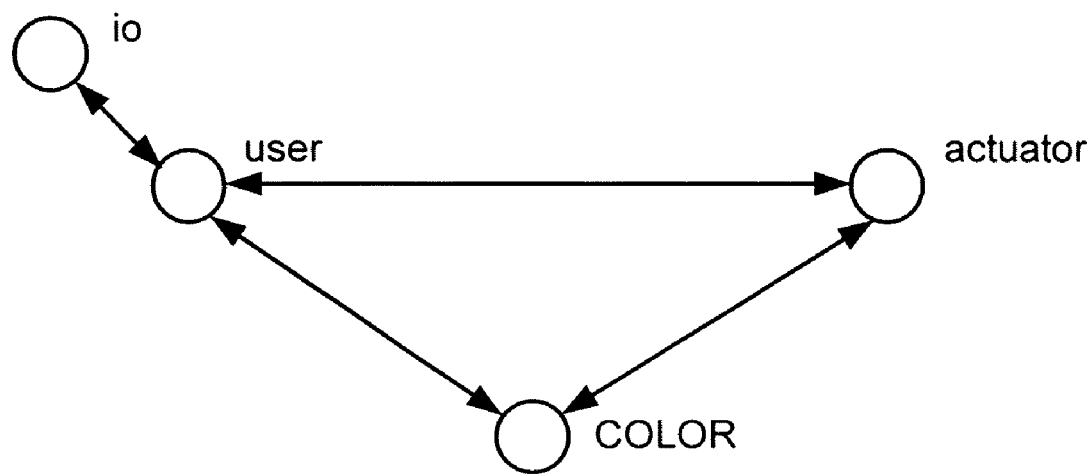
Figure 16:
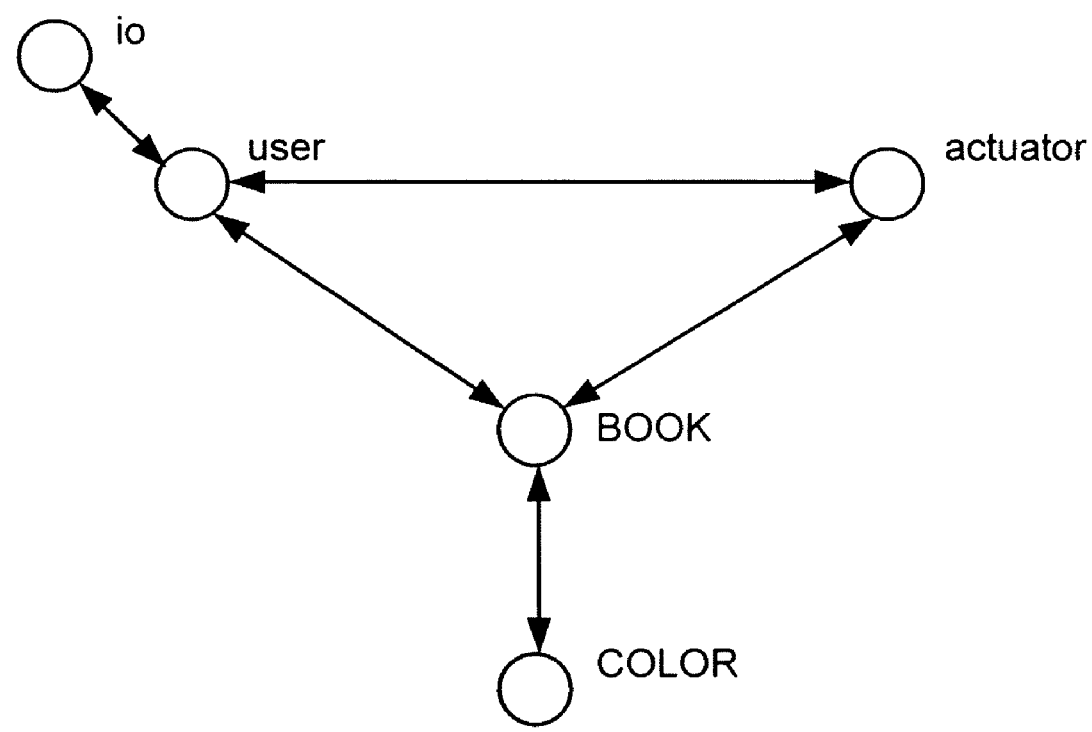

```
Step 1. Create the COLOR agent (See Fig. 15):
(TOKENS:
    "
    ('red'|'blue'|'green')
        {title:'A color'}
        {action:
            {execute:'<color=',*, '/>'}}
    "),
(RELATION:
    "
    TOKENS ^ ('and' TOKENS)
        {title:'Colors'}
    "),
(CATCH:
    "
    (TOKENS, RELATION)+
        {title:'Color'}
    ")
Step 2. Create the BOOK agent as an up chain of the COLOR
agent (Fig. 16):
(TOKENS:
    "
    'book'
        {title:'Book'}
```

Figure 17:
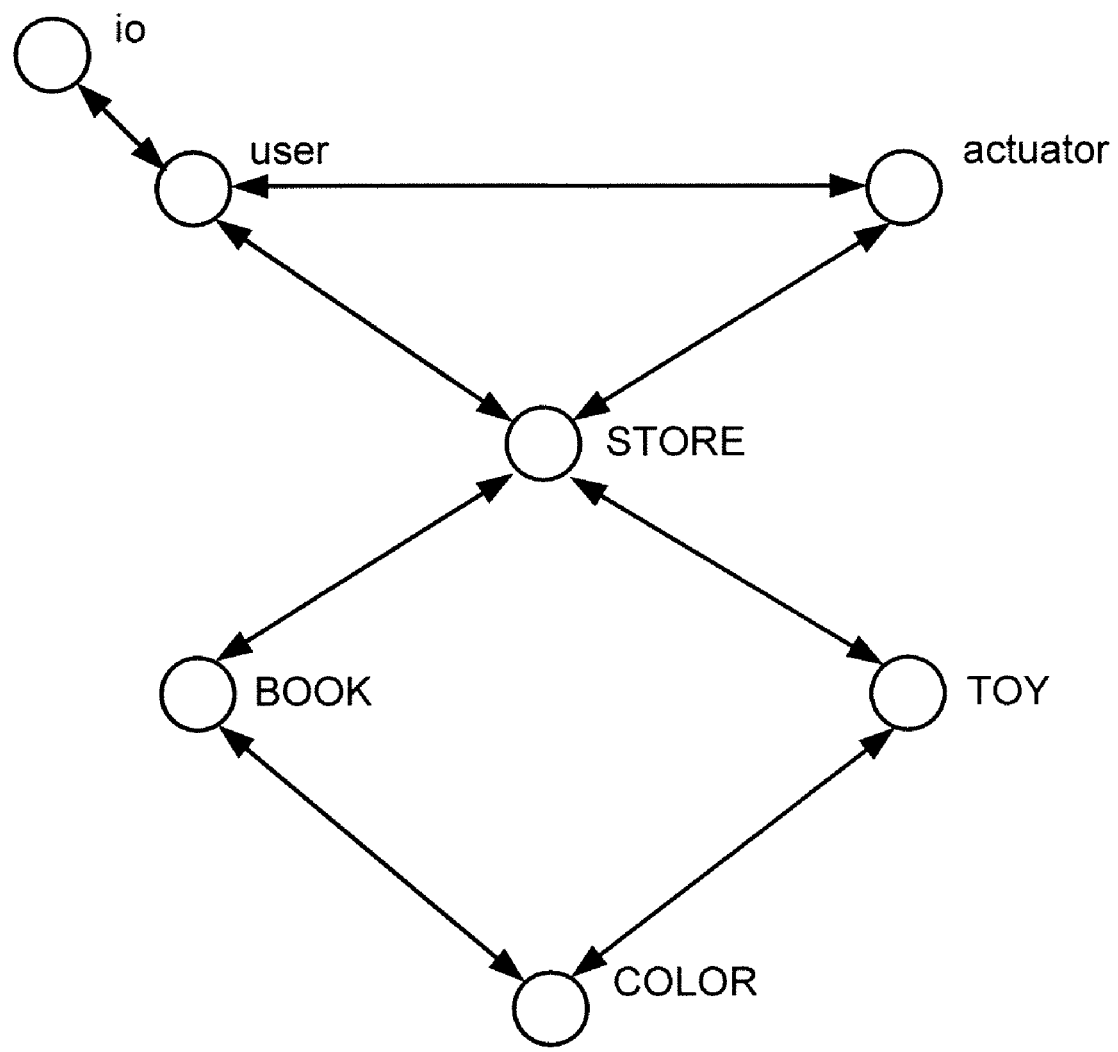

```
        {action:
            {execute: '<book>?</book>'}
            {ask:'Which book?'}}
    "),
(RELATION1:
    "
    COLOR
        {title:'Book'}
        {action:
            {execute:'<book> ',COLOR, ' </>'}}
    "),
(RELATION2:
    "
    TOKENS & COLOR
        {title:'Book'}
        {action:
            {execute:'<book> ',COLOR, ' </>'}}
    "),
(RELATION3:
    "
    COLOR TOKENS
        {title:'Book'}
        {action:
            {execute:'<book> ',COLOR, ' </>'}}
    "),
(CATCH:
    "
    (TOKENS, RELATION1, RELATION2, RELATION3)+
        {title:'Book'}
    ")
Step 3. Create the TOY agent the same as the BOOK agent and join
BOOK and TOY agents as down chain agents of the STORE agent
(Fig. 17).
(CATCH:
    "
    (BOOK, TOY)+
    ")
```

8 Best Practices Guidelines for Agent Network Design

1) Always include comments in your policies briefly describing why they are there and what they do. In general an observer should be able to understand the logic of why you have coded your agent the way you have. If it is too complex to understand, it is very likely that it needs some cleaning up.

2) If there are more than 6 policies in an agent rethink using a single agent for all these policies. It may also be that the agent has too big a fan-out.

3) Avoid too many agents reporting to a single agent (larger than 6 fan-out). Add agents to group down-chains into sub networks. Make sure the groupings correlate with the semantics of the application domain. Just as in menu structures, a big fan out is untidy and in our case they can also result in inefficient processing of policies that include operators like ^ or *.

Categorization is possible and quite natural. After all, this is how our minds work to enhance our memory. It is much harder to memorize 16 down chains for one agent than it is 4, each of which lead to another.

We should use a domain expert in this case to identify the categorization.

The merits of limiting the fan out can be summarized as:
Efficiency (memory and speed),
Better reusability;
Better Interactions (where top agent knows input belongs to it but doesn't know which down-chain to delegate it to).

As for the fan out, if there are many agents down-chain to one, it is very likely that there does exist a categorization for these concepts in the domain expert's lingo that we are missing and we should probably cover. If this is the case, then recategorizing and decreasing the fan out based on the domain classifications and the resulting modularity will make those categories more readily reusable, and the interactions with the application more manageable for the end users. It will also make the policies in the top agent more readable and tidy. This added modularity may also help the efficiency of the application where operators such as "&" or other firm operators are used between all down-chains. This is because it reduces the number of claims the up-chain agent to the top node will be receiving when a policy containing operators such as the "&" of the down chains fires.

4) Avoid creating agents that do not represent the semantics of the application.

5) Start each agents list of policies with policies that pick the tokens associated with this agent. Then follow with policies that describe the relationships. At the end, include catch-all policies.

TOKENS: The condition of these policies has no reference to any other agent. The policies are made using binary and unary operators on token conditions, file terminals or database terminals.

RELATIONS: The condition of these policies describe the relationships between the policies in this agent and its down chain agents. These grammatical relationships are made by using operators such as &, |, <, optional and adjacent. All that can be part of one command should be combined using these operators.

CATCHALLS: The catchall policy of an agent is used to make the claims that no policies were written to deal with. That includes different combination of commands and ambiguities that may occur. The catchall policy includes a combo of references to all other policies and down chain agents of that agent followed by a + operator. A | (or) condition should be used instead of a combo between any two policies or down chain agents which should never make ambiguities.

6) Avoid using catch-alls extensively and try to cover them in Relations policies. For example try using the repeat operator (^) more often.

7) Try not to repeat all of the contents of another policy in the following policies. It is inefficient and untidy:

Bad:
TOKENS: 'web'|'wap'
RELATIONS: ('web'|'wap') & INDEX
Good:
TOKENS: 'web'|'wap'
RELATIONS: TOKENS & INDEX 8) Any policy on its own may make a claim. Do not have policies that may claim lone words that are not relevant to the agent:
DUMMY_TOKEN: 'the'

In this case an agent, THE, should be created which claims 'the' but is never delegated to or referred to without constraining conditions around it.

9) Avoid using tags. Using "tags" and "check tags" mean that an agent has to be aware of policies of another agent (which could be a policy of an agent that is not an immediate down chain). This is against the agent oriented design principle where an agent should not care about the policies of another agent and should not be aware of any agent other than its immediate down chains. Therefore "tags" and "check tags" should be avoided if possible. There is usually a better way to write the policies or configure the agent network to avoid the usage of tags.

10) Avoid using <exists>
RELATIONS: <exists> 'token'

When using <exists>, an agent is checking against a part of the input that it is not going to claim. Therefore the agent must be aware of parts of the input that are possibly another agent's responsibility. This is against the agent oriented design principle where an agent should only care about its own domain and not worry about other domains. Therefore <exists> should always be avoided if possible. There is usually a better way to write the policies or configure the agent network to avoid the usage of <exists>.

There are cases where using <exists> is appropriate as in the example below:

In this example, we have a top level FIND agent. Below FIND there is a FILETYPE agent and a FOLDER agent. FILETYPE has down-chain agents that recognize specifications for different kinds of files; FOLDER uses down-chain agents to identify specs for starting directories.

Now imagine a request like "java in web". Both "java" and "web" are valid file types; both are valid directory names. What we wanted to do in FILETYPE is say that if we see a file spec followed by the word 'in', to see that as a stronger claim than one without it. Similarly, we want FOLDER to use 'in' to indicate that what follows may be a directory spec.

Clearly, we can't have both agents claiming 'in'. But 'in' is important for both. So we use <exists> to give the policy with 'in' a higher priority.

11) Avoid policies that may make a null claim:

TOKENS: ['a']
NULLTOKENS: ['a'] | ['b']
INTERESTING_TOKENS: ['a' & 'b']
NOTOKENS: <exists> 'a'
WOWTOKENS: ['a'] & <exists> 'b'
OWTOKENS: < exists> ('a' & 'b')

9 Precedence Table

The OPAL language guarantees that the operands of operators appear to be evaluated in a specific evaluation order, namely, from left to right.

| Precedence | Operator type | Operator |
|---|---|---|
| 0 | Terminals and references | 'string' /NUMBER, /SYMBOL, /TYPE, /F, /DB, /IDB, <check(...)>, AGENT reference, POLICY reference, ?, ... |
| 1 | Brackets | ( operand ) [ operand ] operand+ |
| 2 | Unary | <exists> operand <check...> <unknown ..> operand |
| 3 | Binary adjacent | operand1 operand2 operand1 ^ operand2 |
| 4 | Binary ordered | operand1 < operand2 opernad1 <^ operand2 |
| 5 | Binary and | operand1 & operand2 opernad1 &^ operand2 |
| 6 | Binary or | operand1 | operand2 |
| 7 | Binary combo | operand1 , operand2 |
| 8 | Unary tag | <tag:...> operand <check tag:...> operand |

Notes:
It is generally a good idea to use parentheses liberally in expressions involving mixed operators to avoid operator precedence problems.

10 Learning

A follow-up answer will be learned only if:

There would be a variable terminal (?) in the condition of the policy.

The agent asking the question would make a claim on the follow-up.

11 Claim Manipulation

The recursive operator (+) and most binary operators (adjacent, &, <, + and combo) make their claims by merging other claims.

Merging Claims:

Two claims $C^1$ and $C^2$ will merge if and only if one of the following conditions would hold:

1. $C_{focus}^1 \cap C_{focus}^2 = \phi$ (if $C^1$'s focus does not intersect with $C^2$'s focus)
2. $C_{loose\text{-}connection\text{-}count}^1 = 0$ and
   $C_{loose\text{-}connection\text{-}count}^2 = 0$ and
   $C_{focus}^1 \not\subset C_{focus}^2$ and
   $C_{focus}^2 \not\subset C_{focus}^1$ and
   $C_{priortity}^1 = C_{priortity}^2$ and
   ($C_{connection}^1 = C_{connection}^2$ or $C_{ambiguity}^2 < 0$)
3. Conditions 1 and 2 hold for merging all claims that have been connected loosely to build $C^1$ and all subclaims that have been connected loosely to build $C^2$.

Ambiguous Claims:

A claim C made by merging $C^1$ and $C^2$ is ambiguous if their focus' overlap: $C_{focus}^1 \cap C_{focus}^2 \neq \phi$

12 Policies in BNF Notation

12.1 BNF Notation

The following is the BNF notation used to describe the Policy's syntax:

::= Is interpreted as 'consists of' or 'is defined as'.

( )+ Parenthesis followed by a plus sign indicate that the sequence in the parenthesis may be repeated more than one time.

( )* Parenthesis followed by a plus sign indicate that the sequence in the parenthesis may be repeated zero or more times.

~( ) Parenthesis preceded by a not sign indicate that all sequences except those in the parenthesis are legal.

[ ] Square brackets state that the sequence in the brackets is optional.

< > Names embedded in angle brackets are syntactic elements such as <integers>, <names> etc. All syntactic names will be defined i.e. they will appear on the left side of the '::=' symbol in a grammar rule.

" " Characters embedded in double quotes are keywords or characters.

- A dash between two characters defines a range of characters. For example "0"-"3" is "0"|"1"|"2"|"3".

| A vertical bar is read 'or' and is used to separate alternatives.

Whenever a BNF notation is used as a keyword in the grammar it is preceded by an escape character: '\'.

12.2 Policy's BNF Notation

Here is a BNF notation of the policy's grammar.

```
policy ::=
    label:
    "\""
        <condition>
        ["{" "title:" <title> "}"]
        ["{" "xml tag:" <string literal> "}"]
        ["{" "xml type:" <string literal> "}"]
        ["{" "priority:" <integer> "}"]
        ["{" "continuation:" ("join"|"replace") "}"]
        ["{" "action:" <action>}]
        ["{" "ambiguity action:" <action> "}"]
        ["{" "unknown action:" <action> "}"]
    "\"";
<label> ::= ["A" - "Z"|"_"] (["A" - "Z" | "0" - "9" | "_" | "-"])*
<title> ::= <string_literal>
<integer> ::= [+|-] ("0" - "9")+
<condition> ::= "(" <condition> ")"
<condition> ::= <ADJACENT_condition>
<condition> ::= <ORDERED_condition>
<condition> ::= <AND_condition>
<condition> ::= <OR_condition>
<condition> ::= <COMBO_condition>
<condition> ::= <OPTIONAL_condition>
<condition> ::= <TERMINAL_condition>
<condition> ::= <EXISTS>
<condition> ::= <TAG_condition>
<condition> ::= <CHECK_TAG_condition>
<condition> ::= <CHECK_condition>
<OPTIONAL_condition> ::= "[" <condition> "]"
<UNKNOWN_condition> ::= "<unknown if missing>" <condition>
<ADJACENT_condition> ::= <condition> <condition> |
                         <condition> "^" <condition>
<ORDERED_condition> ::= <condition> "<" <condition> |
                        <condition> "<^" <condition>
<AND_condition> ::= <condition> "&" <condition> |
                    <condition> "&^" <condition>
<OR_condition> ::= <condition> "|" <condition>
<COMBO_condition> ::= <condition> "," <condition>
<TERMINAL_condition> ::= <terminal>
<EXISTS_condition> ::= "<" "exists" ">" <condition>
<TAG_condition> ::=
    "<" "tag" ":" <string_literal> ">" <condition>
<CHECK_TAG_condition> ::=
    "<" "check" "tag" ":" <string_literal> ">" <condition>
<CHECK_condition> ::=
    "<" "check" "(" <agent_address> "," <property_name> ","
    <property_key> ";" <property_value> ")" ">" <condition>
<terminal> ::= <token_provider>
<terminal> ::= <number>
<terminal> ::= <symbol>
<terminal> ::= <agent_name>
<terminal> ::= <policy_name>
<terminal> ::= <variable>
<token_provider> ::=
    "[" <matcher-list> "]" "\"" <string_literal> "\""
<token_provider> ::=
    "[" <matcher-list> "]" /F "\"" <string_literal> "\""
<token_provider> ::=
    /DB "\"" <string_literal> "\""
<matcher-list> ::=
    "<" (<matcher> | (<matcher> "," <matcher-list>)) ">"
<matcher> ::=
    "exact" | "substring" |
    "partial" | "accent" |"accent-edit-difference"
<number> ::= "/NUMBER" [ "(" <integer> "," <integer> ")" ]
<symbol> ::= "/SYMBOL"
<agent_name> ::=
    ["A" - "Z"|"_"] (["A" - "Z"|"0" - "9"| "_" | "-"])*
<policy_name> ::= ("/P" (["0" - "9"])+)
<variable> ::= "?"
<string_literal> ::=
    "\"" (~(["\"","\\","\n","\r", "\""]) |
    <special_characters> )* "\""
<special_characters> ::=
    %BACK_SLASH% | %SINGLE_QUOTE% |
    %DOUBLE_QUOTE% | %NEW_LINE%
<action> ::=
    ["{" "execute:" <action_element_list> "}"]*
    ["{" "ask:" <action_element_list> "}"]*
    ["{" "choice:" <action_element_list> "}"]*
    ["{" "explain:" <action_element_list> "}"]*
<action_element_list> ::=
    <variable_action_element> ["," <action_element_list>]
<action_element_list> ::=
    <constant_action_element> ["," <action_element_list>]
<variable_action_element> ::= "*"
<variable_action_element> ::= "?"
<variable_action_element> ::= <agent_name>
<variable_action_element> ::= <policy_name>
```

-continued

```
<variable_action_element> ::=
    "set" "(" [<agent_address> ","] <property_name> ","
        <property_key> ";" <property_value> ")"
<variable_action_element> ::=
    "get" "(" [<agent address> ","] <property_name> ","
        <property_key> ")"
<constant_action_element> ::= <string_literal>
<property_name> ::= <string_literal>
<property_key> ::= <string_literal>
<property_value> ::= <string_literal>
<expression> ::= <string_literal>
<agent_address> ::=
<agent_name> ["." <agent_class> "@" <agent_domain>]
    <agent_class> ::= <string_literal>
    <agent_domain> ::= <string_literal>
```

The invention claimed is:

1. A method for user input to a back-end application, comprising the steps of:
receiving first user input in the form of one or more tokens;
querying a synonyms database for synonyms associated with said tokens;
attempting a natural language interpretation of said first user input in combination with the synonyms associated with said tokens, wherein the synonyms automatically replace at least one of the tokens;
forwarding a result of said natural language interpretation and said first user input to a suggestions and proposals database;
identifying in said suggestions and proposals database, additional potential input in dependence upon tokens in said first user input;
offering said additional potential input to a user; and
receiving second user input in the form of one or more tokens, the second user input further comprising an explicit reference made by the user that the second user input is part of a same context as the first user input.

2. A method according to claim 1, wherein said step of attempting a natural language interpretation of said first user input at least partially fails.

3. A method according to claim 2, wherein said step of identifying additional potential input in dependence upon tokens in said first user input, comprises the step of identifying said additional potential input in dependence upon only those tokens in said first user input of which said step of attempting a natural language interpretation failed.

4. A method according to claim 2, wherein said step of attempting a natural language interpretation produces an interpretation of a token in said first user input, but with a confidence level that is below a predetermined minimum acceptable confidence level.

5. A method according to claim 1, wherein additional potential input entries in said database each associate a target token sequence with at least one potential additional token sequence, and wherein said step of identifying additional potential input comprises the steps of:
comparing tokens in said user input to said target token sequences; and
selecting a set of at least one of said additional potential input entries in response to said step of comparing.

6. A method according to claim 5, wherein said step of offering said additional potential input comprises the step of offering at least one of the additional potential input token sequences to said user from said set of additional potential input entries.

7. A method according to claim 5, wherein additional potential input entries in said database each further include display text in correspondence with each of said potential additional token sequences,
and wherein said step of offering said additional potential input comprises the step of forwarding toward said user the display text corresponding to at least one of the additional potential input token sequences in said set of additional potential input entries.

8. A method according to claim 5, wherein said database further includes an importance value in correspondence with each association of a potential additional token sequence with a target token sequence,
and wherein said step of comparing tokens in said user input to said target token sequences includes a step of calculating a confidence value of a given association in said database between a potential additional token sequence and a target token sequence, said confidence value being dependent upon both the importance value of the given association and a correlation between said tokens in said user input and the target token sequence of the given association.

9. A method according to claim 8, wherein said step of selecting comprises the step of comparing said confidence value to a predetermined minimum acceptable confidence value.

10. A method according to claim 8, further comprising the step of, in response to said second user input following said step of offering, updating importance values in said database of at least one of the associations the additional potential input of which was offered to said user in said step of offering.

11. A method according to claim 10, wherein said second user input includes acceptance of the additional potential input offered in said step of offering, and wherein said step of updating importance values in said database comprises the steps of:
increasing the importance value of the association the additional potential input of which was accepted by said user; and
reducing the importance values of each of the associations the additional potential input of which were offered to said user in response to said first user input, other than the association the additional potential input of which was accepted by said user.

12. A method according to claim 1, wherein said step of attempting a natural language interpretation produces an interpretation of a token in said first user input,
wherein additional potential input entries in said database each associate a target token sequence with at least one potential additional token sequence,
and wherein said step of identifying additional potential input comprises the steps of:
comparing tokens in said interpretation to said target token sequences; and
selecting a set of at least one of said additional potential input entries in response to said step of comparing.

13. A method according to claim 1, wherein said step of attempting a natural language interpretation produces an interpretation of a token in said first user input,
wherein additional potential input entries in said database each associate a target token sequence with at least one potential additional token sequence, said database also including a respective importance value for each of said associations,
and wherein said step of identifying additional potential input comprises the steps of:

comparing to said target token sequences, tokens in at least one of said user input and said interpretation; and selecting a set of at least one of said additional potential input entries in response to said step of comparing and in dependence upon said importance values.

14. A method according to claim 13, wherein said step of selecting a set of at least one of said additional potential input entries comprises the steps of:

for each particular one of said associations, calculating a confidence score given by the degree to which said target token sequences of the particular association match the tokens in said at least one of said user input and said interpretation, scaled by the importance value of the particular association; and selecting the additional potential input entries from only those of said associations having a confidence score exceeding a predetermined minimum acceptable confidence score.

15. A method according to claim 13, wherein said step of selecting a set of at least one of said additional potential input entries comprises the steps of:

for each particular one of said associations, calculating a confidence score given by the degree to which said target token sequences of the particular association match the tokens in said at least one of said user input and said interpretation, scaled by the importance value of the particular association; and selecting the additional potential input entries of only those of said associations having a confidence score in the top N confidence scores calculated in said step of calculating, N being a predetermined number.

16. A method according to claim 13, wherein said step of selecting a set of at least one of said additional potential input entries comprises the steps of:

for each particular one of said associations, calculating a context matching score given by the degree to which said target token sequences of the particular association match the tokens in said at least one of said user input and said interpretation; and selecting the additional potential input entries in dependence upon both said context matching scores and said importance values, further comprising the step of negatively reinforcing the importance value of a subject association in said database whose additional potential input is offered to but not accepted by said user, said negative reinforcement being more severe the greater the context matching score for said subject association.

17. A method according to claim 1, further comprising the step of, in response to user acceptance of the additional potential input offered in said step of offering, attempting a natural language interpretation of second user input including said additional potential input.

18. A method according to claim 1, wherein said additional potential input comprises a proposal.

19. A method according to claim 1, further comprising the step of an operator other than said user preparing said database.

* * * * *